United States Patent
Omr et al.

(10) Patent No.: US 11,875,519 B2
(45) Date of Patent: Jan. 16, 2024

(54) METHOD AND SYSTEM FOR POSITIONING USING OPTICAL SENSOR AND MOTION SENSORS

(71) Applicants: Medhat Omr, Calgary (CA); Abdelrahman Ali, Calgary (CA); Amr Al-Hamad, Calgary (CA); Jacques Georgy, Calgary (CA); Billy Cheuk Wai Chan, Calgary (CA); Dylan Krupity, Calgary (CA); Qingli Wang, Calgary (CA); Christopher Goodall, Calgary (CA)

(72) Inventors: Medhat Omr, Calgary (CA); Abdelrahman Ali, Calgary (CA); Amr Al-Hamad, Calgary (CA); Jacques Georgy, Calgary (CA); Billy Cheuk Wai Chan, Calgary (CA); Dylan Krupity, Calgary (CA); Qingli Wang, Calgary (CA); Christopher Goodall, Calgary (CA)

( * ) Notice: Subject to any disclaimer, the term of this patent is extended or adjusted under 35 U.S.C. 154(b) by 148 days.

(21) Appl. No.: 17/402,442

(22) Filed: Aug. 13, 2021

(65) Prior Publication Data

US 2022/0107184 A1    Apr. 7, 2022

Related U.S. Application Data

(60) Provisional application No. 63/065,417, filed on Aug. 13, 2020.

(51) Int. Cl.
*G06T 7/277* (2017.01)
*G01C 21/30* (2006.01)
(Continued)

(52) U.S. Cl.
CPC .............. *G06T 7/277* (2017.01); *G01C 21/30* (2013.01); *G06T 7/20* (2013.01); *G06T 7/70* (2017.01);
(Continued)

(58) Field of Classification Search
CPC ........................ G01C 21/1656; G01C 21/005; G01C 21/165; G01C 21/3848; G01C 21/10;
(Continued)

(56) References Cited

U.S. PATENT DOCUMENTS 8,374,775 B2 * 2/2013 Van Der Merwe .... G01C 21/12
702/179
8,761,439 B1 * 6/2014 Kumar ...................... G06T 7/73
382/103

(Continued)

FOREIGN PATENT DOCUMENTS

WO WO-2020124624 A1 * 6/2020
WO WO-2021248636 A1 * 12/2021 ............. G01C 21/32

*Primary Examiner* — Ian L Lemieux
*Assistant Examiner* — Woo C Rhim

(57) ABSTRACT

An integrated navigation solution is provided for a device within a moving platform. Motion sensor data from a sensor assembly of the device is obtained, optical samples from at least one optical sensor for the platform are obtained and map information for an environment encompassing the platform is obtained. Correspondingly, an integrated navigation solution is generated based at least in part on the obtained motion sensor data using a nonlinear state estimation technique, wherein the nonlinear state estimation technique uses a nonlinear measurement model for optical sensor data. Generating the integrated navigation solution includes using the sensor data with the nonlinear state estimation technique and integrating the optical sensor data directly by updating the nonlinear state estimation technique (Continued)

using the nonlinear measurement model and the map information. The integrated navigation solution is then provided.

26 Claims, 13 Drawing Sheets

(51) Int. Cl.
| | |
|---|---|
| G06T 7/77 | (2017.01) |
| G06T 7/73 | (2017.01) |
| G06T 7/70 | (2017.01) |
| G06T 7/80 | (2017.01) |
| G06T 7/20 | (2017.01) |
| G06N 3/045 | (2023.01) |

(52) U.S. Cl.
CPC ............... G06T 7/73 (2017.01); G06T 7/75 (2017.01); G06T 7/77 (2017.01); G06T 7/80 (2017.01); *G06N 3/045* (2023.01)

(58) Field of Classification Search
CPC .......................... G01C 21/30; G01C 21/1652; G01C 21/3602; G01S 2013/932; G01S 13/931; G01S 19/47; G01S 19/485; G01S 13/62; G06T 2207/30252; G06T 2207/10016; G06T 7/277; G06T 7/20; G06T 7/70; G06T 7/73; G06T 7/75; G06T 7/77; G06T 7/80; G06N 3/045
See application file for complete search history.

(56) References Cited

U.S. PATENT DOCUMENTS

| | | | | |
|---|---|---|---|---|
| 8,768,558 | B2* | 7/2014 | Reeve | B62D 15/025 |
| | | | | 701/28 |
| 9,031,782 | B1* | 5/2015 | Lemay | G06T 7/277 |
| | | | | 701/445 |
| 9,547,910 | B2* | 1/2017 | Hamza | G06T 7/20 |
| 9,784,582 | B2* | 10/2017 | Georgy | G01C 21/18 |
| 10,018,474 | B2* | 7/2018 | Li | G01C 21/34 |
| 10,054,442 | B2* | 8/2018 | Georgy | G01C 21/20 |
| 10,132,635 | B2* | 11/2018 | Kazemipur | G01C 21/1656 |
| 10,132,915 | B2* | 11/2018 | Georgy | G01S 5/0242 |
| 10,180,327 | B1* | 1/2019 | Lane | G01C 21/025 |
| 10,229,508 | B2* | 3/2019 | Alibay | G06T 7/277 |
| 10,302,435 | B2* | 5/2019 | Omr | G01C 21/165 |
| 10,565,732 | B2* | 2/2020 | Zhao | G01C 25/005 |
| 10,663,298 | B2* | 5/2020 | Ali | G06T 7/248 |
| 10,694,148 | B1* | 6/2020 | Li | G01C 21/1656 |
| 10,767,996 | B2* | 9/2020 | Mohr | G01C 21/387 |
| 10,782,137 | B2* | 9/2020 | Li | G01C 21/32 |
| 2009/0248304 | A1* | 10/2009 | Roumeliotis | H04W 4/027 |
| | | | | 701/500 |
| 2011/0206236 | A1* | 8/2011 | Center, Jr. | G06T 7/593 |
| | | | | 382/103 |
| 2013/0162785 | A1* | 6/2013 | Michot | G06F 18/251 |
| | | | | 348/50 |
| 2014/0088790 | A1* | 3/2014 | Vukman | G06F 7/00 |
| | | | | 701/1 |
| 2014/0372026 | A1* | 12/2014 | Georgy | G01S 19/47 |
| | | | | 701/469 |
| 2015/0127259 | A1* | 5/2015 | Kazemipur | G01S 5/16 |
| | | | | 701/541 |
| 2015/0146926 | A1* | 5/2015 | Ramachandran | H04N 13/25 |
| | | | | 382/103 |
| 2015/0292887 | A1* | 10/2015 | Haglund | G05D 1/08 |
| | | | | 701/523 |
| 2015/0292888 | A1* | 10/2015 | Haglund | G06T 7/32 |
| | | | | 701/523 |
| 2015/0369609 | A1* | 12/2015 | Roumeliotis | G06T 7/277 |
| | | | | 701/400 |
| 2016/0070265 | A1* | 3/2016 | Liu | G05D 1/102 |
| | | | | 701/25 |
| 2016/0140729 | A1* | 5/2016 | Soatto | G06T 7/277 |
| | | | | 348/135 |
| 2016/0161260 | A1* | 6/2016 | Mourikis | G01C 21/1656 |
| | | | | 701/500 |
| 2016/0216118 | A1* | 7/2016 | Kazemipur | G06T 7/248 |
| 2016/0224855 | A1* | 8/2016 | Al-Hamad | G06V 10/56 |
| 2017/0004630 | A1* | 1/2017 | Al-Hamad | G01S 19/485 |
| 2017/0178355 | A1* | 6/2017 | Alibay | G06T 7/73 |
| 2017/0219351 | A1* | 8/2017 | Hamilton | G01S 19/19 |
| 2017/0336220 | A1* | 11/2017 | Broaddus | G06T 7/285 |
| 2018/0045519 | A1* | 2/2018 | Ghadiok | G06F 16/2379 |
| 2018/0188384 | A1* | 7/2018 | Ramanandan | G01S 19/47 |
| 2018/0283882 | A1* | 10/2018 | He | H04L 67/30 |
| 2019/0050000 | A1* | 2/2019 | Kennedy | G06V 20/17 |
| 2019/0250640 | A1* | 8/2019 | O'Flaherty | G05D 1/042 |
| 2019/0273909 | A1* | 9/2019 | Ye | G06T 7/579 |
| 2019/0323845 | A1* | 10/2019 | Agarwal | B60R 11/04 |
| 2020/0064483 | A1* | 2/2020 | Li | G01S 7/4026 |
| 2020/0124421 | A1* | 4/2020 | Kang | G01S 17/06 |
| 2020/0158517 | A1* | 5/2020 | Tadi | G06T 7/579 |
| 2020/0217972 | A1* | 7/2020 | Kim | G01C 21/3602 |
| 2020/0348143 | A1* | 11/2020 | Godha | H04W 4/026 |
| 2020/0348423 | A1* | 11/2020 | Bae | G01S 19/485 |
| 2021/0055109 | A1* | 2/2021 | Teng | G01C 21/3602 |
| 2021/0156963 | A1* | 5/2021 | Popov | G06N 3/045 |
| 2021/0247764 | A1* | 8/2021 | Liu | G01C 21/3848 |
| 2022/0057213 | A1* | 2/2022 | Singhal | G06T 7/74 |
| 2022/0157179 | A1* | 5/2022 | Oi | G08G 5/0039 |
| 2022/0270358 | A1* | 8/2022 | Cox | G06V 10/811 |

* cited by examiner

METHOD AND SYSTEM FOR POSITIONING USING OPTICAL SENSOR AND MOTION SENSORS

CROSS-REFERENCE TO RELATED APPLICATIONS

This application claims priority from and benefit of U.S. Provisional Patent Application Ser. No. 63/065,417, filed Aug. 13, 2020, entitled "METHOD AND SYSTEM FOR POSITIONING USING OPTICAL SENSOR AND MOTION SENSORS," which is assigned to the assignee hereof, and is incorporated by reference in its entirety.

FIELD OF THE PRESENT DISCLOSURE

This disclosure generally relates to navigation techniques and more specifically to navigational constraints determined using optical sensor data.

BACKGROUND

Self-driving vehicles have the potential of reducing the number of annual causalities by eliminating the human error factor. By enabling self-driving vehicles, numerous intelligent transportation systems can be deployed and used for traffic management and a multitude of safety and entertainment applications. One of the major challenges facing researchers and engineers working on the development of autonomous vehicles, is fulfilling the system requirement of estimating the vehicles' pose in real-time within certain accuracy and availability constraints. Traditional systems used for such estimation include Inertial Measurement Units (IMU) and Global Navigation Satellite System (GNSS). IMU-based systems provide accurate relative pose estimation over short time periods but due to the process of mechanization, standalone IMU-based systems accumulate errors in the states exponentially with time, such as inertial navigation systems (INS). On the other hand, the position estimated by the GNSS receiver is absolute and does not drift over time. However, GNSS signals are sometimes completely blocked or affected by severe multipath. Due to the complementary error characteristics of motion sensors and GNSS systems, a traditional approach to accurately estimate the pose of the vehicle, is by using sensor fusion algorithms to integrate IMU and GNSS signals. The performance of the GNSS system can also be enhanced by using Differential GPS stations that can broadcast ionospheric and tropospheric errors to adjacent GNSS receivers.

Due to very high accuracy and reliability requirements imposed by autonomous driving applications, traditional IMU/GNSS or INS/GNSS integration is not enough. In dense urban areas, skyscrapers block several positioning satellites and reflect signals (i.e., multipath) from visible and non-visible satellites, leading to low positioning accuracy. Moreover, due to the geometry of the visible satellites, which are mostly collinear in dense urban areas, the GNSS positioning accuracy and availability is usually limited. Hence, traditional IMU/GNSS or INS/GNSS integration systems are not capable of achieving the accuracy requirements for autonomous driving applications in such environments. Regardless of the environment surrounding self-driving vehicles, achieving a minimum level of positioning accuracy is needed.

Therefore, it would be desirable to provide an additional source of information that may be used to determine a positional and/or navigational solution. According to the techniques of this disclosure, optical sensor data is integrated with information from an IMU to help overcome the limitations of the conventional GNSS integration noted above as described in the following materials.

SUMMARY

This disclosure includes a method for providing an integrated navigation solution for a device within a platform. The method may involve obtaining motion sensor data from a sensor assembly of the device, obtaining samples from at least one optical sensor for the platform and obtaining map information for an environment encompassing the platform. An integrated navigation solution is generated based at least in part on the motion sensor data using a nonlinear state estimation technique, wherein the nonlinear state estimation technique comprises using a nonlinear measurement model for optical samples. The integrated navigation solution is generated by using the obtained motion sensor data in the nonlinear state estimation technique and integrating the optical samples directly by updating the nonlinear state estimation technique using the nonlinear measurement models and the map information. The integrated navigation solution for the platform is then provided.

This disclosure also includes a system for providing an integrated navigation solution for a device within a platform. A system for providing an integrated navigation solution for a device within a moving platform according to this disclosure may have a device with a sensor assembly configured to output motion sensor data, at least one optical sensor configured to output samples for the platform and at least one processor, coupled to receive the motion sensor data, the optical samples, and map information for an environment encompassing the platform, and operative to generate an integrated navigation solution based at least in part on the motion sensor data using a nonlinear state estimation technique, wherein the nonlinear state estimation technique comprises using a nonlinear measurement model for optical samples. The at least one processor may be operative to generate the integrated navigation solution by using the obtained motion sensor data in the nonlinear state estimation technique and integrating the optical samples directly by updating the nonlinear state estimation technique using the nonlinear measurement models and the map information. The at least one processor may then provide the integrated navigation solution.

DETAILED DESCRIPTION

Figure 1:
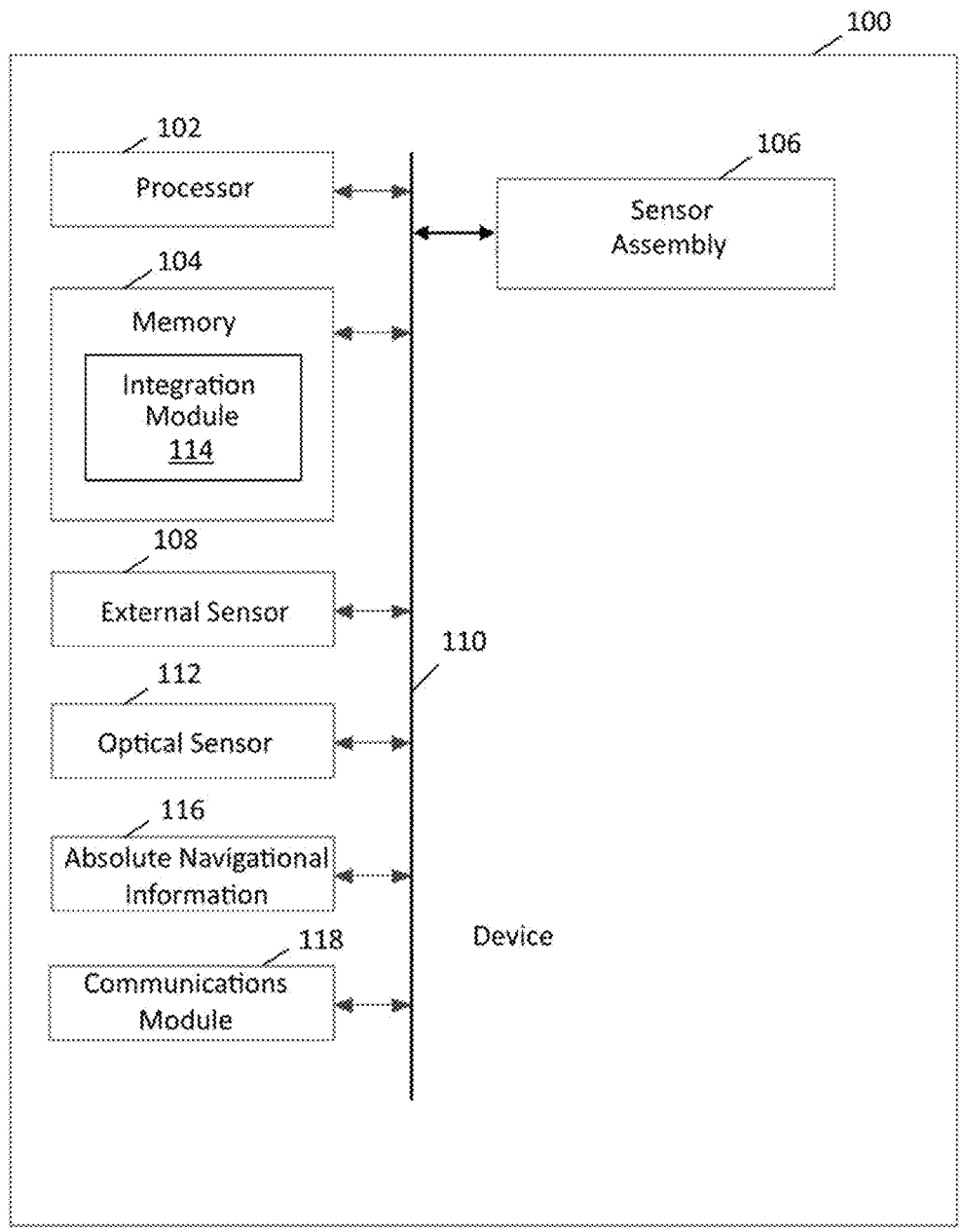
FIG. 1 is schematic diagram of a device for providing a navigation solution by integrating optical samples with motion sensor data according to an embodiment.

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

The techniques of this disclosure are directed to providing a navigation solution for a device within a moving platform by integrating optical samples with motion sensor data. Typically, the platform is a wheel-based vehicle or other similar vessel intended for use on land, but may also be marine or airborne. As such, the platform may also be referred to as the vehicle. However, the platform may also be a pedestrian or a user undergoing on foot motion. As will be appreciated, motion sensor data includes information from accelerometers, gyroscopes, or an IMU. Inertial sensors are self-contained sensors that use gyroscopes to measure the rate of rotation/angle, and accelerometers to measure the specific force (from which acceleration is obtained). Inertial sensors data may be used in an INS, which is a non-reference based relative positioning system. Using initial estimates of position, velocity and orientation angles of the moving platform as a starting point, the INS readings can subsequently be integrated over time and used to determine the current position, velocity and orientation angles of the platform. Typically, measurements are integrated once for gyroscopes to yield orientation angles and twice for accelerometers to yield position of the platform incorporating the orientation angles. Thus, the measurements of gyroscopes will undergo a triple integration operation during the process of yielding position. Inertial sensors alone, however, are unsuitable for accurate positioning because the required integration operations of data results in positioning solutions that drift with time, thereby leading to an unbounded accumulation of errors. Integrating optical samples with the motion sensor data can help mitigate such errors.

The device that is contained within the platform (which as noted may be a vehicle or vessel of any type, and in some applications, may be a person,) and may have one or more sources of navigational or positional information. In some embodiments, the device is strapped or tethered in a fixed orientation with respect to the platform. The device is "strapped," "strapped down," or "tethered" to the platform when it is physically connected to the platform in a fixed manner that does not change with time during navigation, in the case of strapped devices, the relative position and orientation between the device and platform does not change with time during navigation. Notably, in strapped configurations, it is assumed that the mounting of the device to the platform is in a known orientation. Nevertheless, in some circumstances, there may be a deviation in the intended mounting orientation, leading to a misalignment between the device and the platform. In one aspect, the techniques of this disclosure may be employed to characterize and correct for such a mounting misalignment.

In other embodiments, the device is "non-strapped", or "non-tethered" when the device has some mobility relative to the platform (or within the platform), meaning that the relative position or relative orientation between the device and platform may change with time during navigation. Under these conditions, the relative orientation of the device with respect to the platform may vary, which may also be termed misalignment. As with the mounting misalignment discussed above, this varying misalignment between the frame of the device and the frame of the platform may be determined using the techniques of this disclosure and correspondingly compensated for. The device may be "non-strapped" in two scenarios: where the mobility of the device within the platform is "unconstrained", or where the mobility of the device within the platform is "constrained." One example of "unconstrained" mobility may be a person moving on foot and having a portable device such as a smartphone in their hand for texting or viewing purposes (hand may also move), at their ear, in hand and dangling/swinging, in a belt clip, in a pocket, among others, where such use cases can change with time and even each use case can have a changing orientation with respect to the user. Another example where the mobility of the device within the platform is "unconstrained" is a person in a vessel or vehicle, where the person has a portable device such as a smartphone in their hand for texting or viewing purposes (hand may also move), at their ear, in a belt clip, in a pocket, among others, where such use cases can change with time and even each use case can have a changing orientation with respect to the user. An example of "constrained" mobility may be when the user enters a vehicle and puts the portable device (such as smartphone) in a rotation-capable holder or cradle. In this example, the user may rotate the holder or cradle at any time during navigation and thus may change the orientation of the device with respect to the platform or vehicle. Thus, when non-strapped, the mobility of the device may be constrained or unconstrained within the platform and may be moved or tilted to any orientation within the platform and the techniques of this disclosure may still be applied under all of these conditions. As such, some embodiments described below include a portable, hand-held device that can be moved in space by a user and its motion, location and/or orientation in space therefore sensed. The techniques of this disclosure can work with any type of portable device as desired, including a smartphone or the other exemplary devices noted below. It will be appreciated that such devices are often carried or associated with a user and thus may benefit from providing navigation solutions using a variety of inputs. For example, such a handheld device may be a mobile phone (e.g., cellular phone, a phone running on a local network, or any other telephone handset), tablet, personal digital assistant (PDA), video game player, video game controller, navigation device, wearable device (e.g., glasses, watch, belt clip), fitness tracker, virtual or augmented reality equipment, mobile internet device (MID), personal navigation device (PND), digital still camera, digital video camera, binoculars, telephoto lens, portable music, video or media player, remote control, or other handheld device, or a combination of one or more of these devices. However, the techniques of this disclosure may also be applied to other types of devices that are not handheld, including devices integrated with autonomous or piloted vehicles whether land-based, aerial, or underwater vehicles, or equipment that may be used with such vehicles. As an illustration only and without limitation, the platform may be a drone, also known as an unmanned aerial vehicle (UAV).

To help illustrate aspects of this disclosure, features of a suitable device 100 are depicted in FIG. 1 with high level schematic blocks. As will be appreciated, device 100 may be implemented as a device or apparatus, such a strapped, non-strapped, tethered, or non-tethered device as described above, which when non-strapped, the mobility of the device may be constrained or unconstrained within the platform and may be moved or tilted to any orientation within the platform. As shown, device 100 includes a processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least one sensor assembly 106 for providing motion sensor data representing motion of device 100 in space, including inertial sensors such as an accelerometer and a gyroscope, other motion sensors including a magnetometer, a pressure sensor or others may be used in addition. Depending on the configuration, sensor assembly 106 measures one or more axes of rotation and/or one or more axes of acceleration of the device. In one embodiment, sensor assembly 106 may include inertial rotational motion sensors or inertial linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by processor 102, or other processing resources of device 100, combines data from sensor assembly 106 to provide a six axis determination of motion or six degrees of freedom (6DOF). Still further, sensor assembly 106 may include a magnetometer measuring along three orthogonal axes and output data to be fused with the gyroscope and accelerometer inertial sensor data to provide a nine axis determination of motion. Likewise, sensor assembly 106 may also include a pressure sensor to provide an altitude determination that may be fused with the other sensor data to provide a ten axis determination of motion. As desired, sensor assembly 106 may be implemented using Micro Electro Mechanical System (MEMS), allowing integration into a single small package.

Optionally, device 100 may implement an additional sensor assembly in the form of external sensor 108, and may represent one or more sensors as described above, such as inertial motion sensors (i.e., accelerometer and/or a gyroscope), other motion sensors or other types of sensors. For example, in some of the embodiments discussed below, external sensor 108 is a supplemental sensor, such as a radar system, a thermal camera, an infra-red imaging sensor, a light detection and ranging (LIDAR) system, or other suitable sensor that records images or samples to help classify objects detected by the optical sensor. External sensor 108 may also provide odometry information for the platform. As used herein, "external" means a sensor that is not integrated with sensor assembly 106 and may be remote or local to device 100 as warranted. Also alternatively or in addition, sensor assembly 106 and/or external sensor 108 may be configured to measure one or more other aspects about the environment surrounding device 100. This is optional and not required in all embodiments. For example, a pressure sensor and/or a magnetometer may be used to refine motion determinations. Although described in the context of one or more sensors being MEMS based, the techniques of this disclosure may be applied to any sensor design or implementation.

In the embodiment shown, processor 102, memory 104, sensor assembly 106 and other components of device 100 may be coupled through bus 110, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between processor 102 and memory 104.

As will be discussed in detail below, the techniques of this disclosure involve integrating optical samples with the motion sensor data provided by sensor assembly 106 (or other sensors, such as external sensor 108) to provide the navigation solution. Device 100 obtains data from optical sensor 112, which may be integrated with device 100 as depicted or may be associated or connected with device 100, may be part of the platform or may be implemented in any other desired manner. Although a minimum of one optical sensor is used, embodiments may include multiple optical sensors, such as as dual optical sensors used to provide a stereo view of the environment or any other suitable arrangement of multiple optical sensors.

Algorithms, routines or other instructions for processing sensor data, including integrating data from optical sensor or sensors 112, may be employed by integration module 114 to perform any of the operations associated with the techniques of this disclosure. In one aspect, an integrated navigation solution based on the motion sensor data and the optical samples may be output by integration module 114. As used herein, a navigation solution comprises position and attitude (or orientation) and may optionally include velocity. Determining the navigation solution may involve sensor fusion or similar operations performed by the processor 102, which may be using the memory 104, or any combination of other processing resources.

Optionally, device 100 may have a source of absolute navigational information 116, such as a Global Navigation Satellite System (GNSS) receiver, including without limitation the Global Positioning System (GPS), the Global Navigation Satellite System (GLONASS), Galileo and/or Beidou, as well as WiFi™ positioning, cellular tower positioning, Bluetooth™ positioning beacons or other similar methods when deriving a navigation solution. This is optional and not required in all embodiments. Integration module 114 may also be configured to use information from a wireless communication protocol to provide a navigation solution determination using signal trilateration. Any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others may be employed. The source of absolute navigational information represents a "reference-based" system that depend upon external sources of information, as opposed to self-contained navigational information that is provided by self-contained and/or "non-reference based" systems within a device/platform, such as sensor assembly 106 as noted above.

In some embodiments, device 100 may include communications module 118 for any suitable purpose, including for receiving map information for the environment surrounding the platform. Communications module 118 may employ a Wireless Local Area Network (WLAN) conforming to Institute for Electrical and Electronic Engineers (IEEE) 802.11 protocols, featuring multiple transmit and receive chains to provide increased bandwidth and achieve greater throughput. For example, the 802.1 lad (WiGIG™) standard includes the capability for devices to communicate in the 60 GHz frequency band over four, 2.16 GHz-wide channels, delivering data rates of up to 7 Gbps. Other standards may also involve the use of multiple channels operating in other frequency bands, such as the 5 GHz band, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may be used. In some embodiments, multiple communication systems may be employed to leverage different capabilities. Typically, communications involving higher bandwidths may be associated with greater power consumption, such that other channels may utilize a lower power communication protocol such as BLUETOOTH®, ZigBee®, ANT or the like. Further, a wired connection may also be employed. Generally, communication may be direct or indirect, such as through one or multiple interconnected networks. As will be appreciated, a variety of systems, components, and network configurations, topologies and infrastructures, such as client/server, peer-to-peer, or hybrid architectures, may be employed to support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

As will be appreciated, processor 102 and/or other processing resources of device 100 may be one or more microprocessors, central processing units (CPUs), or other processors which run software programs for device 100 or for other applications related to the functionality of device 100. For example, different software application programs such as menu navigation software, games, camera function control, navigation software, and phone or a wide variety of other software and functional interfaces can be provided. In some embodiments, multiple different applications can be provided on a single device 100, and in some of those embodiments, multiple applications can run simultaneously on the device 100. Multiple layers of software can be provided on a computer readable medium such as electronic memory or other storage medium such as hard disk, optical disk, flash drive, etc., for use with processor 102. For example, an operating system layer can be provided for device 100 to control and manage system resources in real time, enable functions of application software and other layers, and interface application programs with other software and functions of device 100. In some embodiments, one or more motion algorithm layers may provide motion algorithms for lower-level processing of raw sensor data provided from internal or external sensors. Further, a sensor device driver layer may provide a software interface to the hardware sensors of device 100. Some or all of these layers can be provided in memory 104 for access by processor 102 or in any other suitable architecture. Embodiments of this disclosure may feature any desired division of processing between processor 102 and other processing resources, as appropriate for the applications and/or hardware being employed. Aspects implemented in software may include but are not limited to, application software, firmware, resident software, microcode, etc, and may take the form of a computer program product accessible from a computer-usable or computer-readable medium providing program code for use by or in connection with a computer or any instruction execution system, such as processor 102, a dedicated processor or any other processing resources of device 100.

Figure 2:
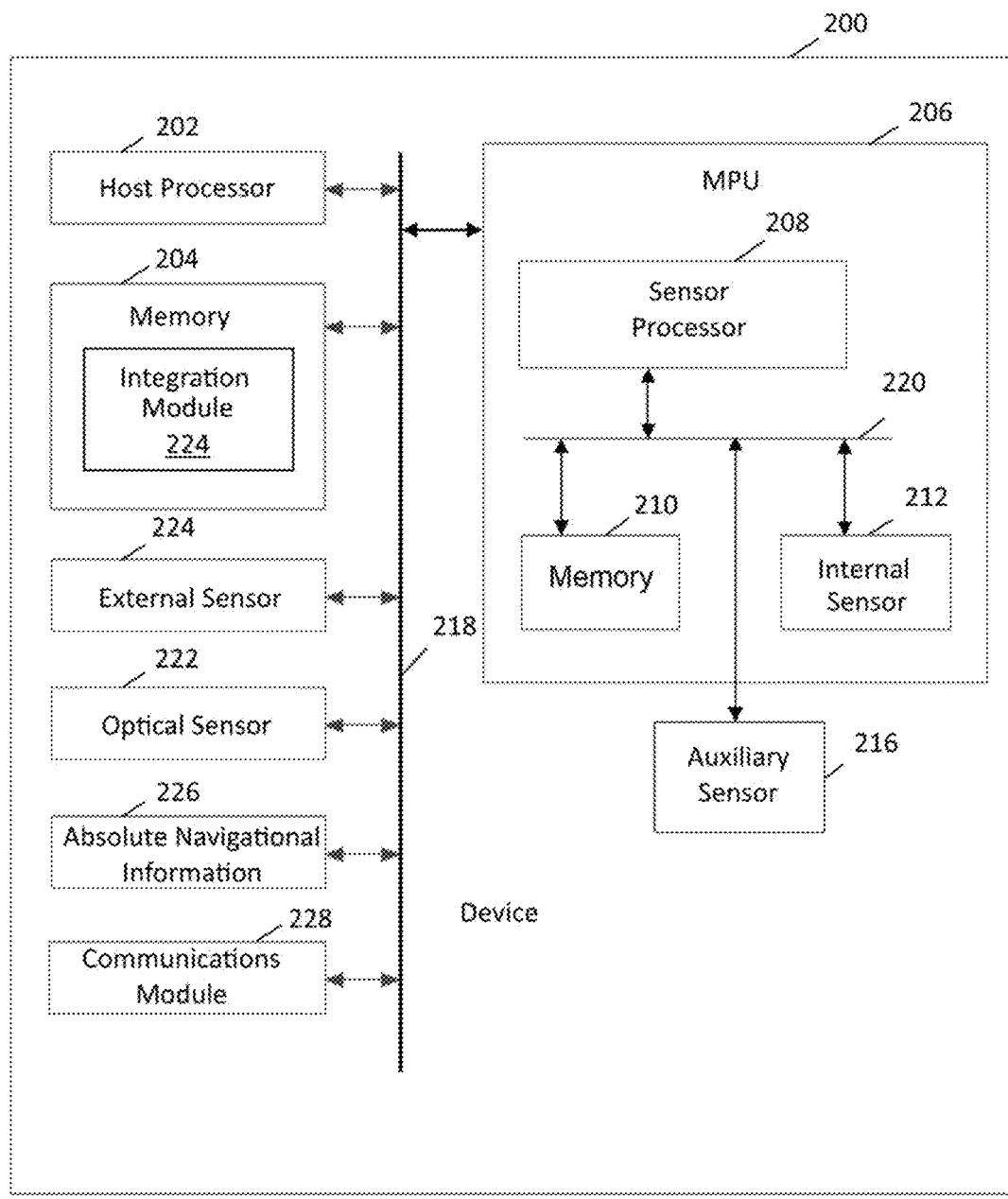
FIG. 2 is schematic diagram of another device architecture for providing a navigation solution by integrating optical samples with motion sensor data according to an embodiment.

As another illustration of aspects of this disclosure, features of a different device architecture are depicted in FIG. 2 with high level schematic blocks in the context of device 200. Here, device 200 includes a host processor 202 and memory 204 similar to the above embodiment. Device 200 includes at least one sensor assembly for providing motion sensor data, as shown here in the form of integrated motion processing unit (MPU®) 206 or any other sensor processing unit (SPU), featuring sensor processor 208, memory 210 and internal sensor 212. Memory 210 may store algorithms, routines or other instructions for processing data output by internal sensor 212 and/or other sensors as described below using logic or controllers of sensor processor 208, as well as storing raw data and/or motion data output by internal sensor 212 or other sensors. Memory 210 may also be used for any of the functions associated with memory 204. Internal sensor 212 may be one or more sensors for measuring motion of device 200 in space as described above, including inertial sensors such as an accelerometer and a gyroscope, other motion sensors including a magnetometer, a pressure sensor or others may be used in addition. Exemplary details regarding suitable configurations of host processor 202 and MPU 206 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for MPU 206 in device 200 are available from InvenSense, Inc. of San Jose, Calif.

Optionally, device 200 may receive information from one or more other sensor assemblies as indicated by external sensor 214, and may represent sensors, such as inertial motion sensors (i.e., accelerometer and/or a gyroscope), other motion sensors or other types of sensors as described above. In this context, "external" means a sensor that is not integrated with MPU 206 and may be remote or local to device 200. Also alternatively or in addition, MPU 206 may receive data from an auxiliary sensor 216 configured to measure one or more aspects about the environment surrounding device 200. This is optional and not required in all embodiments. For example, a pressure sensor and/or a magnetometer may be used to refine motion determinations made using internal sensor 212. In the embodiment shown, host processor 202, memory 204, MPU 206 and other components of device 200 may be coupled through bus 218, while sensor processor 208, memory 210, internal sensor 212 and/or auxiliary sensor 216 may be coupled though bus 220, either of which may be any suitable bus or interface as described above.

Again, the techniques of this disclosure involve integrating optical samples with the motion sensor data provided by internal sensor 212 (or other sensors) to provide the navigation solution, and correspondingly, device 200 obtains data from integrated optical sensor 222, which may be at least one sensor or multiple optical sensors similar to the embodiment discussed above. Alternatively, the optical sensor may be associated with device 200, may be part of the platform or may be implemented in any other desired manner. Also similar to the above embodiment, algorithms, routines or other instructions for processing sensor data, including integrating optical samples, may be employed by integration module 224 to perform this any of the operations associated with the techniques of this disclosure. In one aspect, an integrated navigation solution based on the motion sensor data and the optical samples may be output by integration module 224. Determining the navigation solution may involve sensor fusion or similar operations performed by MPU processor 208. In other embodiments, some, or all, of the processing and calculation may be performed by the host processor 202, which may be using the host memory 204, or any combination of other processing resources.

Optionally as described above, device 200 may have a source of absolute navigational information 226 and may include communications module 228 for any suitable purpose. Source of absolute navigational information 226 and/or communications module 228 may have any of the characteristics discussed above with regard to source of absolute navigational information 116 and communications module 118.

As with processor 102, host processor 202 and/or sensor processor 208 may be one or more microprocessors, central processing units (CPUs), or other processors which run software programs for device 200 or for other applications related to the functionality of device 200. Embodiments of this disclosure may feature any desired division of processing between host processor 202, MPU 206 and other processing resources, as appropriate for the applications and/or hardware being employed.

As will be described, the techniques of this disclosure employ a source of map information for the environment surrounding the platform and device. In one aspect, sensors such as those integrated with the device within the platform continuously log real-time measurements. These measurements provide at least some level of description of the local environment surrounding the platform. A map is a global representation of all the elements/objects in the real-world that might affect the measurements logged by the sensors. A map can be either static or dynamic depending on whether static only or static and dynamic objects are represented in the map. Further, the map may also include color information as a further identification aid when processing the optical samples. Two well-known forms of maps include Location-based maps and a Feature-based maps.

In a location-based map, the map is represented as a set of objects in set m, where the $i^{th}$ object denoted by $m_i = m_{ix,iy,iz}$ in set m, is a 3D location in the map. Here, $m_{ix,iy,iz}$ is the Cartesian coordinates represented by the $i^{th}$ element. Each location-object can contain other attributes describing the object. A distinctive characteristic of location-based maps is that the list of objects in the set m are indexed by their location instead of any other attribute. The main advantage of location-based maps is that every location in the map is represented, hence, the map has a full description of empty and non-empty locations in the map. A well-known example of Location-based maps is an Occupancy Grid Map (OGM), where the real world is discretized into squares (in the case of 2D maps) or cubes (in the case of 3D maps). The objects in the OGM map are the locations of the center-point of the squares/cubes, where each location-object might have several attributes. For examples, one attribute could reflect whether the squares/cubes are occupied or empty (alternatively this attribute could reflect whether the squares/cubes are occupied, empty or unmapped), another attribute could contain the expected measurements vector of a specific sensor at the current location-object.

In a feature-based map, the map is represented as a set of objects in set m, where the $i^{th}$ object denoted by $m_i$ is a specific feature-object in the map. In other words, a feature-based map is a collection of objects that somehow represent certain features in the environment. These objects usually have several attributes including the location of the object. A distinctive characteristic of a feature-based map is that only selective locations of the environment are represented in m. Feature-based maps can either be sparse or dense depending on the number of feature-objects across the map. Moreover, the feature-objects can be uniformly distributed (or any other distribution) across different locations in a map, or feature-objects can be congested in specific locations. Finally, the uniqueness of each of the feature-object is another characteristic of a feature-map. These characteristics affect how useful the feature-map can be used for localization purposes. A feature-based map that consists of dense, unique and uniformly distributed feature-objects (across locations in a map) are generally favorable characteristics for localization systems.

Map information as used herein may also be optical signature maps which include optical signatures regarding objects in the environment. As will be appreciated, the geometry of the objects in an environment will be represented in the optical samples, which can be considered an optical signature for this section of the environment, and hence detected section of objects can be inferred or identified by comparing the optical signature to the object signature. Matches may allow the assumption that a section detected by the optical sensor is the section of objects that maximizes the correlation between the optical signature and a specific object geometry or object signature in the map.

Integrating the optical samples with the motion sensor data according to the techniques of this disclosure involves modelling the optical samples. One approach is to model measurements based on the optical sensor characteristics and environmental factors (i.e., exact model). This approach is not always effective because the derived model could be a function of unknown states or reaching an accurate model could consume a lot of resources. Accordingly, another approach is to use a probabilistic approach to build the measurement model using nonlinear techniques. As will be described in further detail below, suitable measurement models include an optical range-based model based at least in part on a probability distribution of measured ranges using an estimated state of the platform and the map information, an optical nearest object likelihood model based at least in part on a probability distribution of distance to an object detected using the optical samples, an estimated state of the platform and a nearest object identification from the map information, an optical map matching model based at least in part on a probability distribution derived by correlating a global map derived from the map information to a local map generated using the optical samples and an estimated state of the platform, and an optical closed-form model based at least in part on a relation between an estimated state of the platform and ranges to objects from the map information derived from the optical samples.

Figure 3:
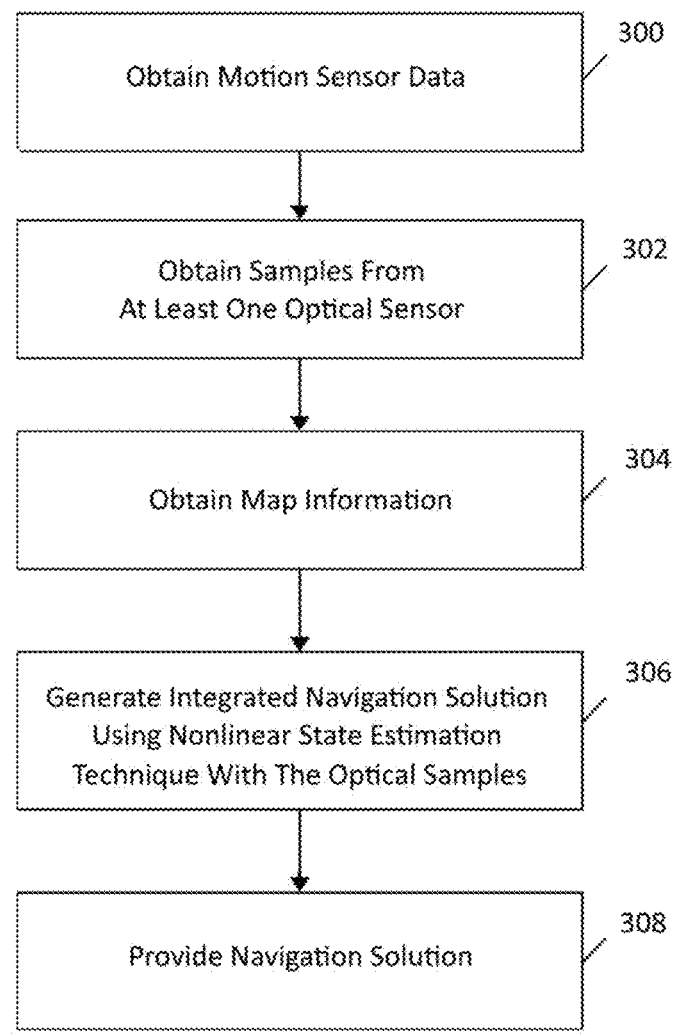
FIG. 3 is a flowchart showing a routine for providing an integrated navigation solution with optical samples and motion sensor data according to an embodiment.

To help illustrate the techniques of this disclosure, FIG. 3 depicts an exemplary routine for integrating optical samples and motion sensor data to provide a navigation solution for a device within a moving platform. Although described in the context of device 100 as depicted in FIG. 1, other architectures, including the one shown in FIG. 2, may be used as desired with the appropriate modifications. Beginning with 300, motion sensor data may be obtained for device 100, such as from sensor assembly 106. In one aspect, the sensor data may be inertial sensor data from one or more accelerometers, gyroscopes or other suitable motion and/or orientation detection sensors. In 302, optical samples are obtained for the platform. In 304, map information as described above may also be obtained for an environment encompassing the platform. In 306, an integrated navigation solution is generated based at least in part on the obtained motion sensor data. The integrated navigation solution may be generated using a nonlinear state estimation technique. Further, the nonlinear state estimation technique is configured to use a nonlinear measurement model as noted above. Consequently, the integrated navigation solution from the updated nonlinear state estimation technique may then be provided in 308.

Figure 4:
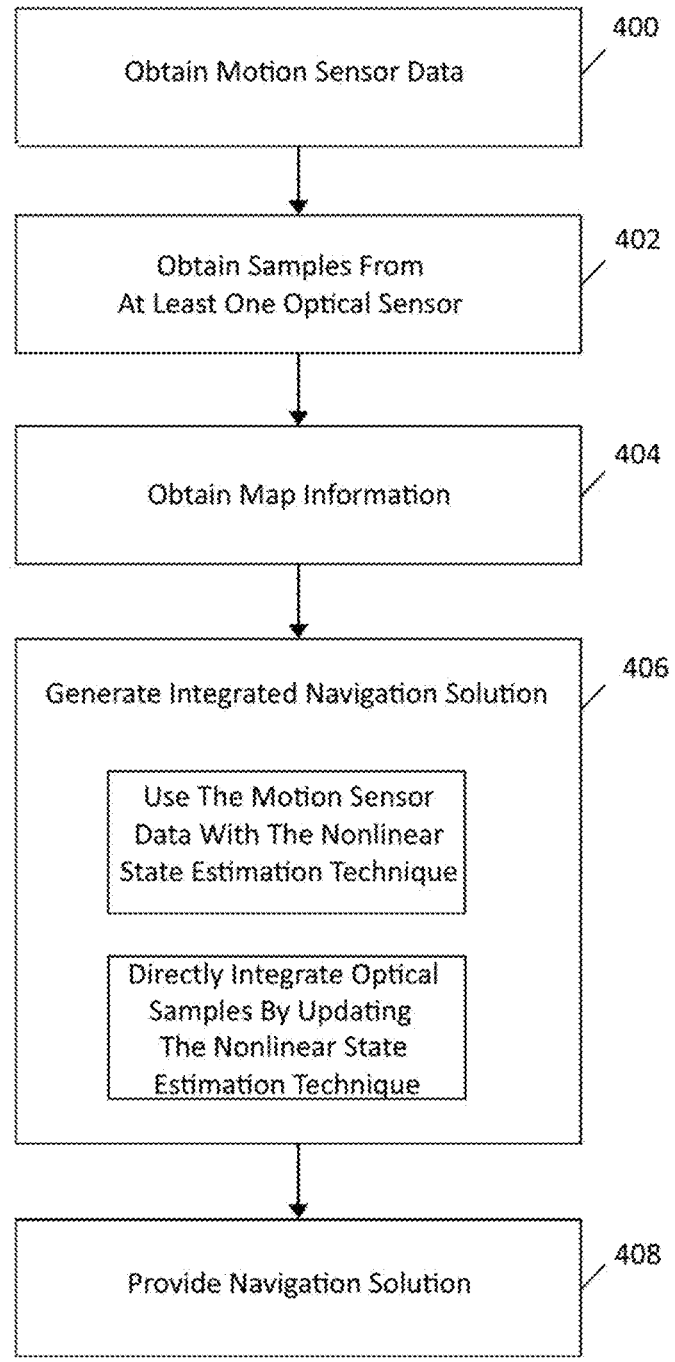
FIG. 4 is a flowchart showing further details of a routine for providing an integrated navigation solution with optical samples and motion sensor data according to an embodiment.

As a further example, FIG. 4 shows a routine for integrating optical samples and motion sensor data to provide a navigation solution for a device within a moving platform that includes obtaining motion sensor data in 400, obtaining optical samples 402, obtaining map information 404, generating an integrated navigation solution 406 and consequently providing the integrated navigation solution 408. In particular, the aspect of generating the integrated navigation solution of 406 may involve the indicated operations. In one aspect, generating the integrated navigation solution includes using the obtained motion sensor data in the nonlinear state estimation technique and then integrating the optical samples directly by updating the nonlinear state estimation technique using the nonlinear measurement models.

A state estimation technique, such as a filter, includes a prediction phase and an update phase (which may also be termed a measurement update phase). A state estimation technique also uses a system model and measurement model(s) based on what measurements are used. The system model is used in the prediction phase, and the measurement model(s) is/are used in the update phase. As such, the state estimation techniques of this disclosure use a measurement model for the optical samples so that the obtained optical samples directly update the state estimation technique. Further, according to this disclosure, the state estimation technique is nonlinear. The nonlinear models do not suffer from approximation or linearization and can enhance the navigation solution of the device when using very low-cost low-end inertial sensors. The optical measurement model(s) is/are nonlinear. The system models can be linear or nonlinear. The system model may be a linear or nonlinear error-sate system model. The system model may be a total-state system model, in most cases total-state system models are nonlinear. In the total-state approach, the state estimation or filtering technique is estimating the state of the device itself (such as position, velocity, and attitude of the device), the system model or the state transition model used is the motion model itself, which in case of inertial navigation is a nonlinear model, this model is a total-state model since the estimated state is the state of the navigation device itself. In the error-state approach, the motion model is used externally in what is called inertial mechanization, which is a nonlinear model as mentioned earlier, the output of this model is the navigation states of the module, such as position, velocity, and attitude. The state estimation or filtering technique estimates the errors in the navigation states obtained by the mechanization, so the estimated state vector by this state estimation or filtering technique is for the error states, and the system model is an error-state system model which transitions the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. Conventional, linear state estimation techniques, such as a Kalman filter (KF) or an extended Kalman filter (EKF) require linearized approximations. By avoiding the need for approximation by linearization, the nonlinear techniques of this disclosure can provide a more accurate navigation solution for the device.

As such, suitable methods for providing an integrated navigation solution for a device within a platform involve obtaining motion sensor data from a sensor assembly of the device, obtaining samples from at least one optical sensor for the platform and obtaining map information for an environment encompassing the platform. An integrated navigation solution is generated based at least in part on the motion sensor data using a nonlinear state estimation technique, wherein the nonlinear state estimation technique comprises using a nonlinear measurement model for optical samples. The integrated navigation solution is generated by using the obtained motion sensor data in the nonlinear state estimation technique and integrating the optical samples directly by updating the nonlinear state estimation technique using the nonlinear measurement models and the map information. The integrated navigation solution for the platform is then provided In one aspect, the measurement model comprises at least one of i) an optical range-based model based at least in part on a probability distribution of measured ranges using an estimated state of the platform and the map information; ii) an optical nearest object likelihood model based at least in part on a probability distribution of distance to an object detected using the optical samples, an estimated state of the platform and a nearest object identification from the map information; iii) an optical map matching model based at least in part on a probability distribution derived by correlating a global map derived from the map information to a local map generated using the optical samples and an estimated state of the platform; and iv) an optical closed-form model based at least in part on a relation between an estimated state of the platform and ranges to objects from the map information derived from the optical samples.

In one aspect, the method may involve determining depth information for objects detected within the optical samples by at least one of i) estimating depth for an object and deriving range, bearing and elevation; and ii) obtaining depth readings for an object from the at least one optical sensor and deriving range, bearing and elevation. A scene reconstruction operation may be performed for a local area surrounding the platform based at least in part on the determined depth information for objects detected within the optical samples. A deep neural network.may be employed and may be one one of a convolutional neural network and a recurrent neural network. A correlation indicator may be computed by comparing the scene reconstruction with the obtained map information. A probability of a current state of the platform may be estimated based at least in part on the correlation indicator and prior probabilities.

In one aspect, the nonlinear measurement model may include models for optical sensor-related errors comprising any one or any combination of environmental errors, sensor-based errors and dynamic errors.

In one aspect, the nonlinear measurement model may be configured to handle errors in the map information.

In one aspect, the nonlinear state estimation technique may be at least one of i) an error-state system model; ii) a total-state system model, wherein the integrated navigation solution is output directly by the total-state model; and iii) a system model receiving input from an additional state estimation technique that integrates the motion sensor data. The nonlinear state estimation technique may be an error-state system model and providing the integrated navigation solution may involve correcting an inertial mechanization output with the updated nonlinear state estimation technique. The system model may be a system model receiving input from an additional state estimation technique, such that the additional state estimation technique integrates any one or any combination of i) inertial sensor data; ii)odometer or means for obtaining platform speed data; iii) pressure sensor data; iv) magnetometer data; and v) absolute navigational information. The system model of the nonlinear state estimation technique may also include a motion sensor error model.

In one aspect, the nonlinear state estimation technique may be at least one of i) a Particle Filter (PF); ii) a PF, wherein the PF comprises a Sampling/Importance Resampling (SIR) PF; and iii) a PF, wherein the PF comprises a Mixture PF.

In one aspect, the method may involve determining a misalignment between a frame of the sensor assembly and a frame of the platform, wherein the misalignment is at least one of i) a mounting misalignment; and ii) a varying misalignment.

In one aspect, the method may involve determining a misalignment between a frame of the sensor assembly and a frame of the platform, wherein the misalignment is determined using any one or any combination of i) a source of absolute velocity; ii) a radius of rotation calculated from the motion sensor data; and iii) leveled horizontal components of acceleration readings along forward and lateral axes from the motion sensor data.

In one aspect, the method may include integrating a source of absolute navigational information with the integrated navigation solution.

In one aspect, the method may include building a map of objects detected using the optical samples, wherein the map is built using a simultaneous localization and mapping technique.

Correspondingly, a system for providing an integrated navigation solution for a device within a platform according to this disclosure may have a device with a sensor assembly configured to output motion sensor data, at least one optical sensor configured to output samples for the platform and at least one processor, coupled to receive the motion sensor data, the optical samples, and map information for an environment encompassing the platform, and operative to generate an integrated navigation solution based at least in part on the motion sensor data using a nonlinear state estimation technique, wherein the nonlinear state estimation technique comprises using a nonlinear measurement model for optical samples. The at least one processor may be operative to generate the integrated navigation solution by using the obtained motion sensor data in the nonlinear state estimation technique and integrating the optical samples directly by updating the nonlinear state estimation technique using the nonlinear measurement models and the map information. The at least one processor may then provide the integrated navigation solution.

In one aspect, The system of claim 20, wherein the nonlinear state estimation technique may be least one of i) an error-state system model; ii) a total-state system model, wherein the integrated navigation solution is output directly by the total-state model; and iii) a system model receiving input from an additional state estimation technique that integrates the motion sensor data.

In one aspect, the sensor assembly may include an accelerometer and a gyroscope. The sensor assembly may be implemented as a Micro Electro Mechanical System (MEMS).

In one aspect, the system may also have a source of absolute navigational information.

In one aspect, the system may have any one or any combination of A) an odometer or means for obtaining platform speed; B) a pressure sensor; and C) a magnetometer.

EXAMPLES

It is contemplated that the present methods and systems may be used for any application involving integrating optical samples with motion sensor data to provide a navigation solution. Without any limitation to the foregoing, the present disclosure is further described by way of the following examples.

Figure 5:
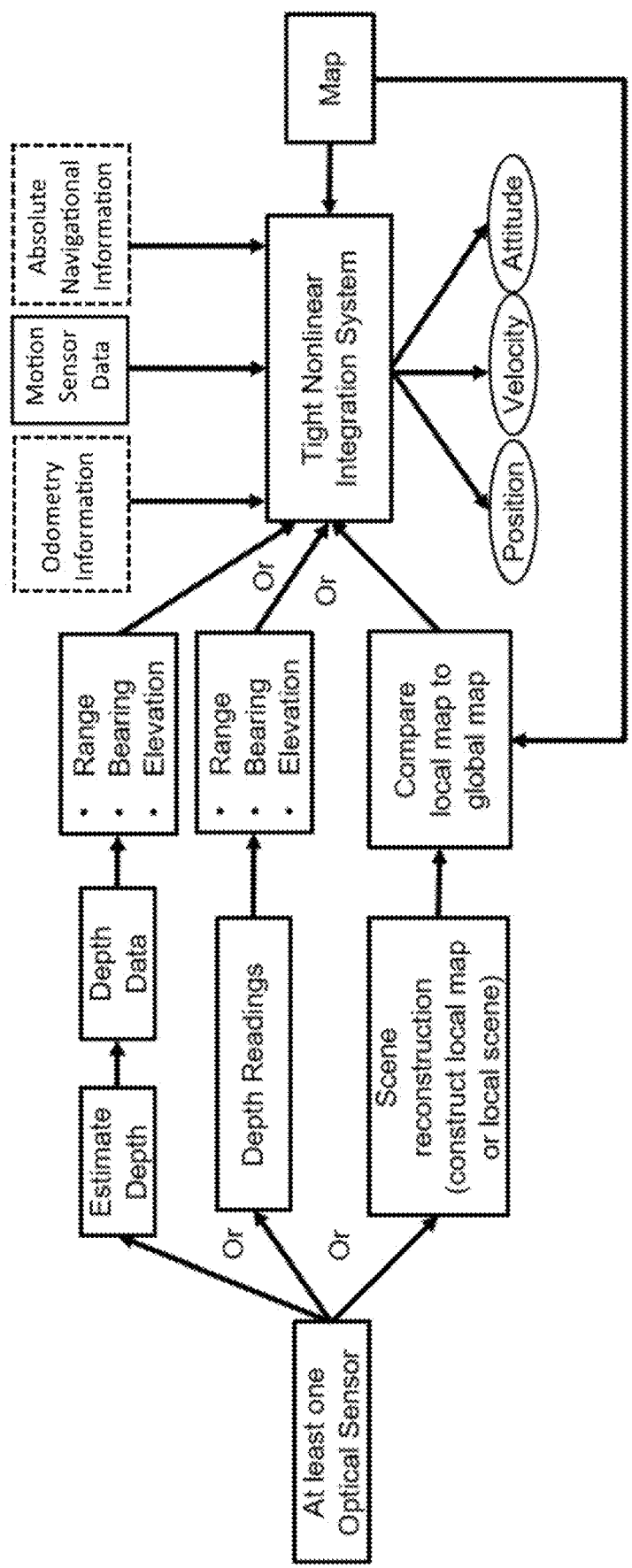
FIG. 5 is a schematic representation of an exemplary system architecture for providing an integrated navigation solution with optical samples and motion sensor data according to an embodiment.
Figure 6:
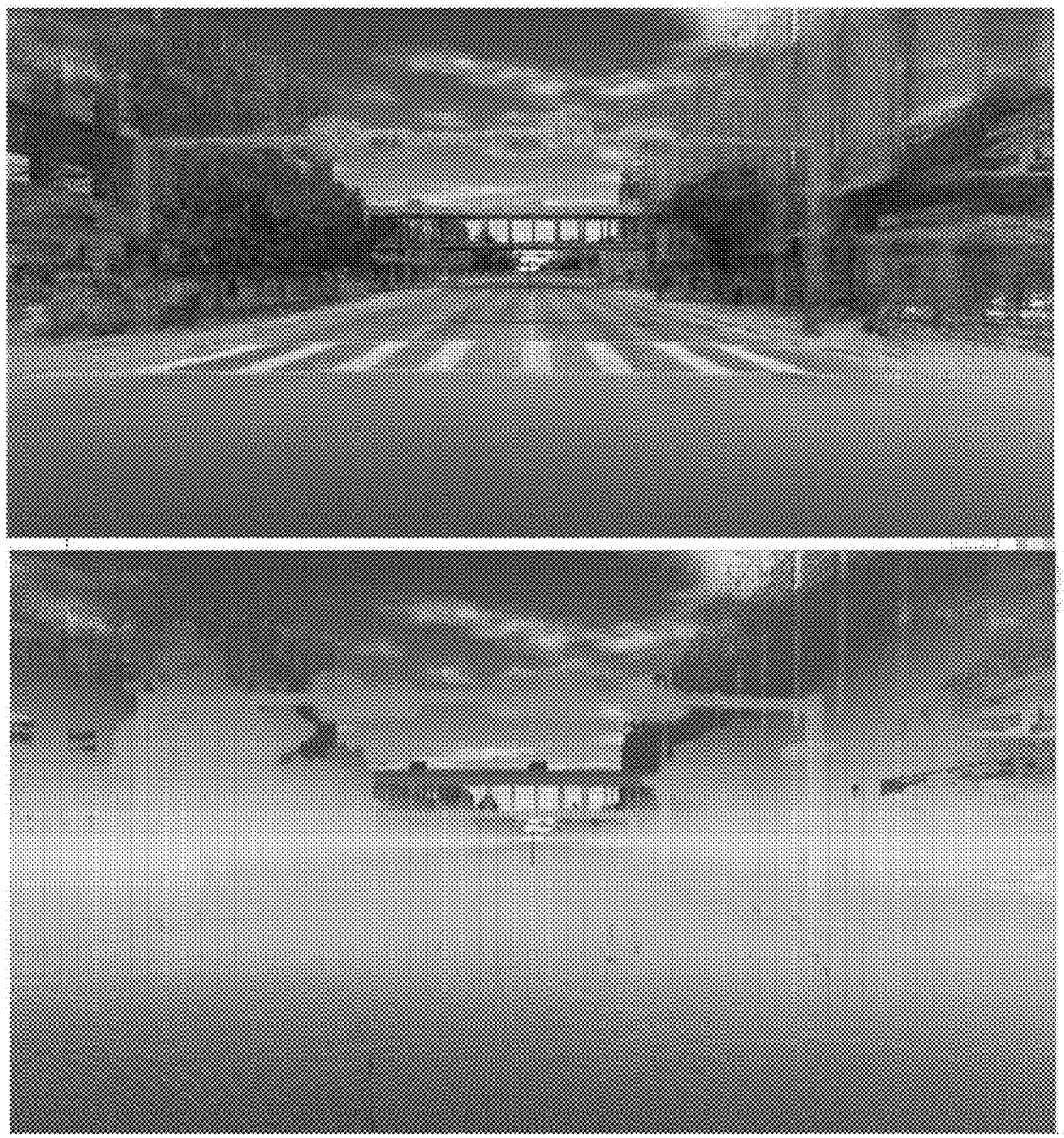
FIGS. 6 and 7 are graphic representations of scene reconstruction according to an embodiment.
Figure 7:
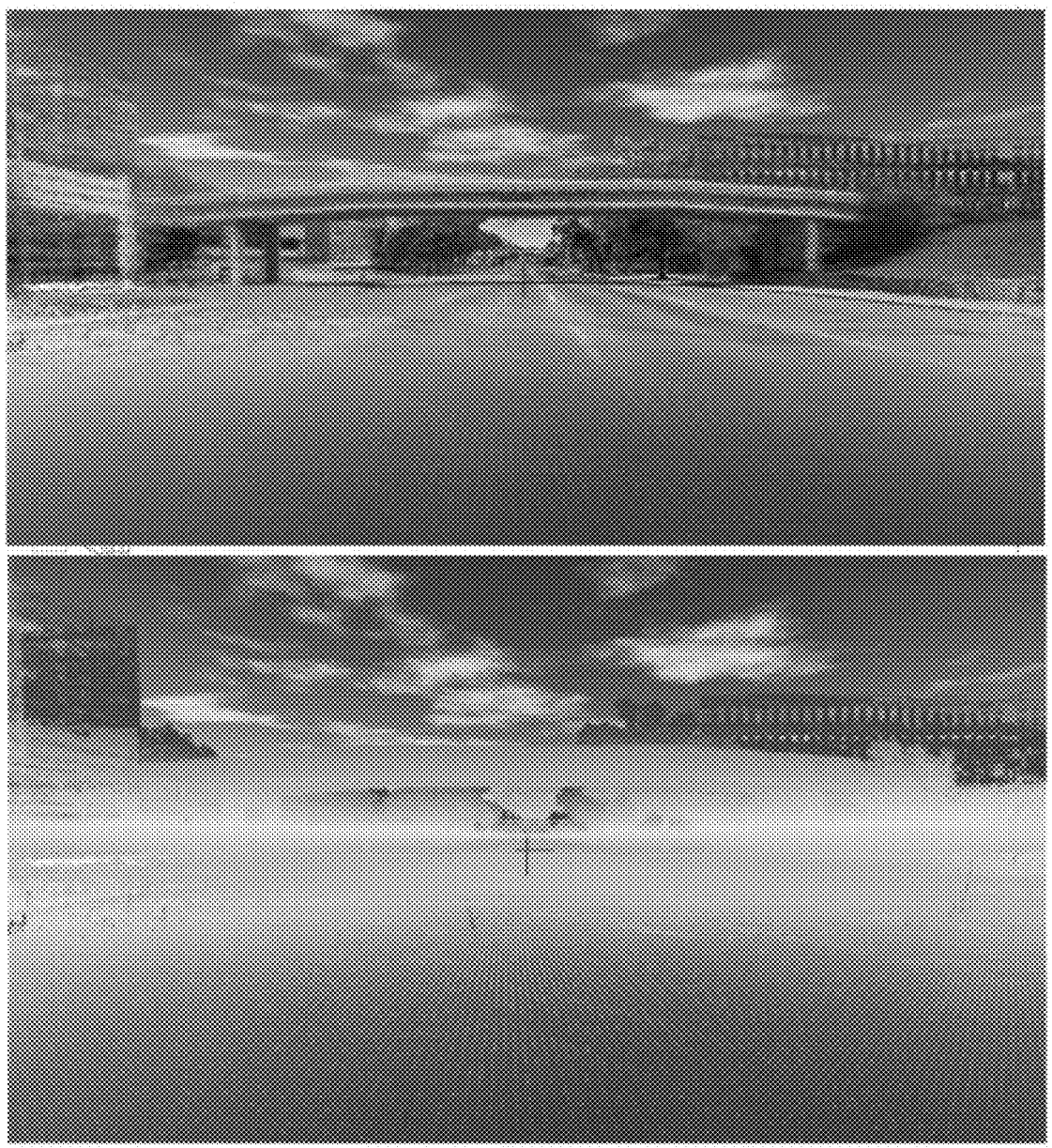

Turning first to FIG. 5, one exemplary system architecture for implementing the techniques of this disclosure is schematically depicted. As shown, input information comes from the at least one optical sensor, such as optical sensor(s) 112 or optical sensor(s) 222 in the embodiments discussed above. In this architecture, different methods may be employed for determining depth information for objects within the optical samples. The upper branch shown in FIG. 5 represents estimating depth to provide depth data for objects detected within the optical samples. From the depth estimation, range, bearing and elevation for the objects may be extracted and fed to the nonlinear state estimation technique. In some embodiments, the depth information can be estimated using neural network techniques as discussed below. Alternatively or in addition, the middle branch in FIG. 5 can be employed when depth readings are directly available from the at least one optical sensor, such as when using stereo sensors or when a stream of samples are available. Similarly, range, bearing and elevation for objects within the samples may be extracted and fed to the nonlinear state estimation technique. Neural network techniques can also be applied. The lower branch involves reconstructing a scene representing a local environment surrounding the platform based on information from the at least one optical sensor, including the depth information discussed above. Then, the reconstructed local map can be compared to the global map of the obtained map information and the correlations fed to the nonlinear state estimation technique. Once more, neural network techniques can be employed during scene reconstruction. To help illustrate, two examples of scene reconstruction are shown in FIGS. 6 and 7, with the top view in each depicting the respective optical sensor samples and the bottom view depicting the reconstructed scenes.

Returning to FIG. 5, the nonlinear state estimation technique also receives map information and motion sensor data for the platform. In some embodiments, odometry information and/or absolute navigational information can also be fed to the nonlinear state estimation technique if available. These additional sources of information are optional as indicated by the dashed boxes. Based on the tight integration of this input information, the nonlinear state estimation technique can then provide an integrated navigation solution for the platform, as indicated by the outputs of position, velocity and/or attitude.

Figure 8:
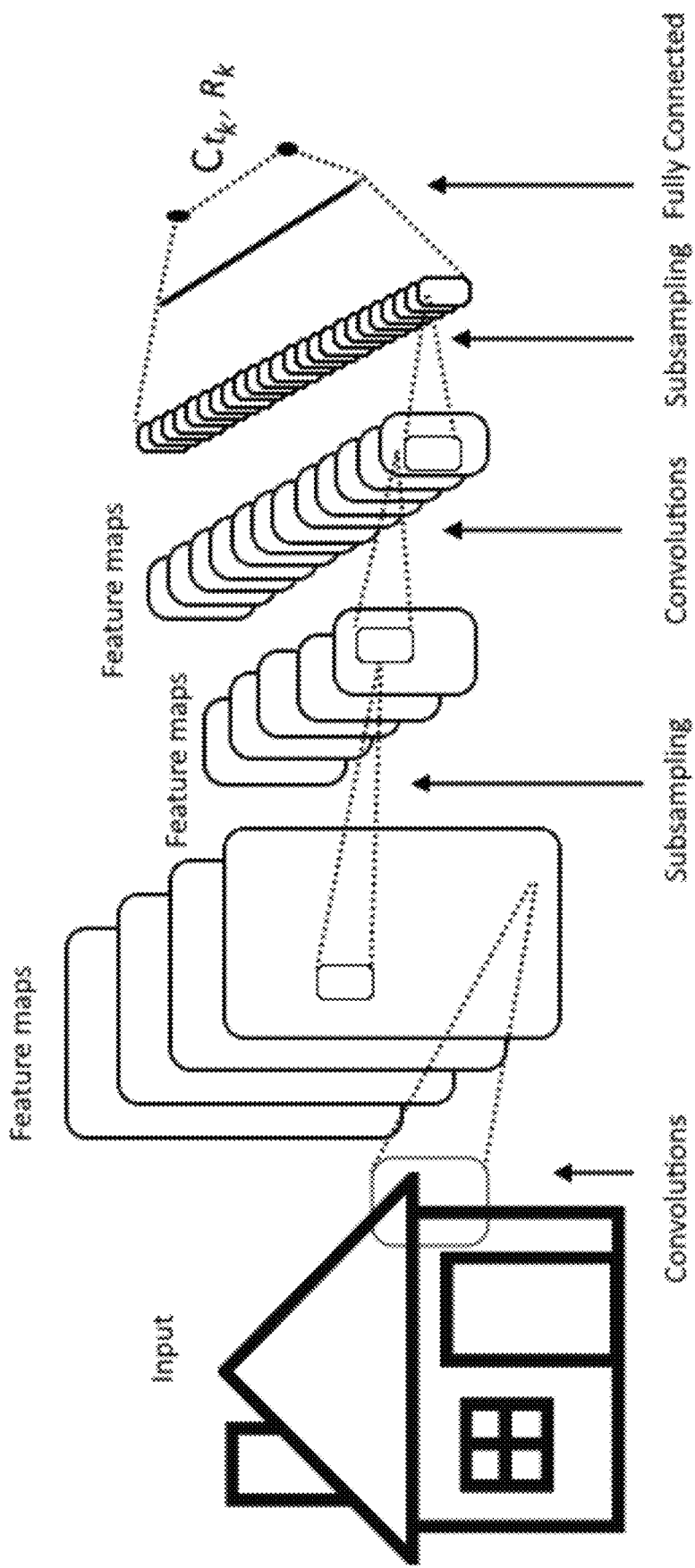
FIG. 8 is a schematic representation of a convolutional neural network suitable for helping provide an integrated navigation solution with optical samples and motion sensor data according to an embodiment.
Figure 9:
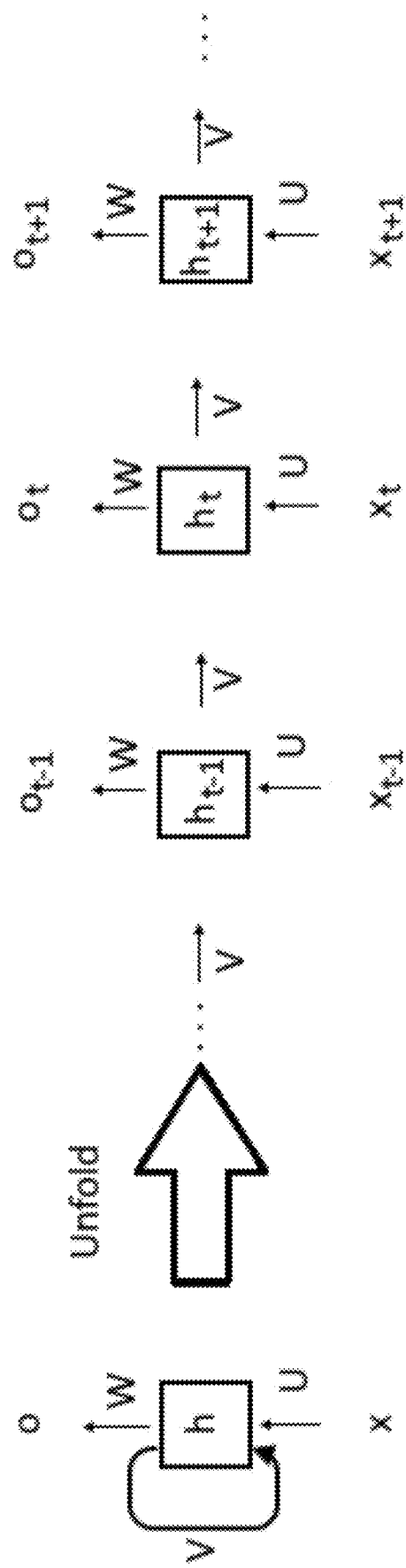
FIG. 9 is a schematic representation of a recurrent neural network suitable for helping provide an integrated navigation solution with optical samples and motion sensor data according to an embodiment.

As noted above, the techniques of this disclosure can benefit from the use of neural networks when processing the optical samples. In particular, neural networks and deep learning may help mitigate some of the drawbacks of other depth-from-vision techniques. For example, the depth information can be learned from stereo images or a stream of images from a monocular camera, so that neural network and deep learning is used to estimate the depth in real-time using either the same sensor used during training or a different one. As an illustration, a stereo optical sensor may be used during training and a monocular optical sensor may be used in real-time. As used herein, the term "deep neural network" refers to a neural network that has multiple layers between the input and output layers. One suitable deep neural network is a convolutional neural network (CNN) as schematically represented in FIG. 8. The alternating operations of using convolutions to produce feature maps and reducing the dimensionality of the feature maps with subsamples leads to a fully connected output that provides the classification of the object. The depth of the neural network is governed by the number of filters used in the convolution operations, such that increasing the number of filters generally increases the number of features that can be extracted from the optical sample. Another suitable deep neural network is a recurrent neural network (RNN) as schematically represented in FIG. 9. The left side of the figure shows the input, x, progressing through the hidden state, h, to provide the output, o. U, V, W are the weights of the network. The connections between nodes form a directed graph along a temporal sequence as indicated by the unfolded operations on the right side of the figure.

1 Optical Measurement Model Embodiments

As noted above, a nonlinear measurement model of the optical samples is used to directly update the nonlinear state estimation technique used to provide the integrated navigation solution. As one example, the optical sensor data comprises information for a given sample covering the field of view of the optical sensor. A measurement vector may be denoted by the set $\rho_t = \{\rho_t^0, \rho_t^1, \ldots, \rho_t^{K-1}\}$, where K is the total number of measurements per sample. In a 2D optical sensor system, measurement is usually along the azimuth angle. Therefore, $\rho_t^k$ represents the measured range at $k^{th}$ bearing angle. In a 3D optical sensor system, the measurement vector can be represented by the 2D list $\rho_t = \{\rho_t^{(\alpha_0, \beta_0)}, \ldots, \rho_t^{(\alpha_{N-1}, \beta_{M-1})}\}$, where N and M represent the number of scanning bins in the azimuth and elevation angle respectively. The Markov property is assumed to be valid for the measurements. In other words, there is no dependence between the error in measurements over time. The aim is to model the probability of a measurement denoted by $\rho_t$, given the knowledge of the map m, and the state of the vehicle at time t denoted by $x_t$. It may be assumed that the measurements at different angles from one sample are independent (the error in distance range at one angle is independent of the error in distance range at another angle). The following discussion is in the context of a 2D optical system, however, the 3D optical model can be extended from the 2D optical measurement model easily. The probability of the measurement vector $\rho_t$, given m and $x_t$, may be represented as $$p(\rho_t | x_t, m) = \prod_{k=0}^{K-1} p(\rho_t^k | x_t, m).$$

Using the independence assumption between measurements, the probability of a sample is represented as the multiplication between the probability of each individual measurement given the knowledge of the map and the state of the vehicle. These assumptions are used to simplify the modelling process. Four different optical measurement models using different modelling techniques are detailed below, but other models may be employed as desired.

1.1 Range-Based Model Embodiments

One suitable optical measurement model is a range-based measurement model. Based on the true range between a static optical sensor and a static target, the model describes the error distribution of the depth data from the estimated depth or the depth readings for this range (given that multiple measurements of the same static target are available), as expressed by the probability density function: $p(\rho_t^k | x_t, m)$. In other words, given the knowledge of the map (whether feature-based or location map) and an estimate of the state of the platform, what is the probability distribution of the measured range. Here, k refers to the $k^{th}$ range at a certain (azimuth/elevation) angle. Deriving $p(\rho_t | x_t, m)$ from $p(\rho_t^k | x_t, m)$ is a matter of multiplication of probabilities of all ranges.

1.1.1 Ray Casting Embodiments

For range-based modelling, the true range to the target in the map (this may include a feature-based map, location-based map or both) may be computed based on the estimate of the state of the platform. This is done by using ray casting algorithms, denoting the true range by $\rho_t^{k,true}$. To estimate the range between the vehicle and the target in a map, a ray may be simulated to move in a straight line until it either hits a target in the map or exceeds a certain distance. The ray's direction in 3D is based on the reported state of the platform (which may include position and orientation and may also be termed "pose") and the bearing of this specific measurement. A conversion between the optical sensor coordinate frame and the vehicle coordinate frame may establish the starting point and direction of the ray relative to the state of the vehicle. Using this technique, the true range $\rho_t^{k,true}$ from the optical sensor to the target may be found. It is important to note that a target must be in the map for this operation to make sense. If the target is not in the map (i.e., another moving vehicle or a pedestrian), it should be detected before the ray casting algorithm is called. For now, only static targets will be considered by the ray casting model.

Figure 10:
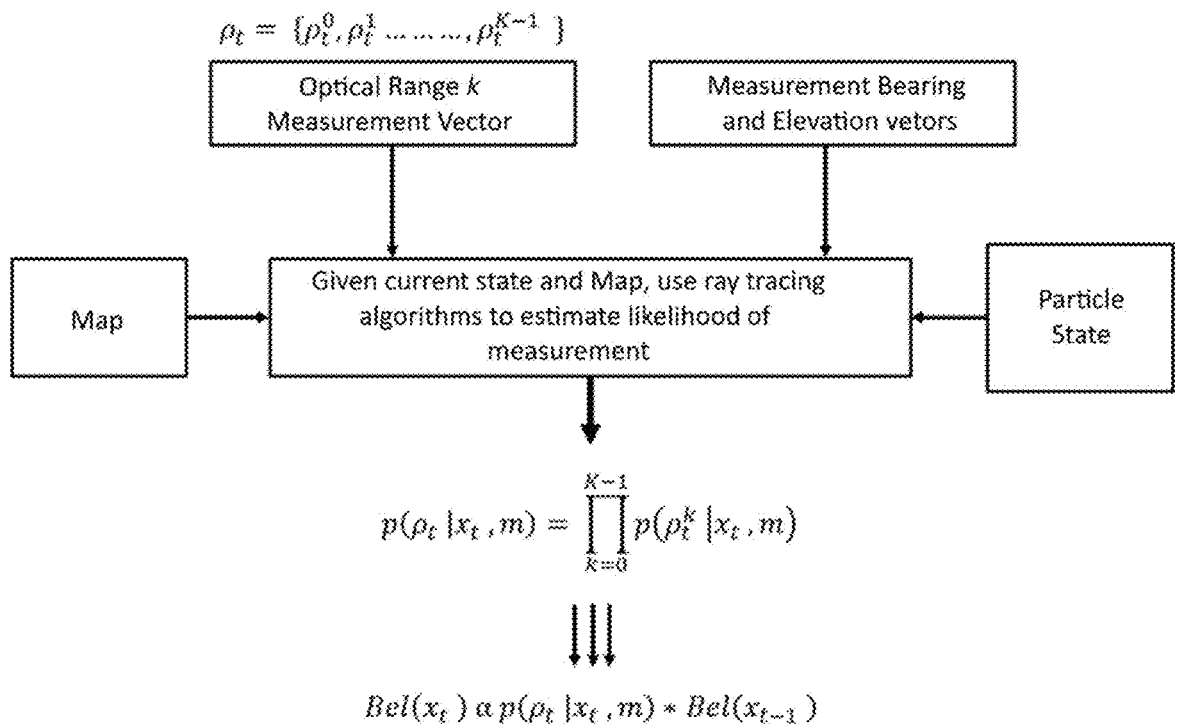
FIG. 10 is a schematic representation of use of an optical range-based measurement model according to an embodiment.

A schematic depiction of an architecture using a range-based optical model to estimate the probability of the current state of the platform is shown in FIG. 10. Here, particle state refers to the state of the vehicle at time t. The input to the system is the optical range measurements along with their respective bearing and elevation angles, such as from the depth data from the estimated depth or the depth readings discussed with regard to FIG. 5. Given the state of the platform and the map, ray casting may be used to estimate $p(\rho_t | x_t, m)$. Finally, to estimate the probability of the current state denoted by Bel($x_t$), the belief in the current state is proportional to the probability of the measurement given the state $x_t$ and the map, times the prior probability of the previous state denoted by Bel($x_{t-1}$).

1.1.2 Error Modeling Embodiments

Given the estimation of the true range to the target using an initial estimate of the platform's state a given map, various factors may affect the measurement error of the optical sensor. The measurement model of this disclosure is configured to handle errors, such as by being adaptive to help compensate for these errors or otherwise intelligently cope with the existence of errors so that the measurement model can still provide good results and operate well despite the errors. The sources of range errors may be separated into three categories; the first source of errors is environmental factors affecting the optical sensor, the second source of errors are inherent in the sensor itself and the third source of errors is related to the dynamics of the vehicle relative to the target.

Regardless of the source of error, the measurement error due to a specific error source may be modeled as a Gaussian distribution with mean $\rho_t^{k,true}$ and standard deviation denoted by $\sigma_{err}$. Also, the distribution between the minimum range denoted by $\rho_{min}$ and the maximum range of the optical sensor denoted by $\rho_{max}$ (i.e., an optical sensor can measure within a limited range) may be limited. Hence, the probability distribution of the optical measurement model can be modelled as for the range [$\rho_{min}$, $\rho_{max}$] and zero otherwise, where the numerator refers to a normally distributed random variable with mean $\rho_t^{k,true}$ and standard deviation $\sigma_{err}$:

$$p(\rho_t | x_t, m) = \frac{e^{-\frac{1}{2}\frac{(\rho_t^k - \rho_t^{k,true})^2}{\sigma_{err}^2}} / \sqrt{2\pi\sigma_{err}^2}}{\frac{1}{\sqrt{2\pi\sigma_{err}^2}} \int_{\rho_{min}}^{\rho_{max}} \left( e^{-\frac{1}{2}\frac{(\rho_t^k - \rho_t^{k,true})^2}{\sigma_{err}^2}} \right) d\rho_t^k}$$

The denominator represents the normalizing factor of the probability density function $p(\rho_t | x_t, m)$, which is computed by integrating the numerator (i.e., the normal distribution) within the optical sensor's coverage range [$\rho_{min}$, $\rho_{max}$], leaving the only missing parameter to define $\sigma_{err}$.

Different sources of error have different effects on the variance of the measurement model. Three sources of error identified above may be considered when building a probabilistic measurement model. The first source of errors is environmental factors including weather conditions like rain, fog and snow. The second source of error is inherent in the design of the optical sensor itself. This error can be modelled using $-\sigma_{err}$. The final source of error is related to the dynamics of the optical sensor relative to a static or dynamic target. Generally, these errors reflect the effect of position, speed and direction of motion of the target on the range estimation accuracy. For example, some optical sensors may exhibit greater aberrations at the periphery of the field of view. Moreover, the range estimation accuracy might also be affected by the speed of the vehicle. Hence, these errors can also be modelled using the standard deviation of our adaptive model. It is also worth noting that the speed of the target relative to the optical sensor has the same effect on the bearing estimation.

Figure 11:
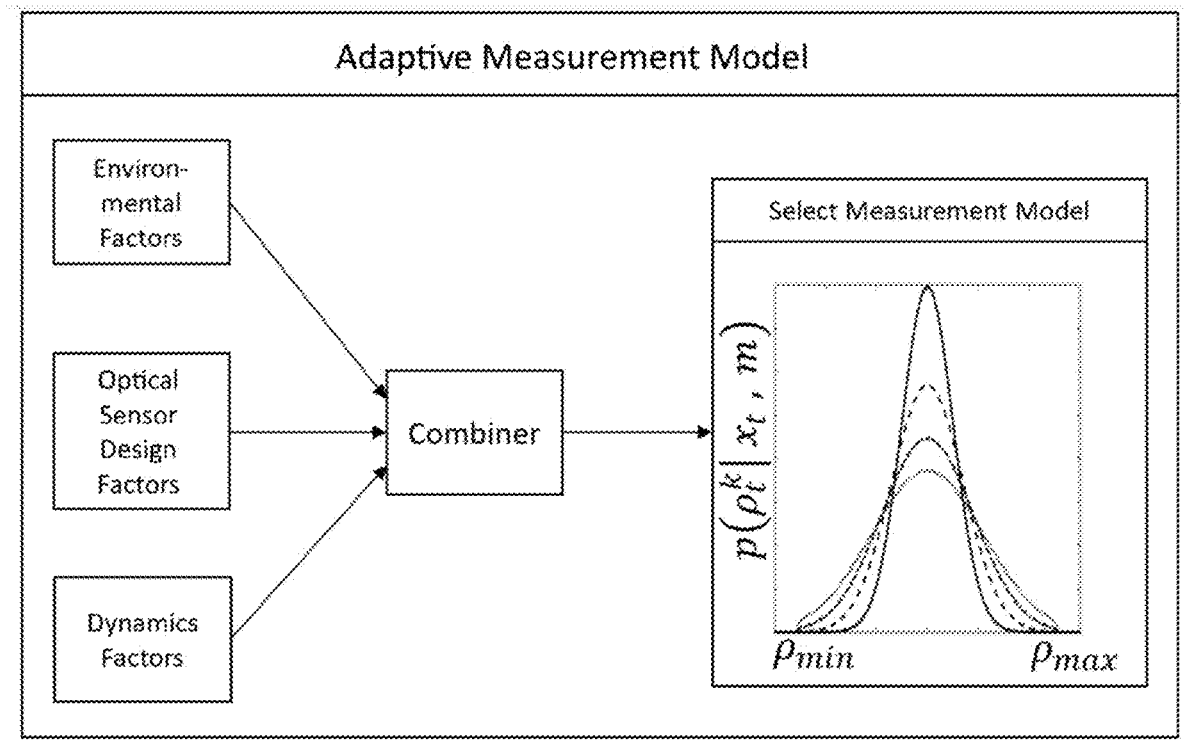
FIG. 11 is a schematic representation of an adaptive measurement model according to an embodiment.

Taking the above factors into consideration, one suitable Adaptive Measurement Model (AMM) is schematically depicted in FIG. 11. As shown, each block on the right-hand side represents the three different factors that might affect the variance of the measurement model, namely; Environmental factors, Optical Sensor Design factors and (platform) Dynamics factors. For example, a non-linearity of the optical sensor design affecting the range estimation has a variance of $\sigma_{non-lin}^2$. As an example, in raining environmental conditions, an error would be introduced to the range measurement denoted by $\sigma_{rain}^2$. These variances are sent to the Combiner as indicated, with the assumption that both errors are independent random variables. Hence, the measured range can be represented as $\rho_t^k = \rho_t^{k,true} + \text{err}_{non-lin} + \text{err}_{rain}$, where $\text{err}_{non-lin} \sim N(\mu_{non-lin}, \sigma_{non-lin}^2)$ and $\text{err}_{rain} \sim N(\mu_{rain}, \sigma_{rain}^2)$ Correspondingly, the distribution of the resulting measurement model can be represented as:

$$\rho_t^k \sim N(\mu_{non-lin} + \mu_{rain}, \sigma_{non-lin}^2 + \sigma_{rain}^2)$$

To generalize, for E number of independent sources of error, the probability distribution of optical measurement is given by $$\rho_t^k \sim N\left(\sum_{e=0}^{E-1} \mu_i, \sum_{e=0}^{E-1} \sigma_i^2\right),$$

with the Combiner block estimating the resulting mean and variance of the measurement model based on the availability of error sources.

1.1.3 Parameter Estimation Embodiments

Notably, building the AMM model may involve identifying the mean and variance of each source of error. Once these parameters are estimated, an approximate PDF for the current measurement may be built. To so do, either a field expert's intuitions or design experiments may be used to collect data depending on the source of error and then attempt to find the best normal distribution that would fit the collected data. Once the fittest distribution is found, the mean and variance of the error source under investigation may be extracted. This mean and variance can then be saved for us to use when the same conditions road conditions apply.

1.2 Nearest Object Likelihood Model Embodiments

Another suitable optical measurement model is a nearest object likelihood (NOL) measurement model that features reduced computational complexity as compared to the ray casting for each possible state used in the range-based measurement model. Under this approach, the optical sensor position is first converted from the local frame to the global frame. Assuming the optical sensor is positioned at $(x_{opt}^i, y_{opt}^i, z_{opt}^i)$ relative to the platform's local frame, and the current state of the platform in the global frame is denoted by $(x_t, y_t, z_t)$, then the position of the optical sensor in the global frame can be represented by $$\begin{bmatrix} x_{opt,t} \\ y_{opt,t} \\ z_{opt,t} \end{bmatrix} = \begin{bmatrix} x_t \\ y_t \\ z_t \end{bmatrix} + R_l^g \begin{bmatrix} x_{opt}^l \\ y_{opt}^l \\ z_{opt}^l \end{bmatrix}.$$

The rotational matrix $R_l^g$ is the rotation from local to the global frame represented by $$R_l^g = \begin{bmatrix} \cos(\varphi)\cos(\psi) + \sin(\varphi)\sin(\theta)\sin(\psi) & \sin(\varphi)\cos(\theta) & \cos(\varphi)\sin(\theta)\sin(\psi)\cos(\psi) \\ \sin(\varphi)\cos(\psi) + \cos(\varphi)\sin(\theta)\sin(\psi) & \cos(\varphi)\cos(\theta) & \sin(\varphi)\sin(\theta)\cos(\psi)\sin(\theta)\cos(\psi) \\ \cos(\theta)\sin(\psi) & \sin(\theta) & \cos(\theta)\cos(\psi) \end{bmatrix}$$

with the current roll, pitch and azimuth angles denoted by $\psi$, $\theta$ and $\varphi$ respectively.

The optical sensor position in the global frame may be denoted $(x_{opt,t}, y_{opt,t}, z_{opt,t})$, which can be correlated to a position in the map information. The next step is to project the position of the optical sensor in the global frame based on the current measurement $\rho_t^k$. By doing so, the position of the object that was detected by the optical sensor resulting in the current measurement is estimated in the global frame. Assuming that the optical measurement $\rho_t^k$ is measured at an azimuth and elevation angle of $\phi_{opt,t}^k$ and $\theta_{opt,t}^k$ respectively, the 3D projection of the measurement vector $\rho_t^k$ in the map can be represented by $$\begin{bmatrix} x_{opt,t}^k \\ y_{opt,t}^k \\ z_{opt,t}^k \end{bmatrix} = \begin{bmatrix} x_{opt,t} \\ y_{opt,t} \\ z_{opt,t} \end{bmatrix} + R_l^g \begin{bmatrix} \rho_t^k \cos(\theta_{opt,t}^k)\cos(\phi_{opt,t}^k) \\ \rho_t^k \cos(\theta_{opt,t}^k)\sin(\phi_{opt,t}^k) \\ \rho_t^k \sin(\theta_{opt,t}^k) \end{bmatrix}$$

Then, the nearest object in the map to the projected position denoted by $(x_{opt,t}^k, y_{opt,t}^k, z_{opt,t}^k)$ may be searched. Here, it is assumed that the likelihood $p(\rho_k^t | x_t, m)$ is equal to a Gaussian distribution with zero mean and variance $\sigma_{near}^2$ representing the error in Euclidian distance between the projected position and the nearest object in the map. Hence, the probability of a set of measurements given the state of the vehicle and a map, can be represented as $$p(\rho_t | x_t, m) \alpha \prod_{k=0}^{K-1} p(D = dist^k), \text{ where } D \sim N(0, \sigma_{near}^2)$$

and $dist^k$ is the distance between the projected position of measurement k and the nearest object in the map.

Figure 12:
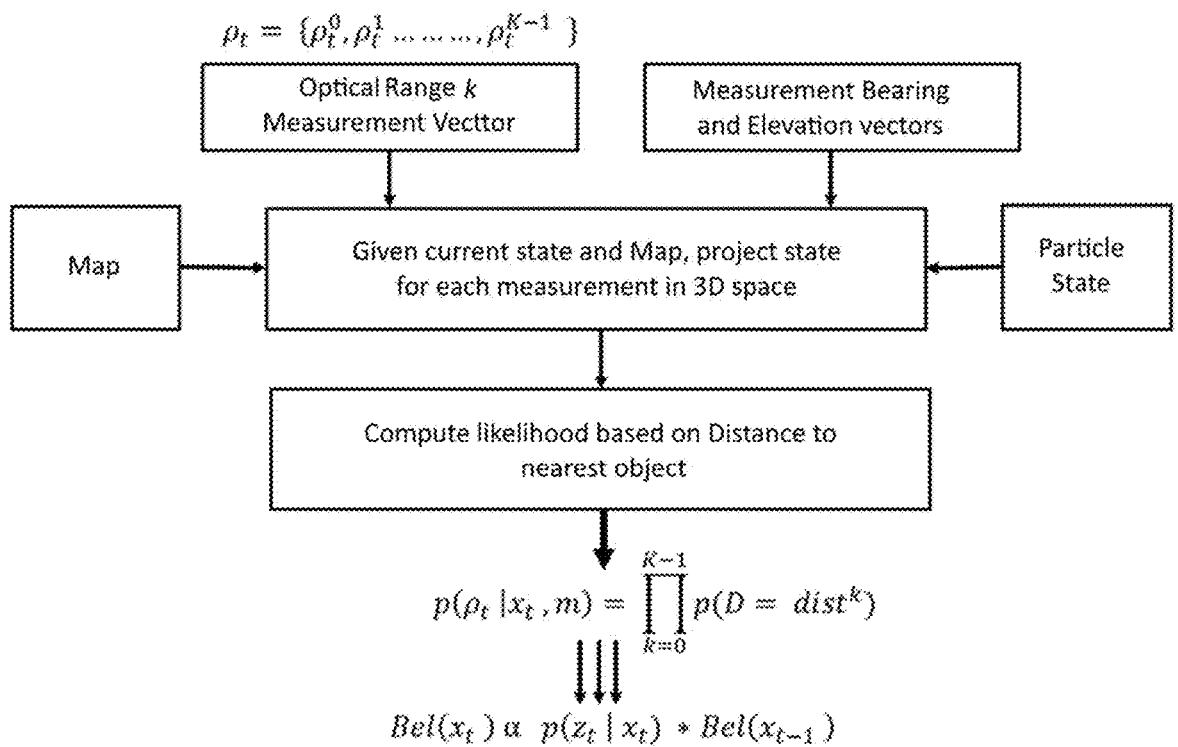
FIG. 12 is a schematic representation of use of an optical nearest object likelihood measurement model according to an embodiment.

One suitable architecture for estimating the probability of a platform state based on an optical NOL measurement model is schematically depicted in FIG. 12 to estimate belief in the current state of the vehicle. Here, particle state refers to the pose of the vehicle at time t. The input to the system is the optical range measurements along with their respective bearing and elevation angles. Given the state of the vehicle and the map, the optical sensor's pose is projected in 3D space for each measurement. Based on the distance to the nearest objects from each projection, $p(\rho_t | x_t, m)$ is estimated. The probability of the current state denoted by $Bel(x_t)$ is correspondingly proportional to the probability of the measurement given the state $x_t$ and the map, times the prior probability of the previous state denoted by $Bel(x_{t-1})$. As will be appreciated, the error compensation techniques discussed above for a range-based measurement model, such as those discussed in Section 1.1.2, may also be applied to the NOL measurement model.

1.3 Map Matching-Based Model Embodiments

Yet another suitable optical measurement model is a map matching model that features the capability of considering objects that are not detected by the optical sensor by matching between a local map and a global map when assessing the likelihood of a sample given knowledge of the platform state and the map. The local map is defined as a map created based on optical sensor samples, such as through scene reconstruction as discussed above. The global map can either be a feature-based or location-based map as discussed above. As one example, assume a grid-map of the environment encompassing the platform is denoted by $m^{gl}$ and the measurement $z_t$ is converted into a local grid-map denoted by $m^{loc}$. The local map must be defined in the global coordinate frame using the rotational matrix $R_l^g$. The representation of what is in the grid cells of both the global and local map may reflect whether an object exists in this cell (Occupancy Grid Map (OGM)).

Assuming a 3D map, the center of a grid cell in the global and local map can be denoted by $m_{x,y,z}^{gl}$ and $m_{x,y,z}^{loc}$ respectively. The linear correlation can be used to indicate the likelihood of the current local map matching the global map, given the current state of the platform. By denoting to the mean of the relevant section of the global map by $\overline{m}^{gl}$, the mean of the local map by $\overline{m}^{loc}$, and the standard deviation of the global and local map as $\sigma_{m^{gl}}$ and $\sigma_{m^{loc}}$ respectively, the correlation coefficient between the local and global map is then represented by:

$$p(m^{loc} | x_t, m) = \text{Corr}_{m^{gl}, m^{loc}}$$
$$= \Sigma_{x,y,z}((m_{x,y,z}^{loc} - \overline{m}^{loc})(m_{x,y,z}^{gl} - \overline{m}^{gl}))/(\sigma_{m^{gl}} \sigma_{m^{loc}})$$

The correlation coefficient ranges between +1 and −1, but all negative correlations may be assumed to be equal to 0 when only the existence of positive correlation or no correlation at all is relevant, allowing the likelihood of the measurement to be represented as $p(\rho_t | x_t, m) \propto \max(\text{Corr}_{m^{gl}, m^{loc}}, 0)$.

Figure 13:
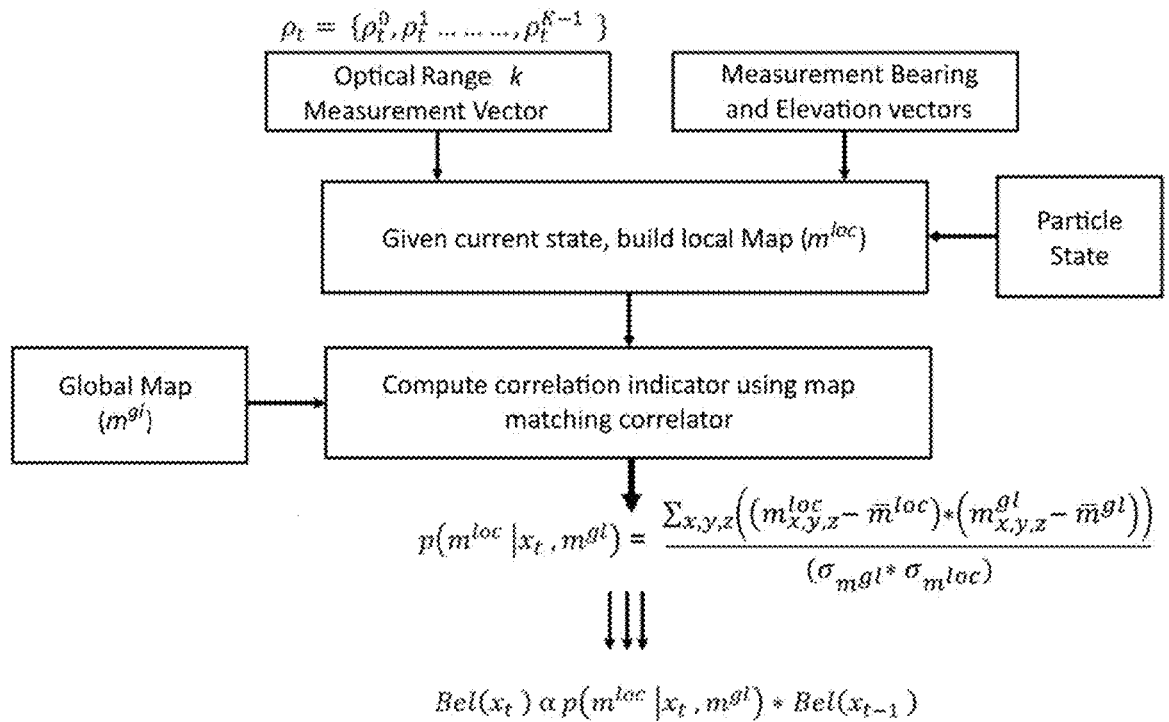
FIG. 13 is a schematic representation of use of an optical map matching measurement model according to an embodiment.

A schematic illustration of one possible architecture for a optical map matching measurement model that may be used to estimate belief in the current state of the platform is depicted in FIG. 13. Here, particle state refers to the state of the platform at time t. The input to the system is the optical range measurements along with their respective bearing and elevation angles. Given the state of the vehicle and the optical samples, a local map (e.g., a 2D or 3D occupancy grid) denoted by $m^{loc}$ may be built. Then, using the same representation of the global map denoted by $m^{gl}$, the correlation between the global and the local map may be computed and used as an indicator for $p(\rho_t | x_t, m)$. Finally, to estimate the probability of the current state denoted by Bel($x_t$), the belief in the current state is proportional to the probability of the measurement given the state $x_t$ and the map, times the prior probability of the previous state denoted by Bel($x_{t-1}$). As will be appreciated, the error compensation techniques discussed above for a range-based measurement model, such as those discussed in Section 1.1.2, may also be applied to the map matching measurement model.

1.4 Closed-Form Model Embodiments

A further example of optical measurement models that may be used in the techniques of this disclosure are stochastic, closed-form models that relate the optical measured ranges to the true ranges as a function of the states of the platform as compared to the probabilistic approaches discussed above. The closed-form optical measurement models do not include a deterministic relation between the measured range and the true range. To provide a relation between the state of the platform and the measured ranges, a first correspondence/association is determined by assuming that objects detected by the optical sensor are identified uniquely as objects in the map. Given an estimate of the range to an object and knowing which object is detected by the optical sensor in the map provides the correspondence. There are several approaches to solving the correspondence problem, for example, if the map was represented as a feature-map containing a set of objects, every object has a unique signature with respect to the optical sensor, and hence the object detected can be inferred by comparing the optical sensor signature to the object signature, and if they match, then it may be assumed the object detected by the optical sensor is the object that maximizes the correlation between the optical signature and a specific map object. If signatures from several objects leads to the same (or close to) correlation vector, the search area can be limited to a smaller cone centered around the reported azimuth and elevation angle of the optical sensor. Other approaches to solving the correspondence problem include using the optical sensor to aid in classifying the type of object (i.e., speed limit road sign versus a traffic sign) detected and thus limiting the search to objects of the same kind and in the platform's vicinity. As will be appreciated, the error compensation techniques discussed above for a range-based measurement model, such as those discussed in Section 1.1.2, may also be applied to the closed form measurement models.

Assuming that a single optical measurement can be represented by $m_t^k = \{\rho_t^k, \phi_{opt,t}^k, \theta_{opt,t}^k\}$, where $\rho_t^k$ is the measured range to an object (with known correspondence) in the map, positioned in the global frame at $\{x_{obj}^k, y_{obj}^k, z_{obj}^k\}$, and $\phi_{opt,t}^k$ and $\theta_{opt,t}^k$ are the azimuth and elevation angles of the main lobe relative to the optical sensor's centerline, the global position of the optical sensor can be represented as:

$$\begin{bmatrix} x_{opt,t} \\ y_{opt,t} \\ z_{opt,t} \end{bmatrix} = \begin{bmatrix} x_t \\ y_t \\ z_t \end{bmatrix} + R_l^g \begin{bmatrix} x_{opt,t}^l \\ y_{opt,t}^l \\ z_{opt,t}^l \end{bmatrix}$$

The relationship between the measurement denoted by $m_t^k$ and the states of the vehicle can be expressed by the following set of equations:

$$\rho_t^k = \rho_t^{k,true} + \eta_{z_{opt}}$$
$$= \sqrt{(x_{obj}^k - x_{opt,t})^2 + (y_{obj}^k - y_{opt,t})^2 + (z_{obj}^k - z_{opt,t})^2} + \eta_{z_{opt}}$$
$$\phi_{opt,t}^k = \tan^{-1}((y_{obj}^k - y_{opt,t})/(x_{obj}^k - x_{opt,t})) - \phi_t + \eta_{\phi_{opt}}$$
$$\theta_{opt,t}^k = \tan^{-1}((z_{obj}^k - z_{opt,t})/\sqrt{(x_{obj}^k - x_{opt,t})^2 + (y_{obj}^k - y_{opt,t})^2}) - \theta_t + \eta_{\theta_{opt}}$$

In this representation, $\eta_{z_{opt}} \sim N(0, \sigma_{z_{opt}}^2)$, $\eta_{\phi_{opt}} \sim N(0, \sigma_{\phi_{opt}}^2)$ and $\eta_{\theta_{opt}} \sim N(0, \sigma_{\theta_{opt}}^2)$ are zero-centered Gaussian random variables modelling the error in the measured range, the error in the estimated azimuth angle and the error in the estimated elevation angle respectively. Moreover, $\rho_t^{k,true}$ is the error free range to the detected object and $\phi_t$, $\theta_t$ angles are the azimuth and pitch of the vehicle at time t.

Figure 14:
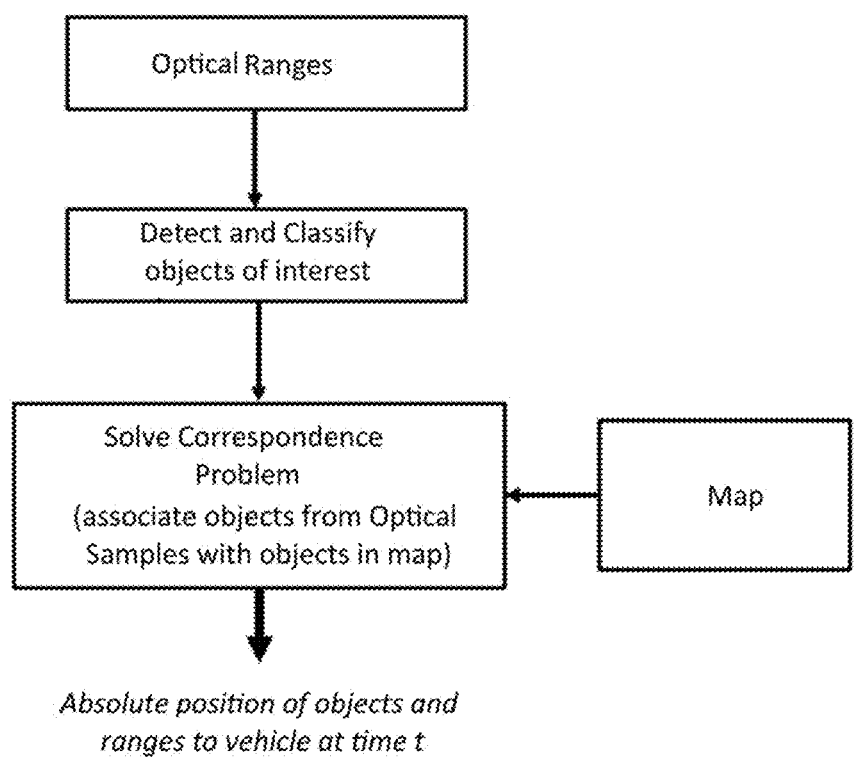
FIG. 14 is a schematic representation of use of an optical closed-form measurement model according to an embodiment.

One embodiment of a closed-form optical measurement model is schematically depicted in FIG. 14. A first correspondence between the objects detected and classified by the optical sensor (labelled with range ranges) and objects in the map. Optionally, other supplemental sensors such as a thermal camera and an infra-red imaging sensor, which may be implemented as external sensor 116 or auxiliary sensor 114 of device 100 or in any other desired manner, may be used to aid the detection and classification. Resolving the optical/map correspondence leads to knowing the position of objects in the global frame (absolute position). Correspondingly, the absolute positioning of the objects and their ranges may be used to build a closed form measurement model as a function of the states of the platform.

2 System Model Embodiments

As discussed above, another aspect of the techniques of this disclosure is the use of a state estimation technique to provide the navigation solution that integrates optical samples with the motion sensor data. The following materials discuss exemplary nonlinear system models as well as using another integrated navigation solution through another state estimation technique. In one embodiment, a nonlinear error-state model can be used to predict the error-states and then use the error-states to correct the actual states of the vehicle. Alternatively, in some embodiments, a linearized error-state model may be used. In another embodiment, a nonlinear total-state model can be used to directly estimate the states of the vehicle, including the 3D position, velocity and attitude angles. In yet another embodiment, the solution from another state estimation technique (another filter) that integrates INS and GNSS (or other source absolute navigational information) systems to feed the system model for the state estimation technique at hand.

2.1 Nonlinear Error-State Model Embodiments

In the present example, a three-dimensional (3D) navigation solution is provided by calculating 3D position, velocity and attitude of a moving platform. The relative navigational information includes motion sensor data obtained from MEMS-based inertial sensors consisting of three orthogonal accelerometers and three orthogonal gyroscopes, such as sensor assembly 106 of device 100 in FIG. 1. Likewise, host processor 102 may implement integration module 114 to integrate the information using a nonlinear state estimation technique, such as for example, Mixture PF having the system model defined herein below.

Navigation Solution

The state of device 100 whether tethered or non-tethered to the moving platform is $x_k = [\phi_k, \lambda_k, h_k, v_k^E, v_k^N, v_k^U, p_k, r_k, A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle. Since this is an error-state approach, the motion model is used externally in what is called inertial mechanization, which is a nonlinear model as mentioned earlier, the output of this model is the navigation states of the device, such as position, velocity, and attitude. The state estimation or filtering technique estimates the errors in the navigation states obtained by the mechanization, so the estimated state vector by this state estimation or filtering technique is for the error states, and the system model is an error-state system model which transition the previous error-state to the current error-state. The mechanization output is corrected for these estimated errors to provide the corrected navigation states, such as corrected position, velocity and attitude. The estimated error-state is about a nominal value which is the mechanization output, the mechanization can operate either unaided in an open loop mode, or can receive feedback from the corrected states, this case is called closed-loop mode. The error-state system model commonly used is a linearized model (to be used with KF-based solutions), but the work in this example uses a nonlinear error-state model to avoid the linearization and approximation.

The motion model used in the mechanization is given by $x_k = f_{mech}(x_{k-1}, u_{k-1})$ where $u_{k-1}$ is the control input which is the inertial sensors readings that correspond to transforming the state from time epoch k−1 to time epoch k, this will be the convention used in this explanation for the sensor readings for nomenclature purposes. The nonlinear error-state system model (also called state transition model) is given by $\delta x_k = f(\delta x_{k-1}, u_{k-1}, w_{k-1})$ where $w_k$ is the process noise which is independent of the past and present states and accounts for the uncertainty in the platform motion and the control inputs. The measurement model is $\delta z_k = h(\delta x_k, v_k)$ where $v_k$ is the measurement noise which is independent of the past and current states and the process noise and accounts for uncertainty in the optical samples.

A set of common reference frames is used in this example for demonstration purposes, other definitions of reference frames may be used. The body frame of the platform has the X-axis along the transversal direction, Y-axis along the forward longitudinal direction, and Z-axis along the vertical direction of the vehicle completing a right-handed system. The local-level frame is the ENU frame that has axes along East, North, and vertical (Up) directions. The inertial frame is Earth-centered inertial frame (ECI) centered at the center of mass of the Earth and whose the Z-axis is the axis of rotation of the Earth. The Earth-centered Earth-fixed (ECEF) frame has the same origin and z-axis as the ECI frame but it rotates with the Earth (hence the name Earth-fixed).

Mechanization

Mechanization is a process of converting the output of inertial sensors into position, velocity and attitude information. Mechanization is a recursive process which processes the data based on previous output (or some initial values) and the new measurement from the inertial sensors. The rotation matrix that transforms from the vehicle body frame to the local-level frame at time k−1 is $$R_{b,k-1}^{\ell} = \begin{bmatrix} \cos A_{k-1} \cos r_{k-1} + \sin A_{k-1} \sin p_{k-1} \sin r_{k-1} & \sin A_{k-1} \cos p_{k-1} & \cos A_{k-1} \sin r_{k-1} - \sin A_{k-1} \sin p_{k-1} \cos r_{k-1} \\ -\sin A_{k-1} \cos r_{k-1} + \cos A_{k-1} \sin p_{k-1} \sin r_{k-1} & \cos A_{k-1} \cos p_{k-1} & -\sin A_{k-1} \sin r_{k-1} - \cos A_{k-1} \sin p_{k-1} \cos r_{k-1} \\ -\cos p_{k-1} \sin r_{k-1} & \sin p_{k-1} & \cos p_{k-1} \cos r_{k-1} \end{bmatrix}$$

and the mechanization version is $$R_{b,k-1}^{\ell,Mech} = \begin{bmatrix} \cos A_{k-1}^{Mech} \cos r_{k-1}^{Mech} + \sin A_{k-1}^{Mech} \sin p_{k-1}^{Mech} \sin r_{k-1}^{Mech} & \sin A_{k-1}^{Mech} \cos p_{k-1}^{Mech} & \cos A_{k-1}^{Mech} \sin r_{k-1}^{Mech} - \sin A_{k-1}^{Mech} \sin p_{k-1}^{Mech} \cos r_{k-1}^{Mech} \\ -\sin A_{k-1}^{Mech} \cos r_{k-1}^{Mech} + \cos A_{k-1}^{Mech} \sin p_{k-1}^{Mech} \sin r_{k-1}^{Mech} & \cos A_{k-1}^{Mech} \cos p_{k-1}^{Mech} & -\sin A_{k-1}^{Mech} \sin r_{k-1}^{Mech} - \cos A_{k-1}^{Mech} \sin p_{k-1}^{Mech} \cos r_{k-1}^{Mech} \\ -\cos p_{k-1}^{Mech} \sin r_{k-1}^{Mech} & \sin p_{k-1}^{Mech} & \cos p_{k-1}^{Mech} \cos r_{k-1}^{Mech} \end{bmatrix}$$

To describe the mechanization nonlinear equations, which is here the motion model for the navigation states, the control inputs are first introduced. The measurement provided by the IMU is the control input; $u_{k-1} = [f_{k-1}^x \; f_{k-1}^y \; f_{k-1}^z \; \omega_{k-1}^x \; \omega_{k-1}^y \; \omega_{k-1}^z]^T$ where $f_{k-1}^x$, $f_{k-1}^y$ and $f_{k-1}^z$ are the readings of the accelerometer triad, and $\omega_{k-1}^x$, $\omega_{k-1}^y$, and $\omega_{k-1}^z$ are the readings of the gyroscope triad. As mentioned earlier these are the sensors' readings that correspond to transforming the state from time epoch k−1 to time epoch k, this is the convention used in this explanation for the sensor readings just used for nomenclature purposes.

Initialization

Initialization procedures may be tailored to the specific application. First, the initialization of position and velocity will be discussed. In some applications, position may be initialized using a platform's last known position before it started to move, this may be used in applications where the platform does not move when the navigation system is not running. For the systems where inertial sensors are integrated with absolute navigational information, such as for example GNSS, initial position may be provided by the absolute navigation system. In some cases, the starting point may be known a priori (pre-surveyed location) which can be used as an initial input. Velocity initialization may be made with zero input, if the platform is stationary. If moving, the velocity may be provided from an external navigation source such as for example, GNSS or odometer.

For attitude initialization, when the device is stationary, accelerometers measure the components of reaction to gravity because of the pitch and roll angles (tilt from horizontal plane). The accelerometers measurement is given by:

$$\begin{bmatrix} f^x \\ f^y \\ f^z \end{bmatrix} = R_\ell^b \begin{bmatrix} 0 \\ 0 \\ g \end{bmatrix} = (R_b^\ell)^T \begin{bmatrix} 0 \\ 0 \\ g \end{bmatrix} = \begin{bmatrix} -g \cos p \sin r \\ g \sin p \\ g \cos p \cos r \end{bmatrix}$$

where g is the gravity acceleration. If three accelerometers along the X, Y, and Z directions are utilized, the pitch and the roll angles can be calculated as follows:

$$p = \tan^{-1}\left(\frac{f^y}{\sqrt{(f^x)^2 + (f^z)^2}}\right)$$

$$r = \tan^{-1}\left(\frac{-f^x}{f^z}\right)$$

In case the device is not stationary, a time averaging can be used on the accelerometer readings to suppress the motion components, then the above formulas may be used with the averaged accelerometers data to initialize pitch and roll. The length of the time frame used for averaging may depend on the application or the mode where the navigation system works (such as for example walking or driving).

In case the device is not stationary and either GNSS or the optional source of speed or velocity readings (such as for example odometer) is available and in case initial misalignment is resolved (such as estimating pitch misalignment with absolute velocity updates as described below) or there is no misalignment in a certain application, then the motion obtained from these sources may be decoupled from the accelerometer readings, so that the remaining quantity measured by these accelerometers are components of gravity, which enables the calculation of pitch and roll as follows:

$$p = \tan^{-1}\left(\frac{f^y - Acc}{\sqrt{(f^x + \text{Speed} \cdot \omega^z)^2 + (f^z)^2}}\right)$$

$$r = \tan^{-1}\left(\frac{-(f^x + \text{Speed} \cdot \omega^z)}{f^z}\right)$$

where the speed and acceleration derived from the source of absolute navigational information are labelled Speed and Acc.

For the azimuth angle, one possible way of initializing it is to obtain it from the absolute navigational information. In the case velocities are available and the device starts to move, the azimuth angle can be calculated as follows:

$$A = \tan^{-1}\left(\frac{v^E}{v^N}\right)$$

This initial azimuth is the moving platform azimuth, and it may be used together with the initial misalignment (such as estimating pitch misalignment with absolute velocity updates as described below) to get the initial device heading.

If velocity is not available from the absolute navigation receiver, then position differences over time may be used to approximate velocity and consequently calculate azimuth. In some applications, azimuth may be initialized using a platform's last known azimuth before it started to move, this may be used in applications where the platform does not move when the navigation system is not running.

Attitude Equations

One suitable technique for calculating the attitude angles is to use quaternions through the following equations. The relation between the vector of quaternion parameters and the rotation matrix from body frame to local-level frame is as follows:

$$q_{k-1} = \begin{bmatrix} q_{k-1}^1 \\ q_{k-1}^2 \\ q_{k-1}^3 \\ q_{k-1}^4 \end{bmatrix} = \begin{bmatrix} 0.25\{R_{b,k-1}^{\ell,Mech}(3,2) - R_{b,k-1}^{\ell,Mech}(2,3)\}/q_{k-1}^4 \\ 0.25\{R_{b,k-1}^{\ell,Mech}(1,3) - R_{b,k-1}^{\ell,Mech}(3,1)\}/q_{k-1}^4 \\ 0.25\{R_{b,k-1}^{\ell,Mech}(2,1) - R_{b,k-1}^{\ell,Mech}(1,2)\}/q_{k-1}^4 \\ 0.5\sqrt{1 + R_{b,k-1}^{\ell,Mech}(1,1) + R_{b,k-1}^{\ell,Mech}(2,2) + R_{b,k-1}^{\ell,Mech}(3,3)} \end{bmatrix}$$

The three gyroscopes readings should be compensated for the stochastic errors as well as the Earth rotation rate and the change in orientation of the local-level frame. The latter two are monitored by the gyroscope and form a part of the readings, so they have to be removed in order to get the actual turn. These angular rates are assumed to be constant in the interval between time steps k−1 and k and they are integrated over time to give the angular increments corresponding to the rotation vector from the local-level frame to the body frame depicted in the body frame, as follows:

$$\begin{bmatrix} \theta_x \\ \theta_y \\ \theta_z \end{bmatrix} = \begin{bmatrix} \omega_{k-1}^x \\ \omega_{k-1}^y \\ \omega_{k-1}^z \end{bmatrix} \Delta t - (R_{b,k-1}^{\ell,Mech})^T \begin{bmatrix} -\dfrac{v_{k-1}^{N,Mech}}{R_{M,k-1}^{Mech} + h_{k-1}^{Mech}} \\ \omega^e \cos \varphi_{k-1}^{Mech} + \dfrac{v_{k-1}^{E,Mech}}{R_{N,k-1}^{Mech} + h_{k-1}^{Mech}} \\ \omega^e \sin \varphi_{k-1}^{Mech} + \dfrac{v_{k-1}^{E,Mech} \tan \varphi_{k-1}}{R_{N,k-1}^{Mech} + h_{k-1}^{Mech}} \end{bmatrix} \Delta t,$$

where $\omega^e$ is the Earth rotation rate, $R_M$ is the Meridian radius of curvature of the Earth's reference ellipsoid and is given by $$R_{M,k-1}^{Mech} = \frac{a(1-e^2)}{\left(1-e^2 \sin^2(\varphi_{k-1}^{Mech})\right)^{\frac{3}{2}}},$$

$R_N$ is the normal radius of curvature of the Earth's reference ellipsoid and is given by $$R_{N,k-1}^{Mech} = \frac{a}{\left(1-e^2 \sin^2(\varphi_{k-1}^{Mech})\right)^{\frac{1}{2}}},$$

$\Delta t$ is the sampling time, a is the semimajor axis (equatorial radius) of a Meridian ellipse of the Earth's ellipsoid a=6,378,137.0m, e is the eccentricity $$e = \sqrt{\frac{a^2-b^2}{a^2}} = \sqrt{f(2-f)} = 0.08181919,$$

b is the semiminor axis of a Meridian ellipse of the Earth's ellipsoid b=a(1−f)=6356752.3142 m, and f is the flatness $$f = \frac{a-b}{a} = 0.00335281.$$

The quaternion parameters are propagated with time as follows:

$$q_k = \begin{bmatrix} q_k^1 \\ q_k^2 \\ q_k^3 \\ q_k^4 \end{bmatrix} = \begin{bmatrix} q_{k-1}^1 \\ q_{k-1}^2 \\ q_{k-1}^3 \\ q_{k-1}^4 \end{bmatrix} + \frac{1}{2}\begin{bmatrix} 0 & \theta_z & -\theta_y & \theta_x \\ -\theta_z & 0 & \theta_x & \theta_y \\ \theta_y & -\theta_x & 0 & \theta_z \\ -\theta_x & -\theta_y & -\theta_z & 0 \end{bmatrix}\begin{bmatrix} q_{k-1}^1 \\ q_{k-1}^2 \\ q_{k-1}^3 \\ q_{k-1}^4 \end{bmatrix}$$

The definition of the quaternion parameters implies that $$(q_k^1)^2+(q_k^2)^2+(q_k^3)^2+(q_k^4)^2=1$$

Due to computational errors, the above equality may be violated. To compensate for this, the following special normalization procedure is performed. If the following error exists after the computation of the quaternion parameters $$\Delta=1-((q_k^1)^2+(q_k^2)^2+(q_k^3)^2+(q_k^4)^2)$$

then the vector of quaternion parameters should be updated as follows:

$$q_k = \frac{q_k}{\sqrt{1-\Delta}}.$$

The new rotation matrix from body frame to local-level frame is computed as follows:

$$R_{b,k}^{\ell,Mech} = \begin{bmatrix} R_{b,k}^{\ell,Mech}(1,1) & R_{b,k}^{\ell,Mech}(1,2) & R_{b,k}^{\ell,Mech}(1,3) \\ R_{b,k}^{\ell,Mech}(2,1) & R_{b,k}^{\ell,Mech}(2,2) & R_{b,k}^{\ell,Mech}(2,3) \\ R_{b,k}^{\ell,Mech}(3,1) & R_{b,k}^{\ell,Mech}(3,2) & R_{b,k}^{\ell,Mech}(3,3) \end{bmatrix}$$

$$= \begin{bmatrix} (q_k^1)^2-(q_k^2)^2-(q_k^3)^2+(q_k^4)^2 & 2(q_k^1 q_k^2-q_k^3 q_k^4) & 2(q_k^1 q_k^3+q_k^2 q_k^4) \\ 2(q_k^1 q_k^2+q_k^3 q_k^4) & (q_k^2)^2-(q_k^1)^2-(q_k^3)^2+(q_k^4)^2 & 2(q_k^2 q_k^3-q_k^1 q_k^4) \\ 2(q_k^1 q_k^3-q_k^2 q_k^4) & 2(q_k^2 q_k^3+q_k^1 q_k^4) & (q_k^3)^2-(q_k^1)^2-(q_k^2)^2+(q_k^4)^2 \end{bmatrix}$$

The attitude angles are obtained from this rotation matrix as follows:

$$p_k^{Mech} = \tan^{-1}\left(\frac{R_{b,k}^{\ell,Mech}(3,2)}{\sqrt{(R_{b,k}^{\ell,Mech}(1,2))^2 + (R_{b,k}^{\ell,Mech}(2,2))^2}}\right)$$

$$r_k^{Mech} = \tan^{-1}\left(\frac{-R_{b,k}^{\ell,Mech}(3,1)}{R_{b,k}^{\ell,Mech}(3,3)}\right)$$

$$A_k^{Mech} = \tan^{-1}\left(\frac{R_{b,k}^{\ell,Mech}(1,2)}{R_{b,k}^{\ell,Mech}(2,2)}\right)$$

Another technique for calculating attitude angles calculation employs a skew symmetric matrix of the angle increments corresponding to the rotation vector from the local-level frame to the body frame depicted in the body frame. The skew symmetric matrix may be calculated as follows:

$$S_{lb,k}^{b,Mech} = \begin{bmatrix} 0 & -\theta_z & \theta_y \\ \theta_z & 0 & -\theta_x \\ -\theta_y & \theta_x & 0 \end{bmatrix}$$

The new $R_{b,k}^{l}$ matrix is calculated as follows:

$$R_{b,k}^{l,Mech} = (R_{b,k-1}^{l,Mech})\exp(S_{lb,k}^{b,Mech})$$

where $\theta_k^{Mech} = \sqrt{(\theta_x)^2 + (\theta_y)^2 + (\theta_z)^2}$ and $\exp(S_{lb,k}^{b,Mech})$ may be either the exponential of a matrix implemented numerically or may be calculated as follows:

$$\exp(S_{lb,k}^{b,Mech}) = I + S_{lb,k}^{b,Mech}\left(\frac{\sin\theta_k^{Mech}}{\theta_k^{Mech}}\right) + (S_{lb,k}^{b,Mech})^2\left(\frac{1 - \cos\theta_k^{Mech}}{(\theta_k^{Mech})^2}\right)$$

The attitude angles are then obtained from this $R_{b,k}^{l,Mech}$ matrix as mentioned above.

Position and Velocity Equations

Next, position and velocity may be calculated according to the following discussion. The velocity is calculated as follows $$\begin{bmatrix} v_k^{E,Mech} \\ v_k^{N,Mech} \\ v_k^{Up,Mech} \end{bmatrix} = \begin{bmatrix} v_{k-1}^{E,Mech} \\ v_{k-1}^{N,Mech} \\ v_{k-1}^{Up,Mech} \end{bmatrix} + R_{b,k}^{\ell,Mech}\begin{bmatrix} f_{k-1}^x \\ f_{k-1}^y \\ f_{k-1}^z \end{bmatrix}\Delta t +$$

$$\begin{bmatrix} 0 \\ 0 \\ -g_{k-1}^{Mech} \end{bmatrix}\Delta t - \begin{bmatrix} 0 & -2\omega^e\sin\varphi_{k-1}^{Mech} - \frac{v_{k-1}^{E,Mech}\tan\varphi_{k-1}^{Mech}}{R_{N,k-1}^{Mech} + h_{k-1}^{Mech}} & 2\omega^e\cos\varphi_{k-1}^{Mech} - \frac{v_{k-1}^{E,Mech}}{R_{N,k-1}^{Mech} + h_{k-1}^{Mech}} \\ 2\omega^e\sin\varphi_{k-1}^{Mech} - \frac{v_{k-1}^{E,Mech}\tan\varphi_{k-1}^{Mech}}{R_{N,k-1}^{Mech} + h_{k-1}^{Mech}} & 0 & \frac{v_{k-1}^{N,Mech}}{R_{M,k-1}^{Mech} + h_{k-1}^{Mech}} \\ -2\omega^e\cos\varphi_{k-1}^{Mech} - \frac{v_{k-1}^{E,Mech}}{R_{N,k-1}^{Mech} + h_{k-1}^{Mech}} & \frac{-v_{k-1}^{N,Mech}}{R_{M,k-1}^{Mech} + h_{k-1}^{Mech}} & 0 \end{bmatrix}\begin{bmatrix} v_{k-1}^{E,Mech} \\ v_{k-1}^{N,Mech} \\ v_{k-1}^{Up,Mech} \end{bmatrix}\Delta t$$

in which $g_k$ is used for the acceleration of the gravity and may be determined through a model, such as for example:

$$g_k^{Mech} = a_1(1 + a_2\sin^2\varphi_k^{Mech} + a_3\sin^4\varphi_k^{Mech}) + (a_4 + a_5\sin^2\varphi_k^{Mech})h_k^{Mech} + a_6(h_k^{Mech})^2$$

where, the coefficients $a_1$ through $a_6$ for Geographic Reference System (GRS) 1980 are defined as: $a_1 = 9.7803267714$ m/s²; $a_2 = 0.0052790414$; $a_3 = 0.0000232718$; $a_4 = -0.000003087691089$ 1/s²; $a_5 = 0.000000004397731$ 1/s²; $a_6 = 0.000000000000721$ 1/ms². For position, one suitable calculation for the latitude may be as follows:

$$\varphi_k^{Mech} = \varphi_{k-1}^{Mech} + \frac{d\varphi}{dt}|_{k-1}^{Mech}\Delta t = \varphi_{k-1}^{Mech} + \frac{v_{k-1}^{N,Mech}}{R_{M,k-1}^{Mech} + h_{k-1}^{Mech}}\Delta t$$

Similarly, one suitable calculation for the longitude may be expressed as:

$$\lambda_k^{Mech} = \lambda_{k-1}^{Mech} + \frac{d\lambda}{dt}|_{k-1}^{Mech}\Delta t = \lambda_{k-1}^{Mech} + \frac{v_{k-1}^{E,Mech}}{(R_{N,k-1}^{Mech} + h_{k-1}^{Mech})\cos\varphi_{k-1}^{Mech}}\Delta t$$

One suitable calculation for the altitude may be given by:

$$h_k^{Mech} = h_{k-1}^{Mech} + \frac{dh}{dt}|_{k-1}^{Mech}\Delta t = h_{k-1}^{Mech} + v_{k-1}^{Up,Mech}\Delta t$$

In general, it should be recognized that the mechanization equations for attitude, velocity and position may be implemented differently, such as for example, using a better numerical integration technique for position. Furthermore, coning and sculling may be used to provide more precise mechanization output.

System Model

As noted above, the system model is the state transition model and since this is an error state system model, this system model transitions from the error state of the previous iteration k−1 to the error state of the current iteration k. To describe the system model utilized in the present navigation module, which is the nonlinear error-state system model, the error state vector has to be described first. The error state consist of the errors in the navigation states, the errors in the rotation matrix $R_b^l$ that transforms from the device body frame to the local-level frame, the errors in the sensors readings (i.e. the errors in the control input). The errors in the navigation states are $[\delta\varphi_k, \delta\lambda_k, \delta h_k, \delta v_k^E, \delta v_k^N, \delta v_k^U, \delta p_k, \delta r_k, \delta A_k]^T$, which are the errors in latitude, longitude, altitude, velocity along East, North, and Up directions, pitch, roll, and azimuth, respectively. The errors in $R_b^l$ are the errors in the nine elements of this 3×3 matrix, the 3×3 matrix of the errors will be called $R_b^l$. The errors associated with the different control inputs (the sensors' errors): $[\delta f_k^x \; \delta f_k^y \; \delta f_k^z \; \delta\omega_k^x \; \delta\omega_k^y \; \delta\omega_k^z]^T$ where, $\delta f_x^k$, $\delta f_k^y$, and $\delta f_k^z$ are the stochastic errors in accelerometers readings, and $\delta\omega_k^x$, $\delta\omega_k^y$, and $\delta\omega_k^z$ are the stochastic errors in gyroscopes readings.

Modeling Sensors' Errors

A system model for the sensors' errors may be used. For example the traditional model for these sensors' errors in the literature, is the first order Gauss Markov model, which can be used here, but other models can be used as well. For example, a higher order Auto-Regressive (AR) model to model the drift in each one of the inertial sensors may be used and is demonstrated here. The general equation of the AR model of order p is in the form $$y_k = -\sum_{n=1}^{p} \alpha_n y_{k-n} + \beta_0 \omega_k$$

where $\omega_k$ is white noise which is the input to the AR model, $y_k$ is the output of the AR model, the $\alpha$'s and $\beta$ are the parameters of the model. It should be noted that such a higher order AR model is difficult to use with KF, despite the fact that it is a linear model. This is because for each inertial sensor error to be modeled the state vector has to be augmented with a number of elements equal to the order of the AR model (which is 120). Consequently, the covariance matrix, and other matrices used by the KF will increase drastically in size (an increase of 120 in rows and an increase of 120 in columns for each inertial sensor), which make this difficult to realize.

In general, if the stochastic gyroscope drift is modeled by any model such as for example Gauss Markov (GM), or AR, in the system model, the state vector has to be augmented accordingly. The normal way of doing this augmentation will lead to, for example in the case of AR with order 120, the addition of 120 states to the state vector. Since this will introduce a lot of computational overhead and will require an increase in the number of used particles, another approach is used in this work. The flexibility of the models used by PF was exploited together with an approximation that experimentally proved to work well. The state vector in PF is augmented by only one state for the gyroscope drift. So at the k-th iteration, all the values of the gyroscope drift state in the particle population of iteration k−1 will be propagated as usual, but for the other previous drift values from k−120 to k−2, only the mean of the estimated drift will be used and propagated. This implementation makes the use of higher order models possible without adding a lot of computational overhead. The experiments with Mixture PF demonstrated that this approximation is valid.

If 120 states were added to the state vector, i.e. all the previous gyroscope drift states in all the particles of the population of iteration k−120 to k−1 were to be used in the k-th iteration, then the computational overhead would have been very high. Furthermore, when the state vector is large PF computational load is badly affected because a larger number of particles may be used. But this is not the case in this implementation because of the approximation discussed above.

Modeling Errors With Rotation Matrix

The errors in the rotation matrix that transforms from the device body frame to the local-level frame may be modeled according to the following discussion. As mentioned earlier $R_b^l$ is the rotation matrix that transforms from the device body frame to the local-level frame. The following steps get the error states of the $R_b^l$ from all the error states of the previous iteration, therefore this part of the system model gets the full error in $R_b^l$ and not an approximation or a linearization.

First the errors in the Meridian and normal radii of curvature of the Earth's ellipsoid are calculated from the mechanization-derived version of these radii and the corrected version of these radii as follows:

$$R_{M,k}^{Mech} = \frac{a(1-e^2)}{\left(1 - e^2 \sin^2(\varphi_k^{Mech})\right)^{\frac{3}{2}}}$$

$$R_{N,k-}^{Mech} = \frac{a}{\left(1 - e^2 \sin^2(\varphi_k^{Mech})\right)^{\frac{1}{2}}}$$

$$R_{M,k}^{Correct} = \frac{a(1-e^2)}{\left(1 - e^2 \sin^2(\varphi_k^{Mech} - \delta\varphi_{k-1})\right)^{\frac{3}{2}}}$$

$$R_{N,k}^{Correct} = \frac{a}{\left(1 - e^2 \sin^2(\varphi_k^{Mech} - \delta\varphi_{k-1})\right)^{\frac{1}{2}}}$$

$$\delta R_{M,k-} = R_{M,k}^{Mech} - R_{M,k-}^{Correct}$$

$$\delta R_{N,k} = R_{N,k}^{Mech} - R_{N,k-}^{Correct}$$

Next, the rotation vector from the inertial frame to the local-level frame depicted in the local-level frame from the mechanization is given as follows:

$$\omega_{il,k}^{l,Mech} = \omega_{ie,k}^{l,Mech} + \omega_{el,k}^{l,Mech} = \begin{bmatrix} 0 \\ \omega^e \cos(\varphi_k^{Mech}) \\ \omega^e \sin(\varphi_k^{Mech}) \end{bmatrix} + \begin{bmatrix} -\frac{v_k^{N,Mech}}{R_{M,k}^{Mech} + h_k^{Mech}} \\ \frac{v_k^{E,Mech}}{R_{N,k}^{Mech} + h_k^{Mech}} \\ \frac{v_k^{E,Mech} \tan(\varphi_k^{Mech})}{R_{N,k}^{Mech} + h_k^{Mech}} \end{bmatrix}$$

The rotation vector from the inertial frame to the local-level frame depicted in the body frame of the device from the mechanization is given as follows:

$$\omega_{il,k}^{b,Mech} = R_{l,k}^{b,Mech} \omega_{il,k}^{l,Mech} = (R_{b,k}^{l,Mech})^T \omega_{il,k}^{l,Mech}$$

The error in the rotation vector from the inertial frame to the ECEF frame depicted in the local-level frame is calculated as follows:

$$\delta\omega_{ie,k-}^{l} = \begin{bmatrix} 0 \\ \omega^e \delta\cos(\varphi_k) \\ \omega^e \delta\sin(\varphi_k) \end{bmatrix} = \begin{bmatrix} 0 \\ \omega^e(\cos(\varphi_k^{Mech}) - \cos(\varphi_k^{Mech} - \delta\varphi_{k-1})) \\ \omega^e(\sin(\varphi_k^{Mech}) - \sin(\varphi_k^{Mech} - \delta\varphi_{k-1})) \end{bmatrix}$$

The error in the rotation vector from the Earth-fixed Earth-centered (ECEF) frame to the local-level frame depicted in the local-level frame is calculated as follows:

$$\delta\omega_{el,k}^{l} = \begin{bmatrix} -\left(\frac{v_k^{N,Mech}}{R_{M,k}^{Mech} + h_k^{Mech}} - \frac{v_k^{N,Mech} - \delta v_{k-1}^N}{R_{M,k}^{Mech} - \delta R_{M,k} + h_k^{Mech} - \delta h_{k-1}}\right) \\ \frac{v_k^{E,Mech}}{(R_{N,k}^{Mech} + h_k^{Mech})} - \frac{v_k^{E,Mech} - \delta v_{k-1}^E}{(R_{N,k}^{Mech} - \delta R_{N,k-} + h_k^{Mech} - \delta h_{k-1})} \\ \frac{v_k^{E,Mech} \tan(\varphi_k^{Mech})}{(R_{Nk}^{Mech} + h_k^{Mech})} - \frac{(v_k^{E,Mech} - \delta v_{k-1}^E)\tan(\varphi_k^{Mech} - \delta\varphi_{k-1})}{(R_{N,k}^{Mech} - \delta R_{N,k} + h_k^{Mech} - \delta h_{k-1})} \end{bmatrix}$$

The error in the rotation vector from the inertial frame to the local-level frame depicted in the local-level frame is calculated as follows:

$$\delta\omega_{il,k-}^{l} = \delta\omega_{ie,k-}^{l} + \delta\omega_{el,l-}^{l}$$

The gyroscope readings that cause the system to transition from the state at time epoch k−1 to time epoch k will be noted as follows:

$$\omega_{ib,k}^{b,Mech} = \begin{bmatrix} \omega_{k-1}^x \\ \omega_{k-1}^y \\ \omega_{k-1}^z \end{bmatrix}$$

The stochastic error in the gyroscope readings is noted as follows:

$$\delta\omega_{ib,k}^{b} = \begin{bmatrix} \delta\omega_k^x \\ \delta\omega_k^y \\ \delta\omega_k^z \end{bmatrix}$$

The intermediate estimate of the corrected $R_b^l$ matrix, from the previous iteration estimate of the error in this matrix can be obtained as follows:

$$R_{b,k^-}^{l,Correct} = R_{b,k}^{l,Mech} - \delta R_{b,k-1}^{l}$$

The corrected rotation vector from the inertial frame to the local-level frame depicted in the local-level frame is calculated as follows:

$$\omega_{il,k}^{l,Correct} = \omega_{il,k}^{l,Mech} - \delta\omega_{il,k}^{l}$$

The corrected rotation vector from the inertial frame to the local-level frame depicted in the body frame is calculated as follows:

$$\omega_{il,k}^{b,Correct} = R_{l,k^-}^{b,Correct}\omega_{il,k}^{l,Correct} = (R_{b,k^-}^{l,Correct})^T \omega_{il,k}^{l,Correct}$$

The error in the rotation vector from the inertial frame to the local-level frame depicted in the body frame is calculated as follows:

$$\delta\omega_{il,k}^{b} = \omega_{il,k}^{b,Mech} - \omega_{il,k}^{b,Correct}$$

The error in the angle increment corresponding to the error in the rotation vector from the local-level frame to the body frame depicted in the body frame is calculated as follows:

$$\delta\theta_{lb,k}^{b} = (\delta\omega_{ib,k}^{b} - \delta\omega_{il,k}^{b})\Delta t$$

The angle increment corresponding to the rotation vector from the local-level frame to the body frame depicted in the body frame from the mechanization is calculated as follows:

$$\theta_{lb,k}^{b,Mech} = \omega_{lb,k}^{b,Mech}\Delta t$$

The corrected angle increment corresponding to the corrected rotation vector from the local-level frame to the body frame depicted in the body frame is calculated as follows:

$$\theta_{lb,k}^{b,Correct} = \theta_{lb,k}^{b,Mech} - \delta\theta_{lb,k}^{b}$$

$$\theta_{lb,k}^{b,Correct} = \begin{bmatrix} \theta_{lb,k}^{b,Correct}(1) \\ \theta_{lb,k}^{b,Correct}(2) \\ \theta_{lb,k}^{b,Correct}(3) \end{bmatrix}$$

The skew symmetric matrix of the corrected angle increment corresponding to the corrected rotation vector from the local-level frame to the body frame depicted in the body frame is calculated as follows:

$$S_{lb,k}^{b,Correct} = \begin{bmatrix} 0 & -\theta_{lb,k}^{b,Correct}(3) & \theta_{lb,k}^{b,Correct}(2) \\ \theta_{lb,k}^{b,Correct}(3) & 0 & -\theta_{lb,k}^{b,Correct}(1) \\ -\theta_{lb,k}^{b,Correct}(2) & \theta_{lb,k}^{b,Correct}(1) & 0 \end{bmatrix}$$

The error in the $R_b^l$ matrix is calculated as follows:

$$\delta R_{b,k}^{l} = R_{b,k}^{l,Mech} - (R_{b,k}^{l,Mech} - \delta R_{b,k-1})\exp(S_{lb,k}^{b,Correct})$$

where $\theta_k^{Correct} = \sqrt{(\theta_{lb,k}^{b,Correct}(1))^2 + (\theta_{lb,k}^{b,Correct}(2))^2 + (\theta_{lb,k}^{b,Correct}(3))^2}$ and $$\exp(S_{lb,k}^{b,Correct}) = I + S_{lb,k}^{b,Corect}\left(\frac{\sin\theta_k^{Correct}}{\theta_k^{Correct}}\right) + (S_{lb,k}^{b,Correct})^2\left(\frac{1 - \cos\theta_k^{Correct}}{(\theta_k^{Correct})^2}\right)$$

Attitude Errors

Further, the errors in attitude may be obtained as discussed below. First, the corrected $R_b^l$ matrix is calculated as follows:

$$R_{b,k}^{l,Correct} = R_{b,k}^{l,Mech} - \delta R_{b,k}^{l}$$

Thus, the corrected attitude angles are calculated as follows:

$$p_k^{Correct} = \tan^{-1}\left(\frac{R_{b,k}^{\ell,Correct}(3,2)}{\sqrt{(R_{b,k}^{\ell,Correct}(1,2))^2 + (R_{b,k}^{\ell,Correct}(2,2))^2}}\right)$$

$$r_k^{Correct} = \tan^{-1}\left(\frac{-R_{b,k}^{\ell,Correct}(3,1)}{R_{b,k}^{l,Correct}(3,3)}\right)$$

$$A_k^{Correct} = \tan^{-1}\left(\frac{R_{b,k}^{\ell,Correct}(1,2)}{R_{b,k}^{\ell,Correct}(2,2)}\right)$$

The attitude errors are calculated as follows:

$$\delta p_k = p_k^{Mech} - p_k^{Correct}$$

$$\delta r_k = r_k^{Mech} - r_k^{Correct}$$

$$\delta A_k = A_k^{Mech} - A_k^{Correct}$$

Velocity Errors

In order to model the errors in velocity, the discrete version of the derivative of the velocity from mechanization may be computed as follows:

$$\text{v\_deriv}^{L,Mech} = \frac{v_k^{L,Mech} - v_{k-1}^{L,Mech}}{\Delta t} = \frac{1}{\Delta t}\begin{bmatrix} v_k^{E,Mech} - v_{k-1}^{E,Mech} \\ v_k^{N,Mech} - v_{k-1}^{N,Mech} \\ v_k^{U,Mech} - v_{k-1}^{U,Mech} \end{bmatrix}$$

It is to be noted that other more accurate numerical methods for derivates may be used in all the discrete versions of derivatives in this patent like the above one, and they can be accommodated by the Particle filter. The discrete version of the derivative of the corrected velocity can be calculated as follows:

$$\text{v\_deriv}_k^{L,Corrected} = (R_{b,k}^{l,Mech} - \delta R_{b,k}^{l})\begin{bmatrix} f_{k-1}^x - \delta f_k^x \\ f_{k-1}^y - \delta f_k^y \\ f_{k-1}^z - \delta f_k^z \end{bmatrix} -$$

-continued $$\Omega^{temp} \begin{bmatrix} v_k^{E,Mech} & -\delta v_{k-1}^E \\ v_k^{N,Mech} & -\delta v_{k-1}^N \\ v_k^{U,Mech} & -\delta v_{k-1}^U \end{bmatrix} + \begin{bmatrix} 0 \\ 0 \\ -(g_k^{Mech} - \delta g_k) \end{bmatrix}$$

where $\Omega_k^{temp}$ is the skew symmetric matrix of $\omega_k^{temp}=(2(\omega_{ie,k}^{l,Mech}-\delta\omega_{el,k}^l)+(\omega_{il,k}^{l,Mech}-\delta\omega_{il,k}^l))$. Since $g_k$ is calculated by a model as a function of position, then $\delta g$ can be calculated as follows:

$$\delta g_k = a_1(1+a_2\sin^2(\varphi_k^{Mech})+a_3\sin^4(\varphi_k^{Mech}))+(a_4+a_5\sin^2(\varphi_k^{Mech}))h_k^{Mech}+a_6(h_k^{Mech})^2-a_1(1+a_2\sin^2(\varphi_k^{Mech}-\delta\varphi_{k-1})+a_3\sin^4(\varphi_k^{Mech}-\delta\varphi_{k-1}))-(a_4+a_5\sin^2(\varphi_k^{Mech}-\delta\varphi_{k-1}))(h_k^{Mech}-\delta h_{k-1})-a_6(h_k^{Mech}-\delta h_{k-1})^2$$

Then $$(g_k^{Mech}-\delta g_k)=a_1(1+a_2\sin^2(\varphi_k^{Mech}-\delta\varphi_{k-1})+a_3\sin^4(\varphi_k^{Mech}-\delta\varphi_{k-1}))+(a_4+a_5\sin^2(\varphi_k^{Mech}-\delta\varphi_{k-1}))(h_k^{Mech}-\delta h_{k-1})+a_6(h_k^{Mech}-\delta h_{k-1})^2$$

The error in the discrete version of the derivative of the velocity can be calculated as follows:

$$\delta v\_deriv_k^L = v\_deriv_k^{L,Mech} - v\_deriv_k^{L,Corrected}$$

Thus, the error in the velocity can be calculated as follows:

$$\delta v_k^L = \begin{bmatrix} \delta v_k^E \\ \delta v_k^N \\ \delta v_k^U \end{bmatrix} = \delta v_{k-1}^L + \delta v\_deriv_k^L \Delta t$$

Position Errors

Finally, the errors in position may be modeled using the following equations:

$$\delta h_k = \delta h_{k-1} + \delta v_k^U \Delta t$$

$$\delta \varphi_k = \delta \varphi_{k-1} + \left( \frac{v_k^{N,Mech}}{R_{M,k}^{Mech} + h_k^{Mech}} - \frac{v_k^{N,Mech} - \delta v_k^N}{R_{M,k}^{Mech} - \delta R_{M,k} + h_k^{Mech} - \delta h_k} \right) \Delta t$$

$$\delta \lambda_k = \delta \lambda_{k-1} + \left( \frac{v_k^{E,Mech}}{(R_{N,k}^{Mech} + h_k^{Mech})\cos(\varphi_k^{Mech})} - \frac{(v_k^{E,Mech} - \delta v_k^E)}{(R_{N,k}^{Mech} - \delta R_{N,k} + h_k^{Mech} - \delta h_k)\cos(\varphi_k^{Mech} - \delta \varphi_k)} \right) \Delta t$$

2.2 Nonlinear Total-State Model Embodiments

In the present example, a three-dimensional (3D) navigation solution is provided by calculating 3D position, velocity and attitude of a moving platform. The relative navigational information includes motion sensor data obtained from MEMS-based inertial sensors consisting of three orthogonal accelerometers and three orthogonal gyroscopes, such as sensor assembly 106 of device 100 in FIG. 1. Likewise, host processor 102 may implement integration module 114 to integrate the information using a nonlinear state estimation technique, such as for example, Mixture PF having the system model defined herein below.

Navigation Solution

The state of device 100 whether tethered or non-tethered to the moving platform is $x_k=[\phi_k, \lambda_k, h_k, v_k^E, v_k^N, v_k^U, p_k, r_k, A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle. Since this is a total-state approach, the system model is the motion model itself, which is a nonlinear model as mentioned earlier, the output of this model is the navigation states of the device, such as position, velocity, and attitude. The state estimation or filtering technique estimates directly the navigation states themselves, so the estimated state vector by this state estimation or filtering technique is for the total states or the navigation states, and the system model is a total-state system model which transition the previous total-state to the current total-state. The traditional and commonly used navigation solutions uses a linearized error-state system model (to be used with KF-based solutions), but the work in this example uses a nonlinear total-state model to avoid the linearization and approximation.

The nonlinear total-state system model (also called state transition model) is given by $x_k=f(x_{k-1},u_{k-1},w_{k-1})$ where $u_{k-1}$ is the control input which is the inertial sensors readings that correspond to transforming the state from time epoch k−1 to time epoch k, this will be the convention used in this explanation for the sensor readings just used for nomenclature purposes. Furthermore, $w_k$ is the process noise which is independent of the past and present states and accounts for the uncertainty in the platform motion and the control inputs. The measurement model is $z_k=h(x_k,v_k)$ where $v_k$ is the measurement noise which is independent of the past and current states and the process noise and accounts for uncertainty in the optical samples.

A set of common reference frames is used in this example for demonstration purposes, other definitions of reference frames may be used. The body frame of the vehicle has the X-axis along the transversal direction, Y-axis along the forward longitudinal direction, and Z-axis along the vertical direction of the vehicle completing a right-handed system. The local-level frame is the ENU frame that has axes along East, North, and vertical (Up) directions. The inertial frame is Earth-centered inertial frame (ECI) centered at the center of mass of the Earth and whose the Z-axis is the axis of rotation of the Earth. The Earth-centered Earth-fixed (ECEF) frame has the same origin and z-axis as the ECI frame but it rotates with the Earth (hence the name Earth-fixed).

2.2.1 The System Model

The system model is the state transition model and since this is a total state system model, this system model transitions from the total state of the previous iteration k−1 to the total state of the current iteration k. Before describing the system model utilized in the present example, the control inputs are first introduced. The measurement provided by the IMU is the control input; $u_{k-1}=[f_{k-1}^x \; f_{k-1}^y \; f_{k-1}^z \; \omega_{k-1}^x \; \omega_{k-1}^y \; \omega_{k-1}^z]^T$ where $f_{k-1}^x, f_{k-1}^y$, and $f_{k-1}^z$ are the readings of the accelerometer triad, and $\omega_{k-1}^x, \omega_{k-1}^y$, and $\omega_{k-1}^z$ are the readings of the gyroscope triad. As mentioned earlier these are the sensors' readings that correspond to transforming the state from time epoch k−1 to time epoch k, this is the convention used in this explanation for the sensor readings just used for nomenclature purposes.

To describe the system model utilized in the present example, which is the nonlinear total-state system model, the total state vector has to be described first. The state consist of the navigation states themselves, and the errors in the sensors readings (i.e. the errors in the control input). The navigation states are $[\phi_k, \lambda_k, h_k, v_k^E, v_k^N, v_k^U, p_k, r_k, A_k]^T$, which are the latitude, longitude, altitude, velocity along East, North, and Up directions, pitch, roll, and azimuth, respectively. The errors associated with the different control inputs (the sensors' errors): $[\delta f_k^x\ \delta f_k^y\ \delta f_k^z\ \delta\omega_k^x\ \delta\omega_k^y\ \delta\omega_k^z]^T$ where $\delta f_k^x$, $\delta f_k^y$, and $\delta f_k^z$ are the stochastic errors in accelerometers readings, and $\delta\omega_k^x$, $\delta\omega_k^y$, and $\delta\omega_k^z$ are the stochastic errors in gyroscopes readings. The rotation matrix that transforms from the vehicle body frame to the local-level frame at time k−1 is $$R_{b,k-1}^\ell = \begin{bmatrix} \cos A_{k-1}\cos r_{k-1} + \sin A_{k-1}\sin p_{k-1}\sin r_{k-1} & \sin A_{k-1}\cos p_{k-1} & \cos A_{k-1}\sin r_{k-1} - \sin A_{k-1}\sin p_{k-1}\cos r_{k-1} \\ -\sin A_{k-1}\cos r_{k-1} + \cos A_{k-1}\sin p_{k-1}\sin r_{k-1} & \cos A_{k-1}\cos p_{k-1} & -\sin A_{k-1}\sin r_{k-1} - \cos A_{k-1}\sin p_{k-1}\cos r_{k-1} \\ -\cos p_{k-1}\sin r_{k-1} & \sin p_{k-1} & \cos p_{k-1}\cos r_{k-1} \end{bmatrix}$$

Modeling Sensors Errors

A system model for the sensors' errors may be used. For example, the traditional model for these sensors errors in the literature is the first order Gauss Markov model, which can be used here, but other models can be used as well. For example, a higher order Auto-Regressive (AR) model to model the drift in each one of the inertial sensors may be used and is demonstrated here. The general equation of the AR model of order p is in the form $$y_k = -\sum_{n=1}^{p} \alpha_n y_{k-n} + \beta_0 \omega_k$$

where $\omega_k$ is white noise which is the input to the AR model, $y_k$ is the output of the AR model, the $\alpha$'s and $\beta$ are the parameters of the model. It should be noted that such a higher order AR model is difficult to use with KF, despite the fact that it is a linear model. This is because for each inertial sensor error to be modeled the state vector has to be augmented with a number of elements equal to the order of the AR model (which is 120). Consequently, the covariance matrix, and other matrices used by the KF will increase drastically in size (an increase of 120 in rows and an increase of 120 in columns for each inertial sensor), which make this difficult to realize.

In general, if the stochastic gyroscope drift is modeled by any model such as for example Gauss Markov (GM), or AR, in the system model, the state vector has to be augmented accordingly. The normal way of doing this augmentation will lead to, for example in the case of AR with order 120, the addition of 120 states to the state vector. Since this will introduce a lot of computational overhead and will require an increase in the number of used particles, another approach is used in this work. The flexibility of the models used by PF was exploited together with an approximation that experimentally proved to work well. The state vector in PF is augmented by only one state for the gyroscope drift. So at the k-th iteration, all the values of the gyroscope drift state in the particle population of iteration k−1 will be propagated as usual, but for the other previous drift values from k−120 to k−2, only the mean of the estimated drift will be used and propagated. This implementation makes the use of higher order models possible without adding a lot of computational overhead. The experiments with Mixture PF demonstrated that this approximation is valid.

If 120 states were added to the state vector, i.e. all the previous gyroscope drift states in all the particles of the population of iteration k−120 to k−1 were to be used in the k-th iteration, then the computational overhead would have been very high. Furthermore, when the state vector is large PF computational load is badly affected because a larger number of particles may be used. But this is not the case in this implementation because of the approximation discussed above.

Attitude Equations

One suitable technique for calculating the attitude angles is to use quaternions through the following equations. The relation between the vector of quaternion parameters and the rotation matrix from body frame to local-level frame is as follows:

$$q_{k-1} = \begin{bmatrix} q_{k-1}^1 \\ q_{k-1}^2 \\ q_{k-1}^3 \\ q_{k-1}^4 \end{bmatrix} = \begin{bmatrix} 0.25\{R_{b,k-1}^\ell(3,2) - R_{b,k-1}^\ell(2,3)\}/q_{k-1}^4 \\ 0.25\{R_{b,k-1}^\ell(1,3) - R_{b,k-1}^\ell(3,1)\}/q_{k-1}^4 \\ 0.25\{R_{b,k-1}^\ell(2,1) - R_{b,k-1}^\ell(1,2)\}/q_{k-1}^4 \\ 0.5\sqrt{1 + R_{b,k-1}^\ell(1,1) + R_{b,k-1}^\ell(2,2) + R_{b,k-1}^\ell(3,3)} \end{bmatrix}$$

The three gyroscopes readings should be compensated for the stochastic errors as well as the Earth rotation rate and the change in orientation of the local-level frame. The latter two are monitored by the gyroscope and form a part of the readings, so they have to be removed in order to get the actual turn. These angular rates are assumed to be constant in the interval between time steps k−1 and k and they are integrated over time to give $$\begin{bmatrix} \theta_x \\ \theta_y \\ \theta_z \end{bmatrix} = \begin{bmatrix} \omega_{k-1}^x \\ \omega_{k-1}^y \\ \omega_{k-1}^z \end{bmatrix}\Delta t - (R_{b,k-1}^\ell)^T \begin{bmatrix} \dfrac{-v_{k-1}^N}{R_{M,k-1} + h_{k-1}} \\ \omega^e \cos\varphi_{k-1} + \dfrac{v_{k-1}^E}{R_{N,k-1} + h_{k-1}} \\ \omega^e \sin\varphi_{k-1} + \dfrac{v_{k-1}^E \tan\varphi_{k-1}}{R_{N,k-1} + h_{k-1}} \end{bmatrix}\Delta t,$$

where $\omega^e$ is the Earth rotation rate, $R_M$ is the Meridian radius of curvature of the Earth's reference ellipsoid and is given by $$R_{M,k-1} = \frac{a(1-e^2)}{(1 - e^2\sin^2(\varphi_{k-1}))^{\frac{3}{2}}},$$

$R^N$ is the normal radius of curvature of the Earth's reference ellipsoid and is given by $$R_{N,k-1} = \frac{a}{(1 - e^2\sin^2(\varphi_{k-1}))^{\frac{1}{2}}}.$$

In these equations, $\Delta t$ is the sampling time, a is the semimajor axis (equatorial radius) of a Meridian ellipse of the Earth's ellipsoid a=6,378,137.0 m, e is the eccentricity $$e = \sqrt{\frac{a^2 - b^2}{a^2}} = \sqrt{f(2-f)} = 0.08181919,$$

b is the semiminor axis of a Meridian ellipse of the Earth's ellipsoid b=a(1−f) 6356752.3142 m, and f is the flatness $$f = \frac{a - b}{a} = 0.00335281.$$

The quaternion parameters are propagated with time as follows:

$$q_k = \begin{bmatrix} q_k^1 \\ q_k^2 \\ q_k^3 \\ q_k^4 \end{bmatrix} = \begin{bmatrix} q_{k-1}^1 \\ q_{k-1}^2 \\ q_{k-1}^3 \\ q_{k-1}^4 \end{bmatrix} + \frac{1}{2}\begin{bmatrix} 0 & \theta_z & -\theta_y & \theta_x \\ -\theta_z & 0 & \theta_x & \theta_y \\ \theta_y & -\theta_z & 0 & \theta_z \\ -\theta_x & -\theta_y & -\theta_z & 0 \end{bmatrix}\begin{bmatrix} q_{k-1}^1 \\ q_{k-1}^2 \\ q_{k-1}^3 \\ q_{k-1}^4 \end{bmatrix}$$

The definition of the quaternion parameters implies that $(q_k^1)^2+(q_k^2)^2+(q_k^3)^2+(q_k^4)^2=1$. However, due to computational errors, the above equality may be violated. To compensate for this, the following special normalization procedure is performed. If the following error exists after the computation of the quaternion parameters $\Delta = 1 - ((q_1^k)^2 + (q_k^2)^2 + (q_k^3)^2 + (q_k^4)^2)$ then the vector of quaternion parameters should be updated with $$q_k = \frac{q_k}{\sqrt{1-\Delta}}.$$

The new rotation matrix from body frame to local-level frame is computed as follows:

$$R_{b,k}^{\ell} = \begin{bmatrix} R_{b,k}^{\ell}(1,1) & R_{b,k}^{\ell}(1,2) & R_{b,k}^{\ell}(1,3) \\ R_{b,k}^{\ell}(2,1) & R_{b,k}^{\ell}(2,2) & R_{b,k}^{\ell}(2,3) \\ R_{b,k}^{\ell}(3,1) & R_{b,k}^{\ell}(3,2) & R_{b,k}^{\ell}(3,3) \end{bmatrix}$$

$$= \begin{bmatrix} (q_k^1)^2 - (q_k^2)^2 - (q_k^3)^2 + (q_k^4)^2 & 2(q_k^1 q_k^2 - q_k^3 q_k^4) & 2(q_k^1 q_k^3 + q_k^2 q_k^4) \\ 2(q_k^1 q_k^2 + q_k^3 q_k^4) & (q_k^2)^2 - (q_k^1)^2 - (q_k^3)^2 + (q_k^4)^2 & 2(q_k^2 q_k^3 - q_k^1 q_k^4) \\ 2(q_k^1 q_k^3 - q_k^2 q_k^4) & 2(q_k^2 q_k^3 + q_k^1 q_k^4) & (q_k^3)^2 - (q_k^1)^2 - (q_k^2)^2 + (q_k^4)^2 \end{bmatrix}$$

The attitude angles are obtained from this rotation matrix as follows:

$$p_k = \tan^{-1}\left(\frac{R_{b,k}^{\ell}(3,2)}{\sqrt{(R_{b,k}^{\ell}(1,2))^2 + (R_{b,k}^{\ell}(2,2))^2}}\right)$$

$$r_k = \tan^{-1}\left(\frac{-R_{b,k}^{\ell}(3,1)}{R_{b,k}^{\ell}(3,3)}\right)$$

$$A_k = \tan^{-1}\left(\frac{R_{b,k}^{\ell}(1,2)}{R_{b,k}^{\ell}(2,2)}\right)$$

Another suitable technique for calculating attitude angles uses a skew symmetric matrix. The skew symmetric matrix of the angle increments corresponding to the rotation vector from the local-level frame to the body frame depicted in the body frame is calculated as follows:

$$S_{lb,k}^{b} = \begin{bmatrix} 0 & -\theta_z & \theta_y \\ \theta_z & 0 & -\theta_x \\ -\theta_y & \theta_x & 0 \end{bmatrix}$$

The new $R_{b,k}^{l}$ matrix is calculated as follows: $R_{b,k}^{l} = (R_{b,k-1}^{l})\exp(S_{lb,k}^{b})$ where $\theta_k = \sqrt{(\theta_x)^2+(\theta_y)^2+(\theta_z)^2}$ and $\exp(S_{lb,k}^{b})$ may be either the exponential of a matrix implemented numerically or may be calculated as follows:

$$\exp(S_{lb,k}^{b}) = I + S_{lb,k}^{b}\left(\frac{\sin\theta_k}{\theta_k}\right) + (S_{lb,k}^{b})^2\left(\frac{1-\cos\theta_k}{(\theta_k)^2}\right)$$

The attitude angles are then obtained from this $R_{b,k}^{l}$ matrix as mentioned above.

Position and Velocity Equations

Next, position and velocity may be determined according to the following discussion. The velocity may be calculated as follows:

$$\begin{bmatrix} v_k^E \\ v_k^N \\ v_k^{Up} \end{bmatrix} = \begin{bmatrix} v_{k-1}^E \\ v_{k-1}^N \\ v_{k-1}^{Up} \end{bmatrix} + R_{b,k}^{\ell}\begin{bmatrix} f_{k-1}^x \\ f_{k-1}^y \\ f_{k-1}^z \end{bmatrix}\Delta t + \begin{bmatrix} 0 \\ 0 \\ -g_{k-1} \end{bmatrix}\Delta t - $$

$$\begin{bmatrix} 0 & -2\omega^e \sin\varphi_{k-1} - \frac{v_{k-1}^E \tan\varphi_{k-1}}{R_{N,k-1}+h_{k-1}} & 2\omega^e \cos\varphi_{k-1} + \frac{v_{k-1}^E}{R_{N,k-1}+h_{k-1}} \\ 2\omega^e \sin\varphi_{k-1} + \frac{v_{k-1}^E \tan\varphi_{k-1}}{R_{N,k-1}+h_{k-1}} & 0 & \frac{v_{k-1}^N}{R_{M,k-1}+h_{k-1}} \\ -2\omega^e \cos\varphi_{k-1} - \frac{v_{k-1}^E}{R_{N,k-1}+h_{k-1}} & \frac{-v_{k-1}^N}{R_{M,k-1}+h_{k-1}} & 0 \end{bmatrix}\begin{bmatrix} v_{k-1}^E \\ v_{k-1}^N \\ v_{k-1}^{Up} \end{bmatrix}\Delta t$$

where $g_k$ is the acceleration of the gravity, that may be calculated through a model, such as for example:

$g_k = a_1(1 + a_2\sin^2\varphi_k + a_3\sin^4\varphi_k) + (a_4 + a_5\sin^2\varphi_k)h_k + a_6(h_k)^2$ where, the coefficients $a_1$ through $a_6$ for Geographic Reference System (GRS) 1980 are defined as:

$a_1 = 9.7803267714$ m/s²; $a_2 = 0.0052790414$; $a_3 = 0.0000232718$;

$a_4 = -0.000003087691089$ 1/s²; $a_5 = 0.000000004397731$ 1/s²;

$a_6 = 0.000000000000721$ 1/ms².

Next, one suitable calculation for the latitude may be as follows:

$$\varphi_k = \varphi_{k-1} + \frac{d\varphi}{dt}\bigg|_{k-1}\Delta t = \varphi_{k-1} + \frac{v_{k-1}^N}{R_{M,k-1} + h_{k-1}}\Delta t$$

Similarly, one suitable calculation for the longitude may be expressed as:

$$\lambda_k = \lambda_{k-1} + \frac{d\lambda}{dt}\bigg|_{k-1}\Delta t = \lambda_{k-1} + \frac{v_{k-1}^E}{(R_{N,k-1} + h_{k-1})\cos\varphi_{k-1}}\Delta t$$

One suitable calculation for the altitude may be given by:

$$h_k = h_{k-1} + \frac{dh}{dt}\bigg|_{k-1}\Delta t = h_{k-1} + v_{k-1}^{Up}\Delta t$$

Again, it should be recognized that the system model equations for attitude, velocity and position may be implemented differently, such as for example, using a better numerical integration technique for position. Furthermore, coning and sculling may be used to provide more precise navigation states output.

2.3 System Model With Another Integration Filter Embodiments

Figure 15:
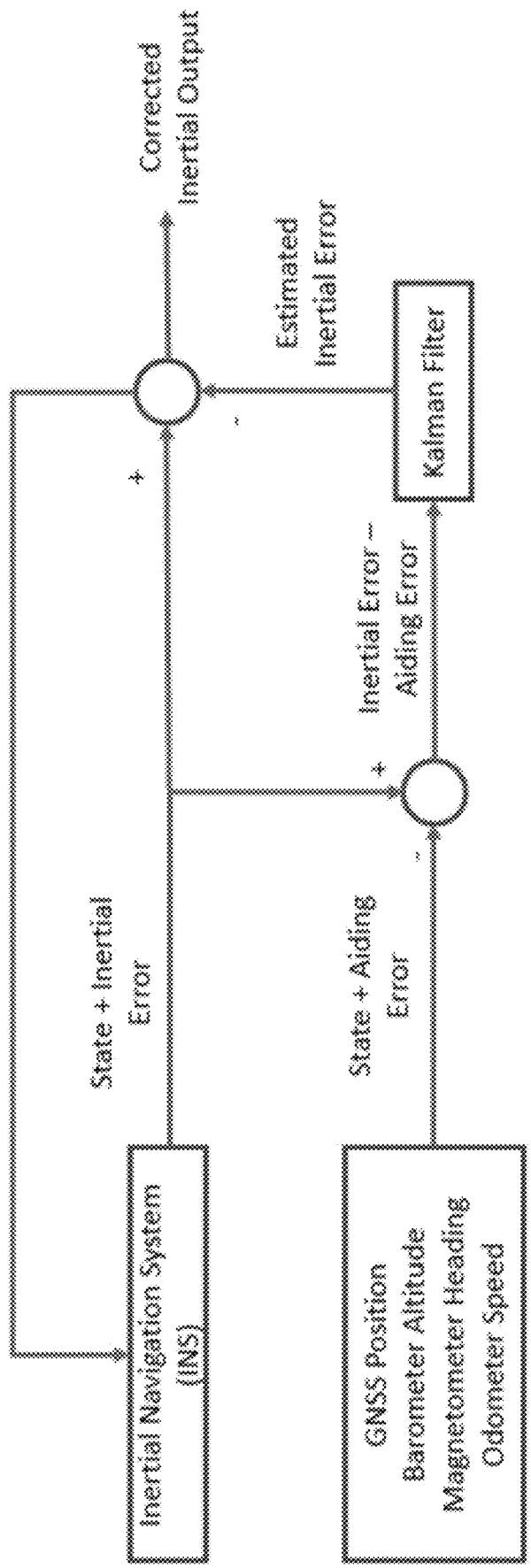
FIG. 15 is schematic diagram showing an exemplary system model that receives input from an additional state estimation technique that integrates the motion sensor data according to an embodiment.

As noted above, other embodiments use a system model comprising utilizing the solution from another state estimation technique (another filter) that integrates INS and GNSS systems to feed the system model for the state estimation technique at hand. For example, a Kalman Filter-based navigation solution (among other state estimation techniques) can be used as an input to the system model for the current state estimation technique. The solution may integrate inertial sensor data with GNSS updates using a Kalman Filter solution (an example among other state estimation techniques). Other sources of absolute updates that maybe integrated into the solution, include: odometer for speed updates, magnetometer for heading updates and barometer for altitude updates. One suitable exemplary architecture is schematically depicted in FIG. 15, which shows the basic block diagram of the Kalman Filter-based positioning solution for estimating the inertial sensors error using the absolute information (obtained from various sensors) and subtracts it from the INS solution to obtain the final corrected solution.

The solution from the Kalman filter-based system may include system states and an estimation of the uncertainty of the solution. The following equations depict an example of a system model for the current state estimation technique based on the other integrated solution using another state estimation technique (in this example the Kalman Filter-based solution):

$\varphi_k = \varphi_{k-1} + (\varphi_{k,sol} - \varphi_{k-1,sol}) + \varphi_{noise}$ $\lambda_k = \lambda_{k-1} + (\lambda_{k,sol} - \lambda_{k-1,sol}) + \lambda_{noise}$ $h_k = h_{k-1} + (h_{k,sol} - h_{k-1,sol}) + h_{noise}$ Here, $\varphi_k$, $\varphi_{k-1}$, $\lambda_k$, $\lambda_{k-1}$, $h_k$, $h_{k-1}$ are the current and the previous latitude, longitude and altitude of the system model respectively. Moreover, $\varphi_{k,sol}$, $\varphi_{k-1,sol}$, $\lambda_{k,sol}$, $\lambda_{k-1,sol}$, $h_{k,sol}$, $h_{k-1,sol}$ are the current and previous latitude, longitude and altitude of the Kalman Filter-based solution respectively. Finally, $\varphi_{noise}$, $\lambda_{noise}$, $h_{noise}$ random variables representing process noise added with the following distribution:

$\varphi_{noise} \Box N(0,(\sigma_{\varphi_{k,sol}} + \sigma_{\varphi_{k-1,sol}})^2)$ $\lambda_{noise} \Box N(0,(\sigma_{\lambda_{k,sol}} + \sigma_{\lambda_{k-1,sol}})^2)$ $h_{noise} \Box N(0,(\sigma_{h_{k,sol}} + \sigma_{h_{k-1,sol}})^2)$ In this example, the random variables are normally distributed and represent the uncertainty in the estimated states from the Kalman Filter-based solution. The noise standard deviation is calculated based on the standard deviation of the current and previous solution.

3 State Estimation

Next, details regarding the design of a state estimator to integrate the optical samples and the motion sensor data are discussed. As noted above, four exemplary optical measurement models include a range-based model, a NOL model, a optical map matching model and a closed-form model. Each may be integrated with the system models described immediately above. For the purposes of this disclosure, the integration of each optical measurement model is in the context of a Particle Filter (PF) state estimator. A PF estimator may be used when the system and/or the measurement model are nonlinear as opposed to other state estimation filters, such as Kalman Filters (KF) that require linearization. Moreover, PF estimators are more suited when the noise affecting the measurement model or the system model are non-Gaussian. In other words, PF can be used to represent multimodal error distributions. Moreover, PF estimators provide a multi-hypothesis approach, whereas a KF propagates a single hypothesis.

However, other nonlinear state estimation techniques are within the scope of this disclosure. For example, another filtering approach that can be used is the Mixture PF. Some aspects of the basic PF called Sampling/Importance Resampling (SIR) PF are first discussed. In the prediction phase, the SIR PF samples from the system model, which does not depend on the last observation. In MEMS-based INS/Optical Sensor integration, the sampling based on the system model, which depends on inertial sensor readings as control inputs, makes the SIR PF suffer from poor performance because with more drift this sampling operation will not produce enough samples in regions where the true probability density function (PDF) of the state is large, especially in the case of MEMS-based sensors. Because of the limitation of the SIR PF, it has to use a very large number of samples to assure good coverage of the state space, thus making it computationally expensive. Mixture PF is one of the variants of PF that aim to overcome this limitation of SIR and to use much lower number of samples while not sacrificing the performance. The much lower number of samples makes Mixture PF applicable in real time.

As described above, in the SIR PF the samples are predicted from the system model, and then the most recent observation is used to adjust the importance weights of this prediction. The Mixture PF adds to the samples predicted from the system model some samples predicted from the most recent observation. The importance weights of these new samples are adjusted according to the probability that they came from the samples of the last iteration and the latest control inputs.

During the sampling phase of the Mixture PF used in the present embodiments, some samples predicted according to the most recent observation are added to those samples predicted according to the system model. The most recent observation is used to adjust the importance weights of the samples predicted according to the system model. The importance weights of the additional samples predicted according to the most recent observation are adjusted according to the probability that they were generated from the samples of the last iteration and the system model with latest control inputs. When no optical objects are detected, only samples based on the system model are used, but when objects are detected, both types of samples are used to give better performance, particularly during regions of no optical detections. Also adding the samples from observation leads to faster recovery to true position after optical outages (durations where no objects are detected by the optical sensor).

It is worth noting that a KF filter can also be used given that the sensor model and the system model are linear. If either the sensor or the system model are not linear, different forms of KF can be used like Extended Kalman Filter (EKF) to linearize the models prior to running the filter.

3.1 Measurement Model: Range-Based Embodiments

This discussion involves using a range-based optical model to estimate the probability density function: $p(\rho_t^k | t_x, m)$ as detailed above. In other words, given knowledge of the map and an estimate of the state of the vehicle, the function represents the probability distribution of the measured range. The map is used along with ray-casting algorithms to estimate the true range to an object (if detected by the optical sensor) given a state of the platform. Here, k refers to the $k^{th}$ range at a certain (azimuth/elevation) angle. Assuming measurements of a single scan are independent, deriving $p(\rho_t | x_t, m)$ from $p(\rho_k^t | x_t, m)$ is reinstated as:

$$p(\rho_t | x_t, m) = \prod_{k=0}^{K-1} p(\rho_t^k | x_t, m), \text{ where } \rho_t^k \sim N\left(\sum_{e=0}^{E-1} \mu_i, \sum_{e=0}^{E-1} \sigma_i^2\right).$$

The proposed Adaptive Measurement model which incorporates different factors such as environmental, optical sensor design and dynamic factors (also discussed above), can be used to tune model parameters $\mu_i$ and $\sigma_i^2$ of for each measurement $\rho_t^k$. The probability of a sample of measurements denoted by $p(\rho_t | x_t, m)$ can be directly used to weight the importance of a particle with known-state in a map. In this embodiment, the range based measurement model is integrated with the MEMS-based Total-state system model. In the context of the basic PF or the Sampling/Importance Resampling (SIR) filter, the PF is initialized by generating N particles using a random distribution (could be within a certain confined distance from the initial state). In the prediction stage, the system model is used to propagate the state of the N particles based on the inputs from the inertial sensors and the proposed system model. The state of each particle is represented by the vector $x_k = [\phi_k, \lambda_k, h_k, v_k^E, v_k^N, v_k^U, p_k, r_k, A_k]^T$, where $\phi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

The optical samples are then used by the measurement model to compute $p(\rho_t | x_t, m)$ for each of the N particles. An importance weight is associated with each particle, proportional to how well the output of the ray-casting algorithm aligns with the measured ranges given the particle state. Then, a resampling step is necessary to randomly draw N new particles from the old N particles with replacement in proportion to the normalized importance weight of each old particle (usually these weights are normalized by dividing the weight of each particle by the sum of all weights). Hence, particles with low importance weight will have a high probability of not propagating to the next state. In other words, surviving particles usually cluster around areas with higher posterior probability.

3.2 Measurement Model: Nearest-Object Likelihood Embodiments

This example relates to integrating the state model with a Nearest-Object Likelihood model that does not need the ray-casting operation to compute $p(\rho_t | x_t, m)$. The first step is to filter out all measurements that are reflected from moving objects (since the map might only contain static objects). Then, the measurements to static targets are projected onto the map in the global frame based on the absolute position of the optical sensor. For example, the projected optical sensor position due to the $k^{th}$ measurement is given by, where $[x_{opt,t}, y_{opt,t}, z_{opt,t}]$ is the 3D optical sensor position in the global frame:

$$\begin{bmatrix} x_{opt,t}^k \\ y_{opt,t}^k \\ z_{opt,t}^k \end{bmatrix} = \begin{bmatrix} x_{opt,t} \\ y_{opt,t} \\ z_{opt,t} \end{bmatrix} + R_l^g \begin{bmatrix} \rho_t^k \cos(\theta_{opt,t}^k)\cos(\phi_{opt,t}^k) \\ \rho_t^k \cos(\theta_{opt,t}^k)\sin(\phi_{opt,t}^k) \\ \rho_t^k \sin(\theta_{opt,t}^k) \end{bmatrix}$$

The next step is to search for the nearest object in the map to the projected position denoted by $(x_{opt,t}^k, y_{opt,t}^k, z_{opt,t}^k)$. Here, it is assumed that the likelihood $p(\rho_t^k | x_t, m)$ is equal to a Gaussian distribution with zero mean and variance $\sigma_{near}^2$ representing the error in Euclidian distance between the projected position and the nearest object in the map. Hence, the probability of a set of measurements given the state of the platform and a map can be represented by $p(\rho_t | x_t, m) \alpha \prod_{k=0}^{K-1}(D=dist^k)$, where $D \sim N(0, \sigma_{near}^2)$ and $dist^k$ is the distance between the projected position of measurement k and the nearest object in the map.

The probability of a sample of measurements denoted by $p(\rho_t | x_t, m)$ can be directly used to weight the importance of a particle with known-state in a map in this integration of the NOL measurement model and the MEMS-based Total-state system model. In the context of the basic PF or the Sampling/Importance Re-sampling (SIR) filter, the PF is initialized by generating N particles using a random distribution (could be within a certain confined distance from the initial state). In the prediction stage, the system model is used to propagate the state of the N particles based on the inputs from the inertial sensors and the proposed system model.

The state of each particle is represented by the $x_k=[\varphi_k, \lambda_k, h_k, v_k^E, v_k^N, v_k^U, p_k, r_k, A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

The optical samples is then used to project the platform's state in the map and then the distance to the nearest object is used as an input to the measurement model to compute $p(\rho_t|x_t, m)$ for each of the N particles. An importance weight is associated with each particle, proportional to the proximity of the projected state to the nearest object in the map. Then, a resampling step is necessary to randomly draw N new particles from the old N particles with replacement in proportion to the normalized importance weight of each old particle (usually these weights are normalized by dividing the weight of each particle by the sum of all weights). Hence, particles with low importance weight will have a high probability of not propagating to the next state. In other words, surviving particles usually cluster around areas with higher posterior probability. Then, a resampling step is necessary to randomly draw N new particles from the old N particles with replacement in proportion to the normalized importance weight of each old particle (usually these weights are normalized by dividing the weight of each particle by the sum of all weights). Hence, particles of low importance weight will have a high probability of not propagating to the next state. In other words, surviving particles usually cluster around areas with higher posterior probability.

As noted above, the basic SIR PF filter has certain limitations because the samples are only predicted from the system model and then the most recent observation is used to adjust the importance weights of this prediction. The Mixture PF adds to the samples predicted from the system model additional samples predicted from the most recent observation. The importance weights of these new samples are adjusted according to the probability that they came from the samples of the last iteration and the latest control inputs. In the context of NOL-based optical measurement model, a suitable method generates particles drawn from the measurement model. This may be done by searching for states, for which the object list detected by the optical sensor is closely aligned (i.e., a high probability of optical detection given the current state) with objects in the global map. A measure of how aligned the object list given a specific state, is by computing the probability of most recent measurement denoted by $p(\rho_t|x_t, m)$ using the NOL optical measurement model. If such states are found, it is possible to generate particles drawn from the measurement model rather than the system model. For this process to be efficient, search space (infinite number of states) within the global map should be considered so that constraints can be effectively applied to limit the search space and consequently reduce computational complexity. After new particles are successfully drawn from the NOL-based measurement model, the importance weights of these new samples are adjusted according to the probability that they came from the samples of the last iteration and the latest control inputs.

3.3 Measurement Model: Optical Map-Matching Embodiments

In this example, an optical map matching measurement model is integrated with the system model. As noted above, the map matching model is based on applying matching algorithms between a local map (obtained by scene reconstruction) and the global map (e.g., a reference map for the optical samples) as means of measuring the likelihood of a sample given the knowledge of the state and the map. The local map is defined as a map created based on the optical samples, such as the scene reconstruction discussed above. The global map can either be a feature-based or location-based map. Regardless of the type of map used, it can be converted to the appropriate format (e.g. OGM map) to be able to match it directly to the optical samples.

Assuming a 3D map, the center of a grid cell in the global and local map can be denoted by $m_{x,y,z}^{gl}$ and $m_{x,y,z}^{loc}$ respectively. The linear correlation can be used to indicate the likelihood of the current local map matching the global map, given the current state of the vehicle. Let us denote to the mean of the relevant section of the global map by $\overline{m}^{gl}$ and the mean of the local map by $\overline{m}^{loc}$. Moreover, we denote to the standard deviation of the global and local map by $\sigma_{m^{gl}}$ and $\sigma_{m^{loc}}$ respectively. Hence, the correlation coefficient between the local and global map is represented by:

$$p(m^{loc}|x_t,m) = \text{Corr}_{m^{gl},m^{loc}} = \Sigma_{x,y,z}((m_{x,y,z}^{loc} - \overline{m}^{loc})(m_{x,y,z}^{gl} - \overline{m}^{gl}))/(\sigma_{m^{gl}}\sigma_{m^{loc}})$$

Although the correlation coefficient ranges between +1 and −1, only a positive correlation or no correlation at all is significant so it can be assumed all negative correlations equal 0, allowing the likelihood of a optical sample to be represented as $p(\rho_t|x_t, m) \propto \max(\text{Corr}_{m^{gl},m^{loc}}, 0)$.

The probability of an optical sample of measurements denoted by $p(\rho_t|x_t, m)$ can be directly used to weight the importance of a particle with known-state in a map. Here, we discuss the integration of the Optical Map-Matching measurement model and the MEMS-based Total-state system model. In the context of the basic PF or the Sampling/Importance Re-sampling (SIR) filter, the PF is initialized by generating N particles using a random distribution (could be within a certain confined distance from the initial state). In the prediction stage, the system model is used to propagate the state of the N particles based on the inputs from the inertial sensors and the proposed system model. The state of each particle is represented by the vector $x_k=[\varphi_k, \lambda_k, h_k, v_k^E, v_k^N, v_k^U, p_k, r_k, A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

The optical samples is then used to create the local map and then the local map is iteratively matched with global map to obtain the correlation of the current sample given the state of the particle. The computed correlation is then used to infer $p(\rho_t|x_t, m)$ for each of the N particles. An importance weight is associated with each particle, proportional to the correlation between the local map and the global map given the state of the particle. Then, a resampling step is necessary to randomly draw N new particles from the old N particles with replacement in proportion to the normalized importance weight of each old particle (usually these weights are normalized by dividing the weight of each particle by the sum of all weights). Hence, particles of low importance weight will have a high probability of not propagating to the next state. In other words, surviving particles usually cluster around areas with higher posterior probability.

Again, the basic SIR PF filter has certain limitations because the samples are only predicted from the system model and then the most recent observation is used to adjust the importance weights of this prediction. Thus, in this example using a Mixture PF allows the addition of further samples predicted from the most recent observation in addition to the samples predicted from the system model. The importance weights of these new samples are adjusted according to the probability that they came from the samples of the last iteration and the latest control inputs. In the context of optical map matching measurement model, a method may be employed that generates particles drawn from the measurement model. This may be done by searching for states, for which the measurement from the optical sensor is closely aligned (i.e., a high probability of optical detection given the current state) to measurements from the global map at specific locations. A measure of how aligned the optical measurement given a specific state is by computing the probability of most recent measurement denoted by p($\rho_t|x_t$, m) using the map-matching correlation factor. In other words, several matches can be found by matching the local map to the global map at different states and savings states where the match between the local map and the global map results in a high correlation factor. If such states are found, it is possible to generate particles drawn from the measurement model rather than the system model. For this process to be efficient, the search space (infinite number of states) within the global map should be considered to effectively apply constraints that limit the search space and consequently reduce computational complexity. After new particles are successfully drawn from the map-matching based measurement model, the importance weights of these new samples are adjusted according to the probability that they came from the samples of the last iteration and the latest control inputs.

3.4 Measurement Model: Closed-Form Embodiments

This section discusses the integration of a closed form model with the system model and includes specific, but non-limiting examples. As noted above, the closed form optical model is a non-probabilistic modelling approach that assumes objects detected by the optical sensor can be identified uniquely as objects in the map. Given an estimate of the range to an object and knowledge of which object is detected by the optical sensor in the map, a correspondence may be determined that relates the measurements to the states of the platform in the closed-form model.

In this tightly-coupled Mixture PF integration, optical sensor raw data is used and is integrated with the inertial sensors. The optical sensor raw data used in the present navigation module in this example are ranges. In the update phase of the integration filter the ranges and range-rates can be used as the measurement updates to update the position and velocity states of the vehicle. The measurement model that relates these measurements to the position and velocity states is a nonlinear model.

As is known, the KF integration solutions linearize this model. PF with its ability to deal with nonlinear models may provide improved performance for tightly-coupled integration because it can use the exact nonlinear measurement model, in addition to the fact that the system model may be a nonlinear model. $\varepsilon_\rho^m$ The traditional techniques relying on KF used to linearize these equations about the range estimate obtained from the inertial sensors mechanization. PF is suggested in this example to accommodate nonlinear models, thus there is no need for linearizing this equation. A suitable nonlinear optical range model for M detected object is:

$$\begin{bmatrix} \rho_c^1 \\ \vdots \\ \rho_c^M \end{bmatrix} = \begin{bmatrix} \|x-x^1\| + b_r + \tilde{\varepsilon}_\rho^1 \\ \vdots \\ \|x-x^M\| + b^r + \tilde{\varepsilon}_\rho^M \end{bmatrix} =$$

$$\begin{bmatrix} \sqrt{(x-x^1)^2 + (y-y^1)^2 + (z-z^1)^2} + b_r + \tilde{\varepsilon}_\rho^1 \\ \vdots \\ \sqrt{(x-x^M)^2 + (y-y^M)^2 + (z-z^M)^2} + b_r + \tilde{\varepsilon}_\rho^M \end{bmatrix}$$

Since the position state x in the above equation is in ECEF rectangular coordinates, it may be translated to Geodetic coordinates for the state vector used in the Mixture PF. The relationship between the Geodetic and Cartesian coordinates is given by:

$$\begin{bmatrix} x \\ y \\ z \end{bmatrix} = \begin{bmatrix} (R_N + h) \cos \varphi \cos \lambda \\ (R_N + h) \cos \varphi \sin \lambda \\ \{R_N(1-e^2) + h\}\sin \varphi \end{bmatrix},$$

where $R_N$ is the normal radius of curvature of the Earth's ellipsoid and e is the eccentricity of the Meridian ellipse. Thus, the range model for Geodetic coordinates may be represented by:

$$\begin{bmatrix} \rho_c^1 \\ \vdots \\ \rho_c^M \end{bmatrix} = \begin{bmatrix} \sqrt{((R_N+h)\cos\varphi\cos\lambda - x^1)^2 + ((R_N+h)\cos\varphi\sin\lambda - y^1)^2 + (\{R_N(1-e^2)+h\}\sin\varphi - z^1)^2} + b_r + \tilde{\varepsilon}_\rho^1 \\ \vdots \\ \sqrt{((R_N+h)\cos\varphi\cos\lambda - x^M)^2 + ((R_N+h)\cos\varphi\sin\lambda - y^M)^2 + (\{R_N(1-e^2)+h\}\sin\varphi - z^M)^2} + b_r + \tilde{\varepsilon}_\rho^M \end{bmatrix}$$

The true range-rate between the $m^{th}$ object and the optical sensor is expressed as $\dot{r}^m = 1_x^m(v_x - v_x^m) + 1_y^m(v_y - v_y^m) + 1_z^m(v_z - v_z^m)$. The range-rate for the $m^{th}$ object can be modeled as $$\dot{\rho}^m = 1_x^m(v_x - v_x^m) + 1_y^m(v_y - v_y^m) + 1_z^m(v_z - v_z^m) + \varepsilon_\rho^m,$$
$$= 1_x^m(v_x - v_x^m) + 1_y^m(v_y - v_y^m) + 1_z^m(v_z - v_z^m) + \varepsilon_\rho^m$$

where $\varepsilon_\rho^m$ is the error in observation (in meters/sec).

It will be appreciated that the above equation is linear in velocities, but it is nonlinear in position. This can be seen by examining the expression for the line of sight unit vector above. Again, there is no need for linearization because of the nonlinear capabilities of PF. The nonlinear model for range-rates of M targets, again in ECEF rectangular coordinates is:

$$\begin{bmatrix} \dot{\rho}^1 \\ \vdots \\ \dot{\rho}^M \end{bmatrix} = \begin{bmatrix} 1_x^1(v_x - v_x^1) + 1_y^1(v_y - v_y^1) + 1_z^1(v_z - v_z^1) + \varepsilon_{\dot{\rho}}^1 \\ \vdots \\ 1_x^M(v_x - v_x^M) + 1_y^M(v_y - v_y^M) + 1_z^M(v_z - v_z^M) + \varepsilon_{\dot{\rho}}^M \end{bmatrix}$$

The velocities here are in ECEF and need to be in local-level frame because this is part of the state vector in Mixture PF. The transformation uses the rotation matrix from the local-level frame to ECEF ($R_l^e$) and is as follows:

$$\begin{bmatrix} v_x \\ v_y \\ v_z \end{bmatrix} = R_l^e \begin{bmatrix} v_e \\ v_n \\ v_u \end{bmatrix} = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0 & \cos\varphi & \sin\varphi \end{bmatrix} \begin{bmatrix} v_e \\ v_n \\ v_u \end{bmatrix}$$

Furthermore, the line of sight unit vector from m$^{th}$ detected object to the optical sensor will be expressed as follows:

$$1^m = \frac{[((R_N + h)\cos\varphi\cos\lambda - x^m), ((R_N + h)\cos\varphi\sin\lambda - y^m), (\{R_N(1 - e^2) + h\}\sin\varphi - z^m)]^T}{\sqrt{((R_N + h)\cos\varphi\cos\lambda - x^m)^2 + ((R_N + h)\cos\varphi\sin\lambda - y^m)^2 + (\{R_N(1 - e^2) + h\}\sin\varphi - z^m)^2}}$$

$$= [1_x^m, 1_y^m, 1_z^m]^T$$

The foregoing combined equations constitute the overall nonlinear model for M optical detected objects.

Next, these concepts are illustrated in the following non-limiting examples.

3.4.1 Example 1: Measurement Model for Error-State System Model

As discussed, the measurement model is a nonlinear model that relates the difference between the mechanization estimate of the ranges and range-rates and the optical raw measurements (range measurements and range-rates) at a time epoch k, $\delta z_k$ to the states at time k, $\delta x_k$ and the measurement noise $\varepsilon_k$. First, the optical raw measurements are $z_k = [\rho_k^1 \ldots \rho_k^M \dot{\rho}_k^1 \ldots \dot{\rho}_k^M]^T$ for M detected objects. The nonlinear measurement model for the error-state model can be in the form $\delta z_k = h(\delta x_k, \varepsilon_k)$, where $$\delta z_k = [\rho_k^{1,Mech} - \rho_{c,k}^{1,rad} \quad \ldots \quad \rho_k^{M,Mech} - \rho_{c,k}^{M,rad} \quad \dot{\rho}_k^{1,Mech} - \dot{\rho}_k^{1,rad} \quad \ldots \quad \dot{\rho}_k^{M,Mech} - \dot{\rho}_k^{M,rad}]^T$$

and $$\varepsilon_k = [\tilde{\varepsilon}_{\rho,k}^1 \ldots \tilde{\varepsilon}_{\rho,k}^M \ \tilde{\varepsilon}_{\dot{\rho},k}^1 \ldots \tilde{\varepsilon}_{\dot{\rho},k}^M]^T.$$

The part of the measurement model for the ranges is as follows:

$$\begin{bmatrix} \rho_k^{1,Mech} - \rho_{c,k}^{1,rad} \\ \vdots \\ \rho_k^{M,Mech} - \rho_{c,k}^{M,rad} \end{bmatrix} = \begin{bmatrix} \sqrt{(x_k^{Mech} - x_k^1)^2 + (y_k^{Mech} - y_k^1)^2 + (z_k^{Mech} - z_k^1)^2} \\ \vdots \\ \sqrt{(x_k^{Mech} - x_k^M)^2 + (y_k^{Mech} - y_k^M)^2 + (z_k^{Mech} - z_k^M)^2} \end{bmatrix} -$$

$$\begin{bmatrix} \sqrt{(x_k^{Corr} - x_k^1)^2 + (y_k^{Corr} - y_k^1)^2 + (z_k^{Corr} - z_k^1)^2} + \tilde{\varepsilon}_\rho^1 \\ \vdots \\ \sqrt{(x_k^{Corr} - x_k^M)^2 + (y_k^{Corr} - y_k^M)^2 + (z_k^{Corr} - z_k^M)^2} + \tilde{\varepsilon}_\rho^M \end{bmatrix},$$

where the optical sensor position from mechanization is $$x_k^{Mech} = \begin{bmatrix} x_k^{Mech} \\ y_k^{Mech} \\ z_k^{Mech} \end{bmatrix} = \begin{bmatrix} (R_{N,k}^{Mech} + h_k^{Mech})\cos\varphi_k^{Mech}\cos\lambda_k^{Mech} \\ (R_{N,k}^{Mech} + h_k^{Mech})\cos\varphi_k^{Mech}\sin\lambda_k^{Mech} \\ \{R_{N,k}^{Mech}(1 - e^2) + h_k^{Mech}\}\sin\varphi_k^{Mech} \end{bmatrix},$$

the corrected optical sensor position is $$x_k^{Corr} = \begin{bmatrix} x_k^{Corr} \\ y_k^{Corr} \\ z_k^{Corr} \end{bmatrix} =$$

$$\begin{bmatrix} (R_{N,k}^{Mech} - \delta R_{N,k} + h_k^{Mech} - \delta h_k)\cos(\varphi_k^{Mech} - \delta\varphi_k)\cos(\lambda_k^{Mech} - \delta\lambda_k) \\ (R_{N,k}^{Mech} - \delta R_{N,k} + h_k^{Mech} - \delta h_k)\cos(\varphi_k^{Mech} - \delta\varphi_k)\sin(\lambda_k^{Mech} - \delta\lambda_k) \\ \{(R_{N,k}^{Mech} - \delta R_{N,k})(1 - e^2) + h_k^{Mech} - \delta h_k\}\sin(\varphi_k^{Mech} - \delta\varphi_k) \end{bmatrix}$$

and $x_k^m = [x_k^m \ y_k^m \ z_k^m]^T$ is the position of the m$^{th}$ optical detected object.

Next, the part of the measurement model for the range-rates is:

$$\begin{bmatrix} \dot{\rho}_k^{1,Mech} - \dot{\rho}_k^{1,rad} \\ \vdots \\ \dot{\rho}_k^{M,Mech} - \dot{\rho}_k^{M,rad} \end{bmatrix} = \begin{bmatrix} 1_{x,k}^{1,Mech} \cdot (v_{x,k}^{Mech} - v_{x,k}^1) + 1_{y,k}^{1,Mech} \cdot (v_{y,k}^{Mech} - v_{y,k}^1) + 1_{z,k}^{1,Mech} \cdot (v_{z,k}^{Mech} - v_{z,k}^1) \\ \vdots \\ 1_{x,k}^{M,Mech} \cdot (v_{x,k}^{Mech} - v_{x,k}^M) + 1_{y,k}^{M,Mech} \cdot (v_{y,k}^{Mech} - v_{y,k}^M) + 1_{z,k}^{M,Mech} \cdot (v_{z,k}^{Mech} - v_{z,k}^M) \end{bmatrix} -$$

$$\begin{bmatrix} 1_{x,k}^{1,Corr} \cdot (v_{x,k}^{Corr} - v_{x,k}^1) + 1_{y,k}^{1,Corr} \cdot (v_{y,k}^{Corr} - v_{y,k}^1) + 1_{z,k}^{1,Corr} \cdot (v_{z,k}^{Corr} - v_{z,k}^1) \\ \vdots \\ 1_{x,k}^{M,Corr} \cdot (v_{x,k}^{Corr} - v_{x,k}^M) + 1_{y,k}^{M,Corr} \cdot (v_{y,k}^{Corr} - v_{y,k}^M) + 1_{z,k}^{M,Corr} \cdot (v_{z,k}^{Corr} - v_{z,k}^M) \end{bmatrix},$$

where $$\begin{bmatrix} v_{x,k}^{Mech} \\ v_{y,k}^{Mech} \\ v_{z,k}^{Mech} \end{bmatrix} = R_{\ell,k}^{e,Mech} \begin{bmatrix} v_{e,k}^{Mech} \\ v_{n,k}^{Mech} \\ v_{u,k}^{Mech} \end{bmatrix} = \begin{bmatrix} -\sin\lambda_k^{Mech} & -\sin\varphi_k^{Mech}\cos\lambda_k^{Mech} & \cos\varphi_k^{Mech}\cos\lambda_k^{Mech} \\ \cos\lambda_k^{Mech} & -\sin\varphi_k^{Mech}\sin\lambda_k^{Mech} & \cos\varphi_k^{Mech}\sin\lambda_k^{Mech} \\ 0 & \cos\varphi_k^{Mech} & \sin\varphi_k^{Mech} \end{bmatrix} \begin{bmatrix} v_{e,k}^{Mech} \\ v_{n,k}^{Mech} \\ v_{u,k}^{Mech} \end{bmatrix}$$ and and $$\begin{bmatrix} v_{x,k}^{Corr} \\ v_{y,k}^{Corr} \\ v_{z,k}^{Corr} \end{bmatrix} = R_{\ell,k}^{e,Corr} \begin{bmatrix} v_{e,k}^{Corr} \\ v_{n,k}^{Corr} \\ v_{u,k}^{Corr} \end{bmatrix} = \begin{bmatrix} -\sin(\lambda_k^{Mech} - \delta\lambda_k) & -\sin(\varphi_k^{Mech} - \delta\varphi_k)\cos(\lambda_k^{Mech} - \delta\lambda_k) & \cos(\varphi_k^{Mech} - \delta\varphi_k)\cos(\lambda_k^{Mech} - \delta\lambda_k) \\ \cos(\lambda_k^{Mech} - \delta\lambda_k) & -\sin(\varphi_k^{Mech} - \delta\varphi_k)\sin(\lambda_k^{Mech} - \delta\lambda_k) & \cos(\varphi_k^{Mech} - \delta\varphi_k)\sin(\lambda_k^{Mech} - \delta\lambda_k) \\ 0 & \cos(\varphi_k^{Mech} - \delta\varphi_k) & \sin(\varphi_k^{Mech} - \delta\varphi_k) \end{bmatrix} \begin{bmatrix} v_{e,k}^{Mech} - \delta v_{e,k} \\ v_{n,k}^{Mech} - \delta v_{n,k} \\ v_{u,k}^{Mech} - \delta v_{u,k} \end{bmatrix}$$

Furthermore, the mechanization version of the line of sight unit vector from $m^{th}$ detected object to the optical sensor is expressed as follows:

$$1_k^{m,Mech} = \frac{[(x_k^{Mech} - x_k^m), (y_k^{Mech} - y_k^m), (z_k^{Mech} - z_k^m)]^T}{\sqrt{(x_k^{Mech} - x_k^m)^2 + (y_k^{Mech} - y_k^m)^2 + (z_k^{Mech} - z_k^m)^2}},$$

$$= [1_{x,k}^{m,Mech}, 1_{y,k}^{m,Mech}, 1_{z,k}^{m,Mech}]^T$$

where the optical sensor position from mechanization is as defined above. The corrected (or estimated) version of the line of sight unit vector from $m^{th}$ detected object to the optical sensor is expressed as follows:

$$1_k^{m,Corr} = \frac{[(x_k^{Corr} - x_k^m), (y_k^{Corr} - y_k^m), (z_k^{Corr} - z_k^m)]^T}{\sqrt{(x_k^{Corr} - x_k^m)^2 + (y_k^{Corr} - y_k^m)^2 + (z_k^{Corr} - z_k^m)^2}},$$

$$= [1_{x,k}^{m,Corr}, 1_{y,k}^{m,Corr}, 1_{z,k}^{m,Corr}]^T$$

where the corrected sensor position is as defined above.

3.4.2 Example 2: Measurement Model for (1) Total-State System Model, (2) System Model with Another Integration Filter In the next example, whether in the case of a total state system model or a system model based on another integration filter or state estimation technique, the measurement model of the current nonlinear state estimation technique is a nonlinear model that relates the optical raw measurements (range measurements and range-rates) at a time epoch k, $z_k$, to the states at time k, $x_k$, and the measurement noise $\varepsilon_k$. Moreover, this also applies to a system model based on another integration filter solution. First, the optical raw measurements are $z_k = [\rho_{c,k}^{1,rad} \ldots \rho_{c,k}^{M,rad} \ \dot{\rho}_k^{1,rad} \ldots \dot{\rho}_k^{M,rad}]^T$ for M detected objects. The nonlinear measurement model can be in the form $z_k = h(x_k, \varepsilon_k)$, where $\varepsilon_k = [\varepsilon_{\rho,k}^1 \ldots \varepsilon_{\rho,k}^M \ \varepsilon_{\dot{\rho},k}^1 \ldots \varepsilon_{\dot{\rho},k}^M]^T$.

The part of the measurement model for the ranges is:

$$\begin{bmatrix} \rho_{c,k}^{1,rad} \\ \vdots \\ \rho_{c,k}^{M,rad} \end{bmatrix} = \begin{bmatrix} \sqrt{(x_k - x_k^1)^2 + (y_k - y_k^1)^2 + (z_k - z_k^1)^2} + \varepsilon_\rho^1 \\ \vdots \\ \sqrt{(x_k - x_k^M)^2 + (y_k - y_k^M)^2 + (z_k - z_k^M)^2} + \varepsilon_\rho^M \end{bmatrix},$$

where the optical sensor position is $$x_k = \begin{bmatrix} x_k \\ y_k \\ z_k \end{bmatrix} = \begin{bmatrix} (R_{N,k} + h_k)\cos\varphi_k \cos\lambda_k \\ (R_{N,k} + h_k)\cos\varphi_k \sin\lambda_k \\ \{R_{N,k}(1-e^2) + h_k\}\sin\varphi_k \end{bmatrix} \text{ and}$$

$$x_k^m = [x_k^m \ y_k^m \ z_k^m]^T$$

is the position of the $m^{th}$ detected object. The part of the measurement model for the range-rates is:

$$\begin{bmatrix} \dot{\rho}_k^{1,rad} \\ \vdots \\ \dot{\rho}_k^{M,rad} \end{bmatrix} = \begin{bmatrix} 1_{x,k}^1 \cdot (v_{x,k} - v_{x,k}^1) + 1_{y,k}^1 \cdot (v_{y,k} - v_{y,k}^1) + 1_{z,k}^1 \cdot (v_{z,k} - v_{z,k}^1) + \varepsilon_{\dot{\rho}}^1 \\ \vdots \\ 1_{x,k}^M \cdot (v_{x,k} - v_{x,k}^M) + 1_{y,k}^M \cdot (v_{y,k} - v_{y,k}^M) + 1_{z,k}^M \cdot (v_{z,k} - v_{z,k}^M) + \varepsilon_{\dot{\rho}}^M \end{bmatrix},$$

where $v^m = [v_x^m, v_y^m, v_z^m]$ is the $m^{th}$ object velocity in the ECEF frame, and $v = [v_x, v_y, v_z]$ is the true optical sensor velocity in the ECEF frame and thus:

$$\begin{bmatrix} v_{x,k} \\ v_{y,k} \\ v_{z,k} \end{bmatrix} = R_{\ell,k}^{e,Mech} \begin{bmatrix} v_{e,k} \\ v_{n,k} \\ v_{u,k} \end{bmatrix} = \begin{bmatrix} -\sin\lambda_k & -\sin\varphi_k\cos\lambda_k & \cos\varphi_k\cos\lambda_k \\ \cos\lambda_k & -\sin\varphi_k\sin\lambda_k & \cos\varphi_k\sin\lambda_k \\ 0 & \cos\varphi_k & \sin\varphi_k \end{bmatrix} \begin{bmatrix} v_{e,k} \\ v_{n,k} \\ v_{u,k} \end{bmatrix}$$

Furthermore, the line of sight unit vector from $m^{th}$ detected object to the optical sensor is expressed as follows:

$$1_k^m = \frac{[(x_k - x_k^m), (y_k - y_k^m), (z_k - z_k^m)]^T}{\sqrt{(x_k - x_k^m)^2 + (y_k - y_k^m)^2 + (z_k - z_k^m)^2}},$$

$$= [1_{x,k}^m, 1_{y,k}^m, 1_{z,k}^m]^T$$

where the optical sensor position is as defined above.

4 Other Optional Optical Sensor-Based Updates

4.1 Optical Sensor/Map-Based Positioning

The above discussion of state estimation has included integrating optical sensor observables (e.g., ranges) with MEMS-based sensors using a tightly-coupled approach for state estimation. In a further aspect, the optical samples and the map may be used to estimate the state of the platform in the global frame at any given time and then integrating the optical sensor estimated states with MEMS-based sensors using loosely-coupled integration approach. The map may include a feature-based map, location-based map or both. The position of the vehicle maybe estimated by matching the current sample from the optical sensor with a surveyed database of samples, where each sample is associated with a state. The sample that results in the highest match indicator (e.g., correlation factor) can be used to infer the state of the vehicle estimated by the optical sensor/map integration. Another approach is to use unique features in the map that can be detected by the optical sensor, and once detected, a position can be inferred. For example, if the optical sensor detects a very specific distribution of road signs across its field of view, the equivalent geometric distribution of signs can be searched for in the map and thereby infer position based on the optical sensor map match, previous estimate of the platform position and other constraints. Motion constraints like non-holonomic constraints can be applied to limit the search space for a match within the map.

These loosely-coupled approaches may be employed with the error-state or the total-state system model. In the case of error-state system model, the loosely-coupled integration uses position and velocity updates from the optical sensor/map estimator. Thus the measurements are given as $z_k = [\varphi_k^{rad} \ \lambda_k^{rad} \ h_k^{rad} \ v_k^{E,rad} \ v_k^{N,rad} \ v_k^{U,rad}]^T$, which consists of the optical sensor information for the latitude, longitude, altitude, and velocity components along East, North, and Up directions respectively. The measurement model can therefore be given as $$\delta z_k = \begin{bmatrix} \delta z_k^\varphi \\ \delta z_k^\lambda \\ \delta z_k^h \\ \delta z_k^{v_e} \\ \delta z_k^{v_n} \\ \delta z_k^{v_u} \end{bmatrix} = h(\delta x_k, v_k) = \begin{bmatrix} \varphi_k^{Mech} - \varphi_k^{rad} \\ \lambda_k^{Mech} - \lambda_k^{rad} \\ h_k^{Mech} - h_k^{rad} \\ v_k^{E,Mech} - v_k^{E,rad} \\ v_k^{N,GPS} - v_k^{N,rad} \\ v_k^{U,GPS} - v_k^{U,rad} \end{bmatrix} + \begin{bmatrix} v_k^\varphi \\ v_k^\lambda \\ v_k^h \\ v_k^E \\ v_k^N \\ v_k^U \end{bmatrix},$$

where $v_k = [v_k^\varphi \ v_k^\lambda \ v_k^h \ v_k^{v_e} \ v_k^{v_n} \ v_k^{v_u} \ v_k^p \ v_k^r]^T$ is the noise in the optical sensor information used for the update.

In the case of total-state system model, the loosely-coupled integration uses position and velocity updates from the optical sensor/map estimator. Thus, the measurements are given as $$z_k = \begin{bmatrix} z_k^\varphi \\ z_k^\lambda \\ z_k^h \\ z_k^{v_e} \\ z_k^{v_n} \\ z_k^{v_u} \end{bmatrix} = h(x_k, v_k) = \begin{bmatrix} \varphi_k^{rad} \\ \lambda_k^{rad} \\ h_k^{rad} \\ v_k^{E,rad} \\ v_k^{N,rad} \\ v_k^{U,rad} \end{bmatrix} + \begin{bmatrix} v_k^\varphi \\ v_k^\lambda \\ v_k^h \\ v_k^E \\ v_k^N \\ v_k^U \end{bmatrix},$$

where $v_k = [v_k^\varphi \ v_k^\lambda \ v_k^h \ v_k^{v_e} \ v_k^{v_n} \ v_k^{v_u} \ v_k^p \ v_k^r]^T$ is the noise in the optical sensor information used for the update.

5 Misalignment Detection and Estimation

In yet another aspect, the techniques of this disclosure may be applied to detect and determine misalignment. As noted above, misalignment may refer to either a mounting misalignment when the device is strapped to the platform or a varying misalignment when the device is non-strapped. Thus, an optional misalignment procedure may be performed to calculate the relative orientation between the frame of the sensor assembly (i.e. device frame) and the frame of the moving platform. The following discussion includes four specific, non-limiting examples.

The device heading, pitch, and roll (attitude angles of the device) can be different than the heading, pitch, and roll of the platform (attitude angles of the platform) and to get a navigation solution for the platform and/or device (processed on the device) with accuracy, the navigation algorithm should have the information about the misalignment as well as the absolute attitude of the platform. This misalignment detection and estimation is intended to enhance the navigation solution. To improve the navigation by applying constraints on the motion of the moving platform (for example in the form of specific updates), the platform attitude angles must be known. Since the device attitude angles are known, the misalignment angles between the device and platform frame are required to obtain the platform attitude angles. If the misalignment angles are known the below constraints are examples of what can be implemented to constrain the navigation solution especially during long absolute velocity outages (such as GNSS signals outages). Exemplary usages include nonholonomic constraints, vehicular dead reckoning, and any other position or velocity constraint that may be applied to the platform after the resolution of the attitude.

Example 1: Heading Misalignment Using Absolute Velocity Updates

In a first example, absolute velocity updates are used to estimate heading misalignment. In order to calculate the portable device heading from gyroscopes an initial heading of the device has to be known. If an absolute velocity source (such as from GNSS) is not available (for example because of interruption) but a magnetometer is available and with adequate readings, it will be used to get the initial device heading. If an absolute velocity source is available and if a magnetometer is not available or not with adequate readings, the velocity source will be used to get the initial heading of the moving platform, and a routine is run to get the initial heading misalignment of the portable device with respect to the moving platform (which is described below), then the initial device heading can be obtained. If an absolute velocity source is available and if a magnetometer is available and with adequate readings, a blended version of the initial device heading calculated from the above two options can be formed.

This example details a suitable routine to get the initial heading misalignment of the portable device with respect to the moving platform if an absolute velocity source is available (such as GNSS). This routine needs: (i) a very first heading of the platform (person or vehicle or other) that can be obtained from the source of absolute velocity provided that the device is not stationary, (ii) the source of absolute velocity to be available for a short duration such as for example about 5 seconds.

The procedure of this routine is to use the absolute velocity in the local level frame to generate acceleration in the local level frame, add gravity acceleration from a gravity model, then use the pitch and roll together with different heading values (device heading corrected for different heading misalignment values) to calculate the accelerations (more literally the specific forces) in the estimated sensor frame. The different heading misalignments are first chosen to cover all the 360 degrees ambiguity. The actual accelerometer readings, after being corrected for the sensor errors (such as biases, scale factors and non-orthogonalities), are compared to all the different calculated ones (example of techniques that can be used here are correlation techniques). A best sector of possible heading misalignments is chosen and divided into more candidates of heading misalignment in this sector. Different accelerations in the estimated sensor frame are generated and again compared to the actual sensor readings. The operation continues either until the accuracy of the solution saturates and no longer improves or until a pre-chosen depth of comparisons is received.

As mentioned above, if an absolute velocity source (such as from GNSS) is not available (for example because of interruption) but a magnetometer is available and with adequate readings, it will be used to get the initial device heading. If an absolute velocity source is available and if a magnetometer is not available or not with adequate readings, the velocity source will be used to get the initial heading of the moving platform when it starts moving as $A_k^{platform} = a \tan 2(v_k^e, v_k^n)$, where k in general is the time index of the absolute velocity readings, and k=0 for the first reading. A routine is run to get the initial heading misalignment of the portable device with respect to the moving platform $\Delta A_{initial}$ (this routine is described below), then the initial device heading is obtained as $A_{initial}^{device} = A_{initial}^{platform} - \Delta A_{initial}$, where a magnetometer is available and with adequate readings, a better blended version of the initial device heading calculated from the above-mentioned two options can be formed The routine needs the track of heading of the platform (vehicle or other) during a short period (such as for example, of about 5 seconds), but there are almost no constraints on platform motion during this period except that the platform cannot be stationary the whole period, but temporary static period is accepted. This heading can be obtained by either one of the following:
  i) the first heading of the platform that can be obtained from the source of absolute velocity provided that the platform is not stationary, this heading is followed (for example) by a gyroscope-based calculation of heading to keep track of the platform heading if the device misalignment with respect to the platform is kept near constant (might slightly change but does not undergo big changes).
  ii) the track of absolute heading of the platform might be obtained from the absolute source of velocity during the short period during which this routine will run. If during this period the platform stops temporarily the last heading is used for the temporary stop period.

The routine also needs the source of absolute velocity to be available for the same short period discussed above. This means that $v_k^e$, $v_k^n$, and $v_k^u$ have to be available during this short period, at whatever data rate this absolute source provides.

The first step of this routine is to use the absolute velocity in the local level frame to generate acceleration in the local level frame $$a_k^e = \frac{v_k^e - v_{k-1}^e}{\Delta t}$$

$$a_k^n = \frac{v_k^n - v_{k-1}^n}{\Delta t}$$

$$a_k^u = \frac{v_k^u - v_{k-1}^u}{\Delta t},$$

where $\Delta t$ is the sampling rate of the absolute velocity source. The next step is to add gravity acceleration from a gravity model to get specific forces in the local level frame $$\begin{bmatrix} f_k^e \\ f_k^n \\ f_k^u \end{bmatrix} = \begin{bmatrix} a_k^e \\ a_k^n \\ a_k^u \end{bmatrix} + \begin{bmatrix} 0 \\ 0 \\ g_k \end{bmatrix}$$

and then use the pitch $p_k^{device}$ and roll $r_k^{device}$ together with different candidate device heading values (calculated from the platform heading corrected for different candidate heading misalignment values) to calculate the accelerations (more literally the specific forces) in the estimated candidate sensor frame. Different heading misalignments are first chosen to cover all the 360 degrees ambiguity, for example, if the heading space is divided equally to 8 options, the following misalignments are the possible candidates to use $$\Delta A^{candidate} \text{ one from } \left[ -pi \quad \frac{-3pi}{4} \quad \frac{-pi}{2} \quad \frac{-pi}{4} \quad 0 \quad \frac{pi}{4} \quad \frac{pi}{2} \quad \frac{3pi}{4} \right]$$

$$A_k^{device} = A_k^{platform} - \Delta A^{condidate}.$$

A rotation matrix for conversion from the device frame (i.e. the accelerometer frame) to the local level (ENU) frame may be used as follows $$R^\ell_{device,k} = \begin{bmatrix} \cos A_k^{device}\cos r_k^{device} + \sin A_k^{device}\sin p_k^{device}\sin r_k^{device} & \sin A_k^{device}\cos p_k^{device} & \cos A_k^{device}\sin r_k^{device} - \sin A_k^{device}\sin p_k^{device}\cos r_k^{device} \\ -\sin A_k^{device}\cos r_k^{device} + \cos A_k^{device}\sin p_k^{device}\sin r_k^{device} & \cos A_k^{device}\cos p_k^{device} & -\sin A_k^{device}\sin r_k^{device} - \cos A_k^{device}\sin p_k^{device}\cos r_k^{device} \\ -\cos p_k^{device}\sin r_k^{device} & \sin p_k^{device} & \cos p_k^{device}\cos r_k^{device} \end{bmatrix}$$

which exhibits the following relation:

$$\begin{bmatrix} f_k^{x,candidate} \\ f_k^{y,candidate} \\ f_k^{z,candidate} \end{bmatrix} = (R_{device,k}^\ell)^T \begin{bmatrix} f_k^e \\ f_k^n \\ f_k^u \end{bmatrix}$$

The actual accelerometers readings are $[f_j^x \; f_j^y \; f_j^z]^T$ where j is the timing index for the higher rate inertial readings (preferably these accelerometers readings are used after removal of the estimated sensor errors). These actual sensors readings are down-sampled to the relatively lower rate of the absolute velocity readings, for example, either by averaging or by dropping of the extra samples. The down-sampled version of these actual accelerometers readings are compared to all the different candidate accelerometer readings (example of comparison techniques that can be used here are correlation techniques some of which can be bias independent, differencing or calculating root mean squared (RMS) errors). A best sector of possible heading misalignments is chosen and divided into further candidates of heading misalignment in this sector.

For example, if the best sector was from a misalignment of $$\frac{-3pi}{4}$$

to a misalignment of $$\frac{-pi}{2},$$

this range will be further divided into 8 new candidates as provided below:

$\Delta A^{candidate}$ one from $$\left[ \frac{-3pi}{4} \quad \frac{-20pi}{28} \quad \frac{-19pi}{28} \quad \frac{-18pi}{28} \quad \frac{-17pi}{28} \quad \frac{-16pi}{28} \quad \frac{-15pi}{28} \quad \frac{-pi}{2} \right].$$

Then the previously described operations are repeated. Different candidate accelerations (or more literally specific forces) in the estimated sensor frame are generated and again compared to the down-sampled actual sensor readings. The operation continues either until the accuracy of the solution saturates and no longer improves or until a specific pre-chosen depth of comparison is achieved. An estimate of the misalignment between the portable device heading and the platform heading is obtained as the best $\Delta A^{candidate}$ together with an indication or measure of its accuracy from the depth of divisions the technique had undergone and the step separation of the last candidate pool for the misalignment. Thus, the initial device heading (that will be used to start the full navigation in this case) is computed from the platform heading and the estimated initial misalignment.

Example 2: Heading Misalignment Using Radius of Rotation

In the next example, the misalignment between a device and a platform may be determined from the radius of rotation of the device, utilizing motion sensor data in the presence or in the absence of absolute navigational information updates. Details regarding suitable techniques may be found in commonly-owned U.S. patent application Ser. No. 14/917,730, filed Mar. 9, 2016, which is hereby incorporated by reference in its entirety.

Example 3: Heading Misalignment Using Acceleration and Deceleration

In another example, the misalignment between a device and a platform may be determined from acceleration and/or deceleration of the platform, utilizing motion sensor data in the presence or in the absence of absolute navigational information updates. Details regarding suitable techniques may be found in commonly-owned U.S. Pat. No. 9,797,727, issued Oct. 24, 2017, which is hereby incorporated by reference in its entirety.

Example 4: Pitch Misalignment Using Absolute Velocity Updates

In a last illustrative example, absolute velocity updates may be used to estimate pitch misalignment. The device pitch angle can be different than the pitch angle of the platform because of mounting misalignment or varying misalignment when the device is non-strapped. To enhance the navigation solution, the pitch misalignment angle is calculated. By definition, pitch misalignment angle is the difference between the device pitch angle and the pitch angle of the platform. To calculate the pitch misalignment angle, a state estimation technique is used. One potential example of a system model that can be used is a Gauss-Markov process, while measurements are obtained from GNSS velocity and accelerometers measurements and applied as a measurement update through the measurement model. One suitable technique employs the following equations, where measurements are the difference between system and GNSS pitch angles:

$$\text{measurement} = pitc_{system} \; pitc_{GPS}$$

$$pitc_{system} = \tan^{-1}\left( \frac{f_y \; a_{GNS}}{\sqrt{f_x^2 + f_z^2}} \right)$$

$$a_{GPS} = \frac{\left(\sqrt{v_{up}^2 + v_{east}^2 + v_{north}^2}\right)_{current} \left(\sqrt{v_{up}^2 + v_{east}^2 + v_{north}^2}\right)_{previous}}{\Delta t}$$

$$pitc_{GPS} = \tan^{-1}\left( \frac{v_{up}^2}{\sqrt{v_{east}^2 + v_{north}^2}} \right)$$

System pitch angle is calculated using accelerometers readings (where $f_y$ is forward accelerometer reading, $f_x$ is lateral accelerometer reading, and $f_z$ is vertical accelerometer reading) and a calculated forward acceleration of the platform. The calculated forward acceleration of the platform can be either from, for example, GNSS velocity measurements (as in the above example) or from odometer speed measurements as another example. As an example, GNSS pitch angle is calculated using GNSS velocity measurements only. Obtaining a measurement and system model, a dedicated Kalman filter or particle filter can be used to obtain the final pitch misalignment angle of the system. Another option to obtain the pitch misalignment angle of the system is to use the described measurement and system models as a part of the larger system and measurement of the main integrated navigation filter (whether Kalman or Particle filter for example) and amending the states of that main filter to include the above described pitch misalignment state. A similar technique may also be applied to obtain roll misalignment.

6 Other Optional Observations

Still further aspects of this disclosure relate to using other observables, including information from a GNSS positioning system and an odometer, as measurement updates in the state estimation technique when integrating the optical samples and the motion sensor data. These optional observations may be used to estimate a more accurate state.

Three main types of INS/GNSS integration have been proposed to attain maximum advantage depending upon the type of use and choice of simplicity versus robustness, leading to three main integration architectures, loosely coupled, tightly coupled and ultra-tightly (or deeply) coupled. Loosely coupled integration uses an estimation technique to integrate inertial sensors data with the position and velocity output of a GNSS receiver. The distinguishing feature of this configuration is a separate filter for the GNSS and is an example of cascaded integration because of the two filters (GNSS filter and integration filter) used in sequence. Tightly coupled integration uses an estimation technique to integrate inertial sensors readings with raw GNSS data (i.e. pseudoranges that can be generated from code or carrier phase or a combination of both, and pseudorange rates that can be calculated from Doppler shifts) to get the vehicle position, velocity, and orientation. In this solution, there is no separate filter for GNSS, but there is a single common master filter that performs the integration. For the loosely coupled integration scheme, at least four satellites are needed to provide acceptable GNSS position and velocity input to the integration technique. The advantage of the tightly coupled approach is that less than four satellites can be used as this integration can provide a GNSS update even if fewer than four satellites are visible, which is typical of a real life trajectory in urban environments as well as thick forest canopies and steep hills. Another advantage of tightly coupled integration is that satellites with poor GNSS measurements can be detected and rejected from being used in the integrated solution. Ultra-tight (deep) integration has two major differences with regard to the other architectures. Firstly, there is a basic difference in the architecture of the GNSS receiver compared to those used in loose and tight integration. Secondly, the information from INS is used as an integral part of the GNSS receiver, thus, INS and GNSS are no longer independent navigators, and the GNSS receiver itself accepts feedback. It should be understood that the present navigation solution may be utilized in any of the foregoing types of integration.

It is to be noted that the state estimation or filtering techniques used for inertial sensors/GNSS integration may work in a total-state approach or in an error state approach, each of which has characteristics described above. It would be known to a person skilled in the art that not all the state estimation or filtering techniques can work in both approaches.

To help illustrate these above concepts, a first error state system model and total-state system model examples are described below that integrate absolute navigational information with an error-state system model. In these present examples, a three-dimensional (3D) navigation solution is provided by calculating 3D position, velocity and attitude of a moving platform. The relative navigational information includes motion sensor data obtained from MEMS-based inertial sensors consisting of three orthogonal accelerometers and three orthogonal gyroscopes, such as sensor assembly 106 of device 100 in FIG. 1. A source of absolute navigational information 116 is also used and host processor 102 may implement integration module 114 to integrate the information using a nonlinear state estimation technique, such as for example, Mixture PF. The reference-based absolute navigational information 116, such as from a GNSS receiver, and the motion sensor data, such as from sensor assembly 102, are integrated using Mixture PF in either a loosely coupled, tightly coupled, or hybrid loosely/tightly coupled architecture, having a system and measurement model, wherein the system model is either a nonlinear error-state system model or a nonlinear total-state model without linearization or approximation that are used with the traditional KF-based solutions and their linearized error-state system models. The filter may optionally be programmed to comprise advanced modeling of inertial sensors stochastic drift. If the filter has the last option, it may optionally be further programmed to use derived updates for such drift from GNSS, where appropriate. The filter may optionally be programmed to automatically detect and assess the quality of GNSS information, and further provide a means of discarding or discounting degraded information. The filter may optionally be programmed to automatically select between a loosely coupled and a tightly coupled integration scheme. Moreover, where tightly coupled architecture is selected, the GNSS information from each available satellite may be assessed independently and either discarded (where degraded) or utilized as a measurement update. In these examples, the navigation solution of the device, whether tethered or non-tethered to the moving platform, is given by $x_k=[\varphi_k, \lambda_k, h_k, v_k^E, v_k^N, v_k^U, p_k, r_k, A_k]^T$, where $\varphi_k$ is the latitude of the vehicle, $\lambda_k$ is the longitude, $h_k$ is the altitude, $v_k^E$ is the velocity along East direction, $v_k^N$ is the velocity along North direction, $v_k^U$ is the velocity along Up vertical direction, $p_k$ is the pitch angle, $r_k$ is the roll angle, and $A_k$ is the azimuth angle.

6.1 Error-State System Model Integration

The motion model used in the mechanization is given by $x_k=f_{mech}(x_{k-1}, u_{k-1})$ where $u_{k-1}$ is the control input which is the inertial sensors readings that correspond to transforming the state from time epoch k−1 to time epoch k, this will be the convention used in this explanation for the sensor readings for nomenclature purposes. The nonlinear error-state system model (also called state transition model) is given by $\delta x_k=f(\delta x_{k-1}, u_{k-1}, w_{k-1})$, where $w_k$ is the process noise which is independent of the past and present states and accounts for the uncertainty in the platform motion and the control inputs. The measurement model is $\delta z_k=h(\delta x_k, v_k)$, where $v_k$ is the measurement noise which is independent of the past and current states and the process noise and accounts for uncertainty in GNSS readings.

In this example, when GNSS signal is not available, only samples based on the system model are used, but when GNSS is available both types of samples are used which gives better performance and thus leads to a better performance during GNSS outages. Also adding the samples from GNSS observation leads to faster recovery to true position after GNSS outages.

Measurement Model With Loosely-Coupled Integration

When loosely-coupled integration is used, position and velocity updates are obtained from the GNSS receiver. Thus the measurements are given as $z_k=[\varphi_k^{GPS}\ \lambda_k^{GPS}\ h_k^{GPS}$ $v_k^{E,GPS}\ v_k^{N,GPS}\ v_k^{U,GPS}]^T$, which consists of the GNSS readings for the latitude, longitude, altitude, and velocity components along East, North, and Up directions respectively. The measurement model can therefore be given as $$z_k = \begin{bmatrix} z_k^\varphi \\ z_k^\lambda \\ z_k^h \\ z_k^{v_e} \\ z_k^{v_n} \\ z_k^{v_u} \end{bmatrix} = h(x_k, v_k) = \begin{bmatrix} \varphi_k^{GPS} \\ \lambda_k^{GPS} \\ h_k^{GPS} \\ v_k^{E,GPS} \\ v_k^{N,GPS} \\ v_k^{U,GPS} \end{bmatrix} + \begin{bmatrix} v_k^\varphi \\ v_k^\lambda \\ v_k^h \\ v_k^E \\ v_k^N \\ v_k^U \end{bmatrix},$$

where $v_k = [v_k^\varphi\ v_k^\lambda\ v_k^h\ v_k^{v_e}\ v_k^{v_n}\ v_k^{v_u}\ v_k^P\ v_k^r]^T$ is the noise in the GNSS observations used for update.

Tightly-Coupled Integration

Background.

There are three main observables related to GPS: pseudoranges, Doppler shift (from which pseudorange rates are calculated), and the carrier phase. The present example utilizes only to the first two observables.

Pseudoranges are the raw ranges between satellites and receiver. A pseudorange to a certain satellite is obtained by measuring the time it takes for the GPS signal to propagate from this satellite to the receiver and multiplying it by the speed of light. The pseudorange measurement for the $m^{th}$ satellite is:

$$\rho^m = c(t_r - t_t)$$

where $\underline{\Sigma^m}$ is the pseudorange observation from the $\underline{m^{th}}$ satellite to receiver (in meters), $t_t$ is the transmit time, $t_r$ is the receive time, and c is the speed of light (in meters/sec).

For the GPS errors, the satellite and receiver clocks are not synchronized and each of them has an offset from the GPS system time. Despite the several errors in the pseudorange measurements, the most effective is the offset of the inexpensive clock used inside the receiver from the GPS system time.

The pseudorange measurement for the $m^{th}$ satellite, showing the different errors contaminating it, is given as follows:

$$\rho^m = r^m + c\delta t_r - c\delta t_s + cI^m + cT^m + \varepsilon_\rho^m$$

where $r^m$ is the true range between the receiver antenna at time $t_r$ and the satellite antenna at time $t_t$ (in meters), $\delta t_r$ is the receiver clock offset (in seconds), $\delta t_s$ is the satellite clock offset (in seconds), $I^m$ is the ionospheric delay (in seconds), $T^m$ is the tropospheric delay (in seconds), $\varepsilon_\rho^m$ is the error in range due to a combination of receiver noise and other errors such as multipath effects and orbit prediction errors (in meters).

The incoming frequency at the GPS receiver is not exactly the L1 or L2 frequency but is shifted from the original value sent by the satellite. This is called the Doppler shift and it is due to relative motion between the satellite and the receiver. The Doppler shift of the $m^{th}$ satellite is the projection of relative velocities (of satellite and receiver) onto the line of sight vector multiplied by the transmitted frequency and divided by the speed of light, and is given by:

$$D^m = \frac{\{(v^m - v) \cdot 1^m\} L_1}{c},$$

where $v^m = [v_x^m, v_y^m, v_z^m]$ is the $m^{th}$ satellite velocity in the ECEF frame, $v = [v_x, v_y, v_z]$ is the true receiver velocity in the ECEF frame, $L_1$ is the satellite transmitted frequency, and $$1^m = \frac{[(x-x^m), (y-y^m), (z-z^m)]^T}{\sqrt{(x-x^m)^2 + (y-y^m)^2 + (z-z^m)^2}} = [1_x^m, 1_y^m, 1_z^m]^T$$

is the true line of sight vector from the $m^{th}$ satellite to the receiver.

Given the measured Doppler shift, the pseudorange rate $\dot{\rho}^m$ is calculated as follows:

$$\dot{\rho}^m = -\frac{D^m c}{L_1}$$

After compensating for the satellite clock bias, Ionospheric and Tropospheric errors, the corrected pseudorange can be written as:

$$\rho_c^m = r^m + c\delta t_r + \tilde{\varepsilon}_\rho^m$$

where, $\tilde{\varepsilon}_\rho^m$ represents the total effect of residual errors. The true geometric range from $m^{th}$ satellite to receiver is the Euclidean distance and is given as follows:

$$r^m = \sqrt{(x-x^m)^2 + (y-y^m)^2 + (z-z^m)^2} = \|x - x^m\|$$

where $x = [x, y, z]^T$ is the receiver position in ECEF frame, $x^m = [x^m, y^m, z^m]^T$ is the position of the $m^{th}$ satellite at the corrected transmission time but seen in the ECEF frame at the corrected reception time of the signal. Satellite positions are initially calculated at the transmission time, and this position is in the ECEF frame which is not in the ECEF frame at the time of receiving the signal. This time difference may be approximately in the range of 70-90 milliseconds, during which the Earth and the ECEF rotate, and this can cause a range error of about 10-20 meters. To correct for this fact, the satellite position at transmission time has to be represented at the ECEF frame at the reception time not the transmission time. One can either do the correction before the measurement model or in the measurement model itself. In the present example, the satellite position correction is done before the integration filter and then passed to the filter, thus the measurement model uses the corrected position reported in the ECEF at reception time.

The details of using Ephemeris data to calculate the satellites' positions and velocities are known, and can subsequently be followed by the correction mentioned above.

In vector form, the equation may be expressed as follows: $\rho_c^m = \|x - x^m\| + b_r + \tilde{\varepsilon}_\rho^m$, where $b_r = c\delta t_r$ is the error in range (in meters) due to receiver clock bias. This equation is nonlinear. The traditional techniques relying on KF used to linearize these equations about the pseudorange estimate obtained from the inertial sensors mechanization. PF is suggested in this example to accommodate nonlinear models, thus there is no need for linearizing this equation. The nonlinear pseudorange model for M satellites visible to the receiver is:

$$\begin{bmatrix} \rho_c^1 \\ \vdots \\ \rho_c^M \end{bmatrix} = \begin{bmatrix} \|x - x^1\| + b_r + \tilde{\varepsilon}_\rho^1 \\ \vdots \\ \|x - x^M\| + b_r + \tilde{\varepsilon}_\rho^M \end{bmatrix} =$$

$$\begin{bmatrix} \sqrt{(x-x^1)^2 + (y-y^1)^2 + (z-z^1)^2} + b_r + \tilde{\varepsilon}_\rho^1 \\ \vdots \\ \sqrt{(x-x^M)^2 + (y-y^M)^2 + (z-z^M)^2} + b_r + \tilde{\varepsilon}_\rho^M \end{bmatrix}$$

The position state x here is in ECEF rectangular coordinates and desirably should be in Geodetic coordinates, which is part of the state vector used in the Mixture PF. The relationship between the Geodetic and Cartesian coordinates is given by:

$$\begin{bmatrix} x \\ y \\ z \end{bmatrix} = \begin{bmatrix} (R_N + h)\cos\varphi \cos\lambda \\ (R_N + h)\cos\varphi \sin\lambda \\ \{R_N(1 - e^2) + h\}\sin\varphi \end{bmatrix},$$

where $R^N$ is the normal radius of curvature of the Earth's ellipsoid and e is the eccentricity of the Meridian ellipse. Thus the pseudorange model is:

$$\begin{bmatrix} \rho_c^1 \\ \vdots \\ \rho_c^M \end{bmatrix} = \begin{bmatrix} \sqrt{((R_N + h)\cos\varphi\cos\lambda - x^1)^2 + ((R_N + h)\cos\varphi\sin\lambda - y^1)^2 + (\{R_N(1-e^2) + h\}\sin\varphi - z^1)^2} + b_r + \varepsilon_\rho^1 \\ \vdots \\ \sqrt{((R_N + h)\cos\varphi\cos\lambda - x^M)^2 + ((R_N + h)\cos\varphi\sin\lambda - y^M)^2 + (\{R_N(1-e^2) + h\}\sin\varphi - z^M)^2} + b_r + \varepsilon_\rho^M \end{bmatrix}$$

The true pseudorange rate between the $m^{th}$ satellite and receiver is expressed as $$\dot{\rho}^m = 1_x^m(v_x - v_x^m) + 1_y^m(v_y - v_y^m) + 1_z^m(v_z - v_z^m)$$

The pseudorange rate for the $m^{th}$ satellite can be modeled as follows:

$$\dot{\rho}^m = 1_x^m(v_x - v_x^m) + 1_y^m(v_y - v_y^m) + 1_z^m(v_z - v_z^m) + c\dot{\delta}t_r + \varepsilon_{\dot{\rho}}^m$$
$$= 1_x^m(v_x - v_x^m) + 1_y^m(v_y - v_y^m) + 1_z^m(v_z - v_z^m) + d_r + \varepsilon_{\dot{\rho}}^m$$

where $\dot{\delta}t_r$ is the receiver clock drift (unit-less), $d_r$ is the receiver clock drift (in meters/sec), $\varepsilon_{\dot{\rho}}^m$ is the error in observation (in meters/sec).

This last equation is linear in velocities, but it is nonlinear in position. This can be seen by examining the expression for the line of sight unit vector above. Again, there is no need for linearization because of the nonlinear capabilities of PF. The nonlinear model for pseudorange rates of M satellites, again in ECEF rectangular coordinates is:

$$\begin{bmatrix} \dot{\rho}^1 \\ \vdots \\ \dot{\rho}^M \end{bmatrix} = \begin{bmatrix} 1_x^1(v_x - v_x^1) + 1_y^1(v_y - v_y^1) + 1_z^1(v_z - v_z^1) + d_r + \varepsilon_{\dot{\rho}}^1 \\ \vdots \\ 1_x^M(v_x - v_X^M) + 1_y^M(v_y - v_y^M) + 1_z^M(v_z - v_z^M) + d_r + \varepsilon_{\dot{\rho}}^M \end{bmatrix}$$

The velocities here are in ECEF and need to be in local-level frame because this is part of the state vector in Mixture PF. The transformation uses the rotation matrix from the local-level frame to ECEF ($R_l^e$) and is as follows:

$$\begin{bmatrix} v_x \\ v_y \\ v_z \end{bmatrix} = R_\ell^e \begin{bmatrix} v_e \\ v_n \\ v_u \end{bmatrix} = \begin{bmatrix} -\sin\lambda & -\sin\varphi\cos\lambda & \cos\varphi\cos\lambda \\ \cos\lambda & -\sin\varphi\sin\lambda & \cos\varphi\sin\lambda \\ 0 & \cos\varphi & \sin\varphi \end{bmatrix} \begin{bmatrix} v_e \\ v_n \\ v_u \end{bmatrix}$$

Furthermore, the line of sight unit vector from $m^{th}$ satellite to receiver will be expressed as follows:

$$1^m = \frac{[((R_N + h)\cos\varphi\cos\lambda - x^m), ((R_N + h)\cos\varphi\sin\lambda - y^m), (\{R_N(1 - e^2) + h\}\sin\varphi - z^m)]^T}{\sqrt{((R_N + h)\cos\varphi\cos\lambda - x^m)^2 + ((R_N + h)\cos\varphi\sin\lambda - y^m)^2 + (\{R_N(1 - e^2) + h\}\sin\varphi - z^m)^2}}$$

$$= [1_x^m, 1_y^m, 1_z^m]^T$$

The foregoing combined equations constitute the overall nonlinear model for M visible satellites.

Augmenting the System Model

When tightly-coupled integration is employed, the system model can be augmented with two states, namely: the bias of the GPS receiver clock $b_r$ and its drift $d_r$. Both of these are modeled as $$\begin{bmatrix} b_r \\ \dot{d}_r \end{bmatrix} = \begin{bmatrix} d_r + w_b \\ w_d \end{bmatrix},$$

where $w_b$ and $w_d$ are the noise terms. In discrete form, this equation can be written $$\begin{bmatrix} b_{r,k} \\ d_{r,k} \end{bmatrix} = \begin{bmatrix} b_{r,k-1} + (d_{r,k-1} + w_{b,k-1})\Delta t \\ d_{r,k-1} + w_{d,k-1}\Delta t \end{bmatrix},$$

where $\Delta t$ is the sampling time. This model is used as part of the system model described earlier.

Measurement Model With Tightly-Coupled Integration

Since this is a total state solution, the measurement model in the case of tightly-coupled integration is a nonlinear model that relates the GPS raw measurements (pseudorange measurements and pseudorange rates) at a time epoch k, $\delta z_k$, to the states at time k, $\delta x_k$ and the measurement noise $\varepsilon_k$. First, the GPS raw measurements are $z_k = [\rho_k^1 \ldots \rho_k^M \; \dot{\rho}_k^1 \ldots \dot{\rho}_k^M]^T$ for M visible satellites. The nonlinear measurement model for tightly-coupled integration can be in the form:

$$\delta z_k = h(\delta x_k, \varepsilon_k), \text{ where}$$

$$\delta z_k = [\rho_k^{1,Mech} - \rho_{c,k}^{1,GPS} \; \ldots \; \rho_k^{M,Mech} - \rho_{c,k}^{M,GPS} \\ \dot{\rho}_k^{1,Mech} - \dot{\rho}_k^{1,GPS} \; \ldots \; \dot{\rho}_k^{M,Mech} - \dot{\rho}_k^{M,GPS}]^T$$

and $\varepsilon_k = [\tilde{\varepsilon}_{\rho,k}^1 \ldots \tilde{\varepsilon}_{\rho,k}^M \; \tilde{\varepsilon}_{\dot{\rho},k}^1 \ldots \tilde{\varepsilon}_{\dot{\rho},k}^M]^T$.

The part of the measurement model for the pseudoranges is:

$$\begin{bmatrix} \rho_k^{1,Mech} - \rho_{c,k}^{1,GPS} \\ \vdots \\ \rho_k^{M,Mech} - \rho_{c,k}^{M,GPS} \end{bmatrix} =$$

$$\begin{bmatrix} \sqrt{(x_k^{Mech} - x_k^1)^2 + (y_k^{Mech} - y_k^1)^2 + (z_k^{Mech} - z_k^1)^2} \\ \vdots \\ \sqrt{(x_k^{Mech} - x_k^M)^2 + (y_k^{Mech} - y_k^M)^2 + (z_k^{Mech} - z_k^M)^2} \end{bmatrix} -$$

$$\begin{bmatrix} \sqrt{(x_k^{Corr} - x_k^1)^2 + (y_k^{Corr} - y_k^1)^2 + (z_k^{Corr} - z_k^1)^2} + b_{r,k} + \tilde{\varepsilon}_\rho^1 \\ \vdots \\ \sqrt{(x_k^{Corr} - x_k^M)^2 + (y_k^{Corr} - y_k^M)^2 + (z_k^{Corr} - z_k^M)^2} + b_{r,k} + \tilde{\varepsilon}_\rho^M \end{bmatrix},$$

where the receiver position from mechanization is $$x_k^{Mech} = \begin{bmatrix} x_k^{Mech} \\ y_k^{Mech} \\ z_k^{Mech} \end{bmatrix} = \begin{bmatrix} (R_{N,k}^{Mech} + h_k^{Mech})\cos\varphi_k^{Mech}\cos\lambda_k^{Mech} \\ (R_{N,k}^{Mech} + h_k^{Mech})\cos\varphi_k^{Mech}\sin\lambda_k^{Mech} \\ \{R_{N,k}^{Mech}(1 - e^2) + h_k^{Mech}\}\sin\varphi_k^{Mech} \end{bmatrix},$$

the corrected receiver position is $$x_k^{Corr} = \begin{bmatrix} x_k^{Corr} \\ y_k^{Corr} \\ z_k^{Corr} \end{bmatrix} =$$

$$\begin{bmatrix} (R_{N,k}^{Mech} - \delta R_{N,k} + h_k^{Mech} - \delta h_k)\cos(\varphi_k^{Mech} - \delta\varphi_k)\cos(\lambda_k^{Mech} - \delta\lambda_k) \\ (R_{N,k}^{Mech} - \delta R_{N,k} + h_k^{Mech} - \delta h_k)\cos(\varphi_k^{Mech} - \delta\varphi_k)\sin(\lambda_k^{Mech} - \delta\lambda_k) \\ \{(R_{N,k}^{Mech} - \delta R_{N,k})(1 - e^2) + h_k^{Mech} - \delta h_k\}\sin(\varphi_k^{Mech} - \delta\varphi_k) \end{bmatrix}$$

and $x_k^m = [x_k^m \; y_k^m \; z_k^m]^T$ is the position of the $m^{th}$ satellite at the corrected transmission time but seen in the ECEF frame at the corrected reception time of the signal.

The part of the measurement model for the pseudorange rates is:

$$\begin{bmatrix} \dot{\rho}_k^{1,Mech} - \dot{\rho}_k^{1,GPS} \\ \vdots \\ \dot{\rho}_k^{M,Mech} - \dot{\rho}_k^{M,GPS} \end{bmatrix} =$$

$$\begin{bmatrix} 1_{x,k}^{1,Mech} \cdot (v_{x,k}^{Mech} - v_{x,k}^1) + 1_{y,k}^{1,Mech} \cdot (v_{y,k}^{Mech} - v_{y,k}^1) + 1_{z,k}^{1,Mech} \cdot (v_{z,k}^{Mech} - v_{z,k}^1) \\ \vdots \\ 1_{x,k}^{M,Mech} \cdot (v_{x,k}^{Mech} - v_{x,k}^M) + 1_{y,k}^{M,Mech} \cdot (v_{y,k}^{Mech} - v_{y,k}^M) + 1_{z,k}^{M,Mech} \cdot (v_{z,k}^{Mech} - v_{z,k}^M) \end{bmatrix} -$$

$$\begin{bmatrix} 1_{x,k}^{1,Corr} \cdot (v_{x,k}^{Corr} - v_{x,k}^1) + 1_{y,k}^{1,Corr} \cdot (v_{y,k}^{Corr} - v_{y,k}^1) + 1_{z,k}^{1,Corr} \cdot (v_{z,k}^{Corr} - v_{z,k}^1) + d_{r,k} + \varepsilon_{\dot{\rho}}^1 \\ \vdots \\ 1_{x,k}^{M,Corr} \cdot (v_{x,k}^{Corr} - v_{x,k}^M) + 1_{y,k}^{M,Corr} \cdot (v_{y,k}^{Corr} - v_{y,k}^M) + 1_{z,k}^{M,Corr} \cdot (v_{z,k}^{Corr} - v_{z,k}^M) + d_{r,k} + \varepsilon_{\dot{\rho}}^M \end{bmatrix},$$

where
$v^m=[v_x^m, v_y^m, v_z^m]$ is the $m^{th}$ satellite velocity in the ECEF frame and $v=[v_x, v_y, v_z]$ is the true receiver velocity in the ECEF frame, thus:

$$\begin{bmatrix} v_{x,k} \\ v_{y,k} \\ v_{z,k} \end{bmatrix} = R_{\ell,k}^{e,Mech} \begin{bmatrix} v_{e,k} \\ v_{n,k} \\ v_{u,k} \end{bmatrix} = \begin{bmatrix} -\sin\lambda_k & -\sin\varphi_k\cos\lambda_k & \cos\varphi_k\cos\lambda_k \\ \cos\lambda_k & -\sin\varphi_k\sin\lambda_k & \cos\varphi_k\sin\lambda_k \\ 0 & \cos\varphi_k & \sin\varphi_k \end{bmatrix} \begin{bmatrix} v_{e,k} \\ v_{n,k} \\ v_{u,k} \end{bmatrix}$$

Furthermore, the mechanization version of the line of sight unit vector from $m^{th}$ satellite to receiver is expressed as follows:

$$1_k^{m,Mech} = \frac{[(x_k^{Mech} - x_k^m), (y_k^{Mech} - y_k^m), (z_k^{Mech} - z_k^m)]^T}{\sqrt{(x_k^{Mech} - x_k^m)^2 + (y_k^{Mech} - y_k^m)^2 + (z_k^{Mech} - z_k^m)^2}}$$
$$= [1_{x,k}^{m,Mech}, 1_{y,k}^{m,Mech}, 1_{z,k}^{m,Mech}]^T,$$

where the receiver position from mechanization is as defined above and the corrected (or estimated) version of the line of sight unit vector from $m^{th}$ satellite to receiver is expressed as $$1_k^{m,Corr} = \frac{[(x_k^{Corr} - x_k^m), (y_k^{Corr} - y_k^m), (z_k^{Corr} - z_k^m)]^T}{\sqrt{(x_k^{Corr} - x_k^m)^2 + (y_k^{Corr} - y_k^m)^2 + (z_k^{Corr} - z_k^m)^2}}$$
$$= [1_{x,k}^{m,Corr}, 1_{y,k}^{m,Corr}, 1_{z,k}^{m,Corr}]^T,$$

where the corrected receiver position is as defined above.

Hybrid Loosely Tightly Coupled Scheme

The proposed navigation module may adopt a hybrid loosely/tightly coupled solution and attempts to take advantage of the updates of the inertial sensors drift from GNSS when suitable, which rely on loosely-coupled updates from GNSS (since they rely in their calculations on GNSS position and velocity readings), as well as the benefits of tightly-coupled integration. Another advantage of loosely coupled that the hybrid solution may benefit from is the GNSS-derived heading update relying on GNSS velocity readings when in motion (this update is only applicable if misalignment was resolved or there is no misalignment in a certain application).

When the availability and the quality of GNSS position and velocity readings passes the assessment, loosely-coupled measurement update is performed for position, velocity, possibly azimuth (when applicable as discussed earlier), and possibly inertial sensors' stochastic errors (if this option is used). Each update can be performed according to its own quality assessment of the update. Whenever the testing procedure detects degraded GNSS performance either because the visible satellite number falls below four or because the GNSS quality examination failed, the filter can switch to a tightly-coupled update mode. Furthermore, each satellite can be assessed independently of the others to check whether it is adequate to use it for update. This check again may exploit improved performance of the Mixture PF with the robust modeling. Thus the pseudorange estimate for each visible satellite to the receiver position estimated from the prediction phase of the Mixture PF can be compared to the measured one. If the measured pseudorange of a certain satellite is too far off, this is an indication of degradation (e.g. the presence of reflections with loss of direct line-of-sight), and this satellite's measurements can be discarded, while other satellites can be used for the update.

6.2 Total-State System Model Integration

The nonlinear total-state system model (also called state transition model) is given by $x_k=f(x_{k-1},u_{k-1},w_{k-1})$, where $u_{k-1}$ is the control input which is the inertial sensors readings that correspond to transforming the state from time epoch k−1 to time epoch k, this will be the convention used in this explanation for the sensor readings just used for nomenclature purposes. Furthermore, $w_k$ is the process noise which is independent of the past and present states and accounts for the uncertainty in the platform motion and the control inputs. The measurement model is $z_k=h(x_k,v_k)$ where $v_k$ is the measurement noise which is independent of the past and current states and the process noise and accounts for uncertainty in GNSS readings.

For the application at hand, in the sampling phase of the Mixture PF used in the present embodiment proposed in this example, some samples predicted according to the most recent observation are added to those samples predicted according to the system model. The most recent observation is used to adjust the importance weights of the samples predicted according to the system model. The importance weights of the additional samples predicted according to the most recent observation are adjusted according to the probability that they were generated from the samples of the last iteration and the system model with latest control inputs. When GNSS signal is not available, only samples based on the system model are used, but when GNSS is available both types of samples are used which gives better performance and thus leads to a better performance during GNSS outages. Also adding the samples from GNSS observation leads to faster recovery to true position after GNSS outages.

Measurement Model With Loosely-Coupled Integration

When loosely-coupled integration is used, position and velocity updates are obtained from the GNSS receiver. Thus the measurements are given as $z_k=[\varphi_k^{GPS}\ \lambda_k^{GPS}\ h_k^{GPS}\ v_k^{E,GPS}\ v_k^{N,GPS}\ v_k^{U,GPS}]^T$, which consists of the GNSS readings for the latitude, longitude, altitude, and velocity components along East, North, and Up directions respectively. The measurement model can therefore be given as:

$$z_k = \begin{bmatrix} z_k^\varphi \\ z_k^\lambda \\ z_k^h \\ z_k^{v_e} \\ z_k^{v_n} \\ z_k^{v_u} \end{bmatrix} = h(x_k, v_k) = \begin{bmatrix} \varphi_k^{GPS} \\ \lambda_k^{GPS} \\ h_k^{GPS} \\ v_k^{E,GPS} \\ v_k^{N,GPS} \\ v_k^{U,GPS} \end{bmatrix} + \begin{bmatrix} v_k^\varphi \\ v_k^\lambda \\ v_k^h \\ v_k^E \\ v_k^N \\ v_k^U \end{bmatrix},$$

where $v_k=[v_k^\varphi\ v_k^\lambda\ v_k^h\ v_k^{v_e}\ v_k^{v_n}\ v_k^{v_u}\ v_k^p\ v_k^r]^T$ is the noise in the GNSS observations used for update.

Tightly-Coupled Integration
Augmenting the System Model

The system model can be augmented with two states, namely the bias of the GPS receiver clock $b_r$ and its drift $d_r$. Both of these are modeled as follows:

$$\begin{bmatrix} \dot{b}_r \\ \dot{d}_r \end{bmatrix} = \begin{bmatrix} d_r + w_b \\ w_d \end{bmatrix},$$

where $w_b$ and $w_d$ are the noise terms. In discrete form it can be written as:

$$\begin{bmatrix} b_{r,k} \\ d_{r,k} \end{bmatrix} = \begin{bmatrix} b_{r,k-1} + (d_{r,k-1} + w_{b,k-1})\Delta t \\ d_{r,k-1} + w_{d,k-1}\Delta t \end{bmatrix},$$

where $\Delta t$ is the sampling time. This model is used as part of either the system model described earlier.

Measurement Model With Tightly-Coupled Integration

In this example, since this is a total state solution, the measurement model in the case of tightly-coupled integration is a nonlinear model that relates the GPS raw measurements (pseudorange measurements and pseudorange rates) at a time epoch k, $z_k$, to the states at time k, $x_k$, and the measurement noise $\varepsilon_k$. First, the GPS raw measurements are $z_k = [\rho_{c,k}^{1,GPS} \ldots \rho_{c,k}^{M,GPS} \; \dot\rho_k^{1,GPS} \ldots \dot\rho_k^{M,GPS}]^T$ for M visible satellites. The nonlinear measurement model for tightly-coupled integration can be in the form $z_k = h(x_k, \varepsilon_k)$, where $\varepsilon_k = [\tilde\varepsilon_{\rho,k}^1 \ldots \tilde\varepsilon_{\rho,k}^M \; \tilde\varepsilon_{\dot\rho,k}^1 \ldots \tilde\varepsilon_{\dot\rho,k}^M]^T$.

The part of the measurement model for the pseudoranges is:

$$\begin{bmatrix} \rho_{c,k}^{1,GPS} \\ \vdots \\ \rho_{c,k}^{M,GPS} \end{bmatrix} = \begin{bmatrix} \sqrt{(x_k - x_k^1)^2 + (y_k - y_k^1)^2 + (z_k - z_k^1)^2} + b_{r,k} + \tilde\varepsilon_\rho^1 \\ \vdots \\ \sqrt{(x_k - x_k^M)^2 + (y_k - y_k^M)^2 + (z_k - z_k^M)^2} + b_{r,k} + \tilde\varepsilon_\rho^M \end{bmatrix},$$

where the receiver position is $$x_k = \begin{bmatrix} x_k \\ y_k \\ z_k \end{bmatrix} = \begin{bmatrix} (R_{N,k} + h_k)\cos\varphi_k\cos\lambda_k \\ (R_{N,k} + h_k)\cos\varphi_k\sin\lambda_k \\ \{R_{N,k}(1-e^2) + h_k\}\sin\varphi_k \end{bmatrix} \text{ and}$$

$$x_k^m = [x_k^m \; y_k^m \; z_k^m]^T$$

is the position of the $m^{th}$ satellite at the corrected transmission time but seen in the ECEF frame at the corrected reception time of the signal.

The part of the measurement model for the pseudorange rates is:

$$\begin{bmatrix} \dot\rho_k^{1,GPS} \\ \vdots \\ \dot\rho_k^{M,GPS} \end{bmatrix} =$$

$$\begin{bmatrix} 1_{x,k}^1 \cdot (v_{x,k} - v_{x,k}^1) + 1_{y,k}^1 \cdot (v_{y,k} - v_{y,k}^1) + 1_{z,k}^1 \cdot (v_{z,k} - v_{z,k}^1) + d_{r,k} + \varepsilon_{\dot\rho}^1 \\ \vdots \\ 1_{x,k}^M \cdot (v_{x,k} - v_{x,k}^M) + 1_{y,k}^M \cdot (v_{y,k} - v_{y,k}^M) + 1_{z,k}^M \cdot (v_{z,k} - v_{z,k}^M) + d_{r,k} + \varepsilon_{\dot\rho}^M \end{bmatrix},$$

where $v^m = [v_x^m, v_y^m, v_z^m]$ is the $m^{th}$ satellite velocity in the ECEF frame, and $v = [v_x, v_y, v_z]$ is the true receiver velocity in the ECEF frame and thus:

$$\begin{bmatrix} v_{x,k} \\ v_{y,k} \\ v_{z,k} \end{bmatrix} = R_{\ell,k}^{e,Mech} \begin{bmatrix} v_{e,k} \\ v_{n,k} \\ v_{u,k} \end{bmatrix} = \begin{bmatrix} -\sin\lambda_k & -\sin\varphi_k\cos\lambda_k & \cos\varphi_k\cos\lambda_k \\ \cos\lambda_k & -\sin\varphi_k\sin\lambda_k & \cos\varphi_k\sin\lambda_k \\ 0 & \cos\varphi_k & \sin\varphi_k \end{bmatrix} \begin{bmatrix} v_{e,k} \\ v_{n,k} \\ v_{u,k} \end{bmatrix}$$

Furthermore, the line of sight unit vector from mth satellite to receiver is expressed as follows:

$$1_k^m = \frac{[(x_k - x_k^m), (y_k - y_k^m), (z_k - z_k^m)]^T}{\sqrt{(x_k - x_k^m)^2 + (y_k - y_k^m)^2 + (z_k - z_k^m)^2}}$$

$$= [1_{x,k}^m, 1_{y,k}^m, 1_{z,k}^m]^T,$$

where the receiver position is as defined above.

Hybrid Loosely Tightly Coupled Scheme

The proposed navigation module may adopt a hybrid loosely/tightly coupled solution as explained above for error-state system model integration for the reasons discussed above.

7 Additional Optional Modules

Still further aspects of this disclosure relate to optional operations or modules that can be utilized with the techniques described above. The following section gives non-limiting examples of some of these options.

7.1 Optical-Based Simultaneous Localization and Mapping

Further, an optical-based Simultaneous Localization and Mapping (SLAM) process can be incorporated with the techniques of this disclosure. As will be appreciated, SLAM involves determining position information for the platform while building a map. It is assumed that a map is not provided and hence the absolute position of objects is unknown. Thus, the state of the platform and the map which contains an object list are unknown. A practical solution to this problem is to utilize Graph-SLAM algorithms to estimate the state of the platform and build the map as a list of landmarks. In a Graph based SLAM, the nodes in the graph represent the different states of the platform and the links between the nodes depict the constraints set by the motion sensors. Moreover, landmarks are also represented as nodes, and the link between landmarks and the platform's state node at time t represents the distance constraints. The SLAM equations are solved by finding the optimal state of nodes (i.e., position, attitude), such that all constraints are met. There are also several techniques utilized by Graph-SLAM to incorporate the uncertainty of the motion model and the measurement model into the SLAM equations. It is also assumed that the initial state of the platform is known. Moreover, Online Graph-SLAM can be used to reduce the complexity of the graph by removing older states and keeping only one node to represent the current state of the vehicle.

The optical samples along with the object detection module can be used to estimate the distance to the centroid of the objects within the optical sensor's field of view. Motion of detected objects can be used to predict the next state of the vehicle, hence, the Euclidian distance between the current state and the previous state can be used to link both nodes in the graph. The uncertainty of the motion model can be propagated to the Euclidian distance computation and used to modulate the importance of links between poses in the graph. Moreover, the measurement model uncertainty can be propagated to the distance between the landmark and the current state and used to modulate the importance of links between the current states and detected landmarks.

CONTEMPLATED EMBODIMENTS

The present disclosure describes the body frame to be x forward, y positive towards right side of the body and z axis positive downwards. It is contemplated that any body-frame definition can be used for the application of the method and apparatus described herein.

It is contemplated that the techniques of this disclosure can be used with a navigation solution that may optionally utilize automatic zero velocity periods or static period detection with its possible updates and inertial sensors bias recalculations, non-holonomic updates module, advanced modeling and/or calibration of inertial sensors errors, derivation of possible measurements updates for them from GNSS when appropriate, automatic assessment of GNSS solution quality and detecting degraded performance, automatic switching between loosely and tightly coupled integration schemes, assessment of each visible GNSS satellite when in tightly coupled mode, and finally possibly can be used with a backward smoothing module with any type of backward smoothing technique and either running in post mission or in the background on buffered data within the same mission.

It is further contemplated that techniques of this disclosure can also be used with a mode of conveyance technique or a motion mode detection technique to establish the mode of conveyance. This enables the detection of pedestrian mode among other modes such as for example driving mode. When pedestrian mode is detected, the method presented in this disclosure can be made operational to determine the misalignment between the device and the pedestrian.

It is further contemplated that techniques of this disclosure can also be used with a navigation solution that is further programmed to run, in the background, a routine to simulate artificial outages in the absolute navigational information and estimate the parameters of another instance of the state estimation technique used for the solution in the present navigation module to optimize the accuracy and the consistency of the solution. The accuracy and consistency is assessed by comparing the temporary background solution during the simulated outages to a reference solution. The reference solution may be one of the following examples: the absolute navigational information (e.g. GNSS); the forward integrated navigation solution in the device integrating the available sensors with the absolute navigational information (e.g. GNSS) and possibly with the optional speed or velocity readings; or a backward smoothed integrated navigation solution integrating the available sensors with the absolute navigational information (e.g. GNSS) and possibly with the optional speed or velocity readings. The background processing can run either on the same processor as the forward solution processing or on another processor that can communicate with the first processor and can read the saved data from a shared location. The outcome of the background processing solution can benefit the real-time navigation solution in its future run (i.e. real-time run after the background routine has finished running), for example, by having improved values for the parameters of the forward state estimation technique used for navigation in the present module.

It is further contemplated that the techniques of this disclosure can also be used with a navigation solution that is further integrated with maps (such as street maps, indoor maps or models, or any other environment map or model in cases of applications that have such maps or models available) in addition to the different core use of map information discussed above, and a map matching or model matching routine. Map matching or model matching can further enhance the navigation solution during the absolute navigational information (such as GNSS) degradation or interruption. In the case of model matching, a sensor or a group of sensors that acquire information about the environment can be used such as, for example, Laser range finders, cameras and vision systems, or sonar systems. These new systems can be used either as an extra help to enhance the accuracy of the navigation solution during the absolute navigational information problems (degradation or absence), or they can totally replace the absolute navigational information in some applications.

It is further contemplated that the techniques of this disclosure can also be used with a navigation solution that, when working either in a tightly coupled scheme or a hybrid loosely/tightly coupled option, need not be bound to utilize pseudorange measurements (which are calculated from the code not the carrier phase, thus they are called code-based pseudoranges) and the Doppler measurements (used to get the pseudorange rates). The carrier phase measurement of the GNSS receiver can be used as well, for example: (i) as an alternate way to calculate ranges instead of the code-based pseudoranges, or (ii) to enhance the range calculation by incorporating information from both code-based pseudorange and carrier-phase measurements; such enhancement is the carrier-smoothed pseudorange.

It is further contemplated that the techniques of this disclosure can also be used with a navigation solution that relies on an ultra-tight integration scheme between GNSS receiver and the other sensors' readings.

It is further contemplated that the techniques of this disclosure can also be used with a navigation solution that uses various wireless communication systems that can also be used for positioning and navigation either as an additional aid (which will be more beneficial when GNSS is unavailable) or as a substitute for the GNSS information (e.g. for applications where GNSS is not applicable). Examples of these wireless communication systems used for positioning are, such as, those provided by cellular phone towers and signals, radio signals, digital television signals, WiFi, or Wimax. For example, for cellular phone based applications, an absolute coordinate from cell phone towers and the ranges between the indoor user and the towers may be utilized for positioning, whereby the range might be estimated by different methods among which calculating the time of arrival or the time difference of arrival of the closest cell phone positioning coordinates. A method known as Enhanced Observed Time Difference (E-OTD) can be used to get the known coordinates and range. The standard deviation for the range measurements may depend upon the type of oscillator used in the cell phone, and cell tower timing equipment and the transmission losses. WiFi positioning can be done in a variety of ways that includes but is not limited to time of arrival, time difference of arrival, angles of arrival, received signal strength, and fingerprinting techniques, among others; all of the methods provide different level of accuracies. The wireless communication system used for positioning may use different techniques for modeling the errors in the ranging, angles, or signal strength from wireless signals, and may use different multipath mitigation techniques. All the above mentioned ideas, among others, are also applicable in a similar manner for other wireless positioning techniques based on wireless communications systems.

It is further contemplated that the techniques of this disclosure can also be used with a navigation solution that utilizes aiding information from other moving devices. This aiding information can be used as additional aid (that will be more beneficial when GNSS is unavailable) or as a substitute for the GNSS information (e.g. for applications where GNSS based positioning is not applicable). One example of aiding information from other devices may be relying on wireless communication systems between different devices. The underlying idea is that the devices that have better positioning or navigation solution (for example having GNSS with good availability and accuracy) can help the devices with degraded or unavailable GNSS to get an improved positioning or navigation solution. This help relies on the well-known position of the aiding device(s) and the wireless communication system for positioning the device(s) with degraded or unavailable GNSS. This contemplated variant refers to the one or both circumstance(s) where: (i) the device(s) with degraded or unavailable GNSS utilize the methods described herein and get aiding from other devices and communication system, (ii) the aiding device with GNSS available and thus a good navigation solution utilize the methods described herein. The wireless communication system used for positioning may rely on different communication protocols, and it may rely on different methods, such as for example, time of arrival, time difference of arrival, angles of arrival, and received signal strength, among others. The wireless communication system used for positioning may use different techniques for modeling the errors in the ranging and/or angles from wireless signals, and may use different multipath mitigation techniques.

The embodiments and techniques described above may be implemented in software as various interconnected functional blocks or distinct software modules. This is not necessary, however, and there may be cases where these functional blocks or modules are equivalently aggregated into a single logic device, program or operation with unclear boundaries. In any event, the functional blocks and software modules implementing the embodiments described above, or features of the interface can be implemented by themselves, or in combination with other operations in either hardware or software, either within the device entirely, or in conjunction with the device and other processer enabled devices in communication with the device, such as a server.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the disclosure is defined and limited only by the claims that follow.

What is claimed is:

1. A method for providing an integrated navigation solution for a device within a platform, the method comprising:
   a) obtaining motion sensor data from a sensor assembly of the device,
   b) obtaining optical samples from at least one optical sensor for the platform;
   c) obtaining map information for an environment encompassing the platform;
   d) generating an integrated navigation solution for the platform based at least in part on the obtained motion sensor data using a nonlinear state estimation technique, wherein a prediction phase involving a system model is used to propagate predictions about a state of the platform and an update phase involving at least one measurement model relating measurements to the state is used to update the state of the platform, wherein the nonlinear state estimation technique comprises using a nonlinear measurement model for optical samples, wherein depth from the optical samples is utilized, wherein integrating the motion sensor data and the optical samples in the nonlinear state estimation technique is tightly-coupled, and wherein the generating comprises:
      i) using the obtained motion sensor data in the nonlinear state estimation technique; and
      ii) integrating the optical samples directly by updating the nonlinear state estimation technique using the nonlinear measurement model and the map information; and
   f) providing the integrated navigation solution for the platform.

2. The method of claim 1, wherein the measurement model comprises at least one of:
   i) an optical range-based model based at least in part on a probability distribution of measured ranges using an estimated state of the platform and the map information;
   ii) an optical nearest object likelihood model based at least in part on a probability distribution of distance to an object detected using the optical samples, an estimated state of the platform and a nearest object identification from the map information;
   iii) an optical map matching model based at least in part on a probability distribution derived by correlating a global location-based map derived from the map information to a local location-based map generated using the optical samples and an estimated state of the platform; and
   iv) an optical closed-form model based at least in part on a relation between an estimated state of the platform and ranges to objects from the map information derived from the optical samples.

3. The method of claim 2, further comprising determining depth information for objects detected within the optical samples by at least one of:
   i) estimating depth for an object and deriving range, bearing and elevation; and
   ii) obtaining depth readings for an object from the at least one optical sensor and deriving range, bearing and elevation.

4. The method of claim 3, further comprising performing a scene reconstruction operation for a local area surrounding the platform based at least in part on the depth information for objects detected within the optical samples.

5. The method of claim 3 or 4, further comprising employing a deep neural network.

6. The method of claim 5, wherein the deep neural network is one of a convolutional neural network and a recurrent neural network.

7. The method of claim 4, further comprising computing a correlation indicator by comparing the scene reconstruction with the obtained map information.

8. The method of claim 7, wherein a probability of a current state of the platform is estimated based at least in part on the correlation indicator and prior probabilities.

9. The method of claim 1 or 2, wherein the nonlinear measurement model further comprises models for optical sensor-related errors comprising any one or any combination of environmental errors, sensor-based errors and dynamic errors.

10. The method of claim 1 or 2, wherein the nonlinear measurement model is configured to handle errors in the map information.

11. The method of claim 1, wherein the nonlinear state estimation technique comprises at least one of:

i) an error-state system model;

ii) a total-state system model, wherein the integrated navigation solution is output directly by the total-state model; and iii) a system model receiving input from an additional state estimation technique that integrates the motion sensor data.

12. The method of claim 11, wherein the nonlinear state estimation technique comprises an error-state system model and wherein providing the integrated navigation solution comprises correcting an inertial mechanization output with the updated nonlinear state estimation technique.

13. The method of claim 11, wherein the system model comprises a system model receiving input from an additional state estimation technique, and wherein the additional state estimation technique integrates any one or any combination of:

i) inertial sensor data;
ii) odometer or means for obtaining platform speed data;
iii) pressure sensor data;
iv) magnetometer data; and
v) absolute navigational information.

14. The method of claim 11, wherein the system model of the nonlinear state estimation technique further comprises a motion sensor error model.

15. The method of claim 1, wherein the nonlinear state estimation technique comprises at least one of:

i) a Particle Filter (PF);
ii) a PF, wherein the PF comprises a Sampling/Importance Resampling (SIR) PF; and
iii) a PF, wherein the PF comprises a Mixture PF.

16. The method of claim 1, further comprising determining a misalignment between a frame of the sensor assembly and a frame of the platform, wherein the misalignment is at least one of:

i) a mounting misalignment; and
ii) a varying misalignment.

17. The method of claim 1, further comprising determining a misalignment between a frame of the sensor assembly and a frame of the platform, wherein the misalignment is determined using any one or any combination of:

i) a source of absolute velocity;
ii) a radius of rotation calculated from the motion sensor data; and
iii) leveled horizontal components of acceleration readings along forward and lateral axes from the motion sensor data.

18. The method of claim 1, further comprising integrating a source of absolute navigational information with the integrated navigation solution.

19. The method of claim 1, further comprising building a map of objects detected using the optical samples, wherein the map is built using a simultaneous localization and mapping technique.

20. A system for providing an integrated navigation solution for a device within a platform, comprising:

a device having a sensor assembly configured to output motion sensor data;
at least one optical sensor for the platform configured to output optical samples; and
at least one processor, coupled to receive the motion sensor data, the optical samples, and map information for an environment encompassing the platform, and operative to:

A) generate an integrated navigation solution based at least in part on the motion sensor data using a nonlinear state estimation technique, wherein a prediction phase involving a system model is used to propagate predictions about a state of the platform and an update phase involving at least one measurement model relating measurements to the state is used to update the state of the platform, wherein the nonlinear state estimation technique comprises using a nonlinear measurement model for optical samples, wherein depth from the optical samples is utilized, wherein integrating the motion sensor data and the optical samples in the nonlinear state estimation technique is tightly-coupled, and wherein the at least one processor generates the integrated navigation solution by:

1) using the obtained motion sensor data in the nonlinear state estimation technique; and
2) integrating the optical samples directly by updating the nonlinear state estimation technique using the nonlinear measurement model and the map information; and B) provide the integrated navigation solution.

21. The system of claim 20, wherein the measurement model comprises at least one of:

i) an optical range-based model based at least in part on a probability distribution of measured ranges using an estimated state of the platform and the map information;

ii) an optical nearest object likelihood model based at least in part on a probability distribution of distance to an object detected using the optical samples, an estimated state of the platform and a nearest object identification from the map information;

iii) an optical map matching model based at least in part on a probability distribution derived by correlating a global location-based map derived from the map information to a local location-based map generated using the optical samples and an estimated state of the platform; and iv) an optical closed-form model based at least in part on a relation between an estimated state of the platform and ranges to objects from the map information derived from the optical samples.

22. The system of claim 20, wherein the nonlinear state estimation technique comprises at least one of:

i) an error-state system model;
ii) a total-state system model, wherein the integrated navigation solution is output directly by the total-state model; and
iii) a system model receiving input from an additional state estimation technique that integrates the motion sensor data.

23. The system of claim 20, wherein the sensor assembly includes an accelerometer and a gyroscope.

24. The system of claim 23, wherein the sensor assembly is implemented as a Micro Electro Mechanical System (MEMS).

25. The system of claim 20, further comprising a source of absolute navigational information.

26. The system of claim 20, further comprising any one or any combination of:

A) an odometer or means for obtaining platform speed;
B) a pressure sensor;
C) a magnetometer.

* * * * *